United States Patent
Arai et al.

(10) Patent No.: US 6,559,234 B1
(45) Date of Patent: May 6, 2003

(54) CROSS-COPOLYMERIZED OLEFIN/ STYRENE/DIENE COPOLYMER, PROCESS FOR THE PRODUCTION OF THE SAME AND USES THEREOF

(75) Inventors: Toru Arai, Tokyo (JP); Masataka Nakajima, Tokyo (JP); Toshiaki Otsu, Tokyo (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/831,380

(22) PCT Filed: Dec. 22, 1999

(86) PCT No.: PCT/JP99/07239

§ 371 (c)(1),
(2), (4) Date: May 17, 2001

(87) PCT Pub. No.: WO00/37517

PCT Pub. Date: Jun. 29, 2000

(30) Foreign Application Priority Data

Dec. 22, 1998 (JP) .............................................. 10-365362
Sep. 13, 1999 (JP) .............................................. 11-258618

(51) Int. Cl.⁷ ......................... C08L 45/00; C08L 51/00; C08L 25/08; C08F 279/02
(52) U.S. Cl. ....................... 525/245; 525/244; 525/243; 525/241; 525/248; 525/256; 525/268; 526/170; 526/347
(58) Field of Search ................................. 525/244, 243, 525/245, 241, 248, 256, 268; 526/170, 347, 402

(56) References Cited

U.S. PATENT DOCUMENTS

| 5,037,890 A | 8/1991 | Yokoyama et al. |
| 6,096,849 A | 8/2000 | Chung et al. |
| 6,166,145 A * | 12/2000 | Guest et al. ................. 525/241 |
| 6,265,493 B1 | 7/2001 | Chung et al. |
| 6,414,102 B2 | 7/2002 | Chung et al. |

FOREIGN PATENT DOCUMENTS

| EP | 0 559 108 | 9/1993 |
| EP | 0 667 359 | 8/1995 |
| EP | 0 911 346 | 4/1999 |
| JP | 5-262817 | 10/1993 |
| JP | 2000-38420 | 2/2000 |

* cited by examiner

Primary Examiner—James J. Seidleck
Assistant Examiner—Olga Asinovsky
(74) Attorney, Agent, or Firm—Oblon, Spivak, McClelland, Maier & Neustadt, P.C.

(57) ABSTRACT

The present invention firstly provides a novel olefin/styrene/diene type cross-copolymer having excellent physical properties and mechanical properties, and a novel, efficient and economically excellent process for its production. Further, it provides an efficient and economically excellent process for producing various cross-copolymers such as an olefin/diene type cross-copolymer.

The present invention secondly provides various resin compositions or processed products containing cross-copolymers, having problems of various conventional resin compositions or processed products solved and improved, as applications of cross-copolymers of the present invention.

86 Claims, 11 Drawing Sheets

Cross copolymer

Graft copolymer 0.10 [μm]

CROSS-COPOLYMERIZED OLEFIN/STYRENE/DIENE COPOLYMER, PROCESS FOR THE PRODUCTION OF THE SAME AND USES THEREOF

TECHNICAL FIELD

The present invention relates to a process for producing an olefin/styrene/diene type cross-copolymer or cross-copolymerization product having excellent mechanical properties and high heat resistance and being excellent in processability and economical efficiency, and the obtained cross-copolymer or cross-copolymerization product, and further an excellent process for producing an olefin/diene type cross-copolymer or a cross-copolymerization product. Further, it relates to their applications.

BACKGROUND ART

Ethylene/styrene Copolymers

Some ethylene/styrene random copolymers obtainable by means of a so-called Ziegler-Natta catalyst system comprising a transition metal catalyst component and an organic aluminum compound, and processes for their production, are known.

JP-A-3-163088 and JP-A-7-53618 disclose ethylene/styrene copolymers containing no normal (i.e. head-to-tail) styrene chain, so-called pseudo-random copolymers, obtainable by means of a complex having a so-called constrained geometric structure.

JP-A-6-49132 and Polymer Preprints, Japan, 42, 2292 (1993) disclose processes for producing similar ethylene/styrene copolymers containing no normal styrene chain, i.e. pseudo-random copolymers, by means of a catalyst comprising a cross-linkeded metallocene type Zr complex and a cocatalyst. These copolymers have no stereoregularity derived from styrene units.

Further, recently, it has been reported to produce an ethylene/styrene copolymer having a stereoregularity of alternating copolymerization type by means of a certain specific cross-linkeded bisindenyl type Zr complex i.e. a racemic [ethylenebis(indenyl)zirconium dichloride] under an extremely low temperature (−25° C.) condition. (Macromol. Chem., Rapid Commun., 17, 745 (1996).) However, with the copolymer obtainable by this complex, the molecular weight is not yet practically sufficient, and the compositional distribution is also large.

The above copolymers have no styrene chain structures and thus have drawbacks that the compatibility with styrene type polymers is low, and they are not suitable for use as an alloy or a compatibilizing agent for styrene type polymers. Further, their mechanical properties such as the initial modulus of elasticity and high temperature characteristics (heat resistance) are also inadequate.

Further, JP-A-9-309925 and JP-A-11-130808 disclose novel ethylene/styrene copolymers which respectively have styrene contents of from 1 to 55 mol % and from 1 to 99 mol % and which have ethylene/styrene alternating structures and isotactic stereoregularity in their styrene chain structures and further have head-to-tail styrene chain structures, with the alternating degrees ($\lambda$ values in this specification) of the copolymers being at most 70. Further, these copolymers have high transparency. However, even with such ethylene/styrene copolymers, the content of styrene chains is not adequate, and they are not adequate for use as a compatibilizing agent or as a component of an alloy. Further, their mechanical properties such as the initial modulus of elasticity and high temperature characteristics (heat resistance) are not yet fully satisfactory.

Ethylene/α-olefin Copolymers

Ethylene/α-olefin copolymers having 1-hexene, 1-octene or the like co-polymerized to ethylene, i.e. so-called LLDPE, are flexible and transparent and have high strength, whereby they are widely used as e.g. films for general use, packaging materials or containers. However, as a nature of polyolefin type resins, their printability and coating properties are low, and special treatment such as corona treatment will be required for printing or coating. Further, they have poor affinity with an aromatic vinyl compound polymer such as a polystyrene or a polar polymer, and in order to obtain a composition with such a resin having good mechanical properties, it has been necessary to employ an expensive compatibilizing agent additionally. Further, they have also a problem that the surface hardness is low, and they are susceptible to scratching.

Grafted Ethylene/p-methylstyrene Copolymer

On the other hand, an attempt to synthesize a graft product of a p-methylethylene/styrene copolymer with other resin by means of a metallocene catalyst or CGCT catalyst, has been reported, for example, in WO/9616096A1, U.S. Pat. No. 5,543,484 or J. Polym. Sci. PartA, Polym. Chem., 36, 1017 (1998).

Such method is designed so that methyl groups of p-methylstyrene units of the copolymer are activated, e.g. lithio-modified, so that the graft polymerization is carried out using them as polymerization initiation points. However, it is necessary to chemically activate methyl groups after the copolymer is recovered and purified from the polymer solution. Further, to complete this process, a reaction for a long period of time is required, such being not practical. There is an additional problem that p-methylstyrene is expensive as compared with styrene. The graft copolymer thus obtained usually has graft chains independently branched from the polymer main chain, but when it is used as a compatibilizing agent or as a composition, the strength of the interface of the polymer microstructure can not be said to be adequate.

Common Graft Copolymers

As a method for obtaining a graft copolymer, a method has been heretofore known wherein a graft copolymer of an olefin type polymer or an olefin/styrene type copolymer is obtained during the polymerization or during the mold processing by a common known radical graft treatment. However, this method is disadvantageous from the viewpoint of costs. Further, the obtainable graft copolymer usually has a problem that it is non-uniform and partially gelled to be not soluble, whereby the moldability tends to be impaired. The graft copolymer thus obtained, usually has graft chains independently branched from the polymer main chain, but when such copolymer is employed as a composition or a compatibilizing agent, the strength of the interface of the polymer microstructure can not be said to be sufficient.

Grafted Syndiotactic Polystyrene

JP-A-11-124420 discloses a technique for improving toughness of a syndiotactic polystyrene by synthesizing an olefin/styrene/diene copolymer by means of a coordination polymerization catalyst containing a metallocene catalyst, followed by coordination polymerization to graft-copolymerize (cross-copolymerize in this invention) a syndiotactic polystyrene chain. However, there is no other disclosure than the production of a graft-copolymerized syndiotactic polystyrene. Besides, with the disclosed coordination polymerization catalyst, the ability to copolymerize a diene (divinylbenzene) is so low that a large amount of the diene has to be charged to the polymerization solution in the coordination polymerization step, and a large amount of an unreacted diene will consequently remain in the polymerization solution. If such a coordination polymerization solution is used as it is in the subsequent step, the crosslinking degree of the obtainable polymer tends to be extremely high due to the remaining diene, thus leading to gelation or substantial deterioration in the processability. Therefore, it will be required to separate and purify the polymer from the coordination polymerization solution before proceeding with the next graft copolymerization step. The separation and purification of the polymer from the polymer solution are very cumbersome and will bring about a substantial increase of costs.

Cross-copolymerization by Anionic Polymerization

JP-A-1-118510 discloses a technique to synthesize an olefin/divinylbenzene copolymer by coordination polymerization employing a Zieglar-Natta catalyst and then graft (the same meaning as cross-copolymerize in the present invention) polystyrene chains by anionic polymerization. In this technique, a Zieglar-Natta catalyst is employed in the coordination polymerization step, the diene content in the obtained copolymer is highly non-uniform, and accordingly, the copolymer obtainable by grafting is also non-uniform and is likely to undergo gelation or to have poor processability. Further, an aromatic vinyl compound (styrene) is not included in the concept of the olefin/divinylbenzene copolymer in this technique.

Besides, with the disclosed Zieglar-Natta catalyst, the ability to copolymerize a diene (divinylbenzene) is low, whereby a large amount of the diene has to be charged to the polymerization solution in the coordination polymerization step, and a large amount of an unreacted diene will consequently remain in the polymerization solution. If such a coordination polymerization solution is used as it is in the subsequent step, the crosslinking degree of the obtainable polymer will be very high due to the remaining diene, whereby gelation or substantial deterioration of the processability will be brought about. Therefore, separation and purification of the polymer from the coordination polymerization solution are required before proceeding with the next graft copolymerization step. The separation and purification of the polymer from the polymerization solution are very cumbersome and will bring about a substantial increase of the costs.

Likewise, even if a common single site coordination polymerization catalyst (homogeneous type coordination polymerization catalyst) is used as it is, the ability to copolymerize a diene (divinylbenzene) is usually inadequate, and a similar problem will result.

Polystyrene Type Resin Composition

On the other hand, an aromatic vinyl compound type resin such as a styrene type resin or a rubber-reinforced styrene type resin, is a material excellent in dimensional stability and stiffness, but has a drawback that it is inferior in the mechanical property, particularly in toughness. As an aromatic vinyl compound type resin, a rubber-reinforced styrene type resin (HIPS) having an elastic rubber phase dispersed non-continuously in a hard resin, is used for the purpose of improving the impact resistance. The impact resistance increases in correspondence with the rubber material, but the mechanical strength (tensile strength, stiffness), the heat resistance, the moldability, the surface gloss, etc., tend to decrease. Further, there is a drawback that the resin is likely to undergo heat deterioration during molding due to double bonds of butadiene or isoprene of the rubber material. Further, with a composition of a hydrogenated styrene/butadiene block copolymer and a styrene type resin, there is a problem that the stiffness of the resin composition decreases to a large extent. WO98/10014 discloses a composition containing an aromatic vinyl compound type resin employing an ethylene/styrene pseudo-random copolymer obtainable by means of a geometrically constrained catalyst (CGCT catalyst). However, the pseudo-random copolymer contains no chain structure of aromatic vinyl compound units, and the content of the aromatic vinyl compound units is limited to at most 50 mol % at the maximum, whereby it has particularly low compatibility with an aromatic vinyl compound type polymer, and the physical properties of the composition are rather limited.

Apart from the above, JP-A-9-309925 and JP-A-11-130808 disclose high molecular weight ethylene/styrene copolymers which have styrene contents of from 1 to 55 mol % and from 1 to 99 mol %, respectively, and which have an ethylene/styrene alternating structure and a styrene chain structure, wherein the styrene chain structure has an isotactic stereoregularity. However, also in this copolymer, the proportion of the styrene chain structure contained is small in a compositional range where the styrene content is relatively low to have rubber elasticity and flexibility which are useful particularly for a composition, and the compatibility with an aromatic vinyl compound type polymer is not adequately improved.

Polyolefin Composition

Polyolefins such as polyethylene and polypropylene have been typical general purpose plastics and have been used in a large quantity as household products. For example, polyethylene or polypropylene is excellent in mechanical strength, moldability, heat resistance, chemical resistance, etc., and is used in many areas as a general purpose resin for films, containers, etc. Further, in recent years, with an improvement in the polymerization technique of polyolefins, it has become possible to obtain high performance polyolefins, and it has been attempted to use them in the field where engineering plastics used to be employed. However, their impact resistance is not sufficient, and it is difficult to use them for automobile parts such as bumpers or instrument panels or housing parts of household products such as refrigerators and washing machines.

For the purpose of overcoming such a drawback, a method is known to incorporate an olefin type elastomer such as ethylene/isobutene, an ethylene/propylene copolymer (EPR) or an ethylene/1-octene copolymer, to polyolefins. However, a difficulty will result such that the surface hardness tends to decrease, whereby the product is susceptible to scratching. Further, a hydrogenated resin such as SEBS, SIPS has been employed as a modifier for polyolefins, and the impact resistance has been improved. However, such a hydrogenated resin has a drawback that it is expensive.

WO98/10015 and JP-A-10-60194 disclose a composition containing a polyolefin type resin employing an ethylene/styrene pseudo-random copolymer obtainable by means of a geometrically constrained catalyst (CGCT catalyst). For example, a composition of polypropylene and an ethylene/styrene copolymer, shows an effect to improve the impact resistance, but there still remains a room for improvement in the balance with mechanical properties (flexural strength, flexural modulus of elasticity).

Compatibilizing Agent

A polymer composition is desired whereby different properties such as the high stiffness and glass transition temperature of an aromatic vinyl compound type polymer and the flexibility, low glass transition point and high solvent resistance derived from the crystal structure of an olefin type polymer, are well balanced. However, heretofore, the desired physical properties have not been obtained with a composition prepared by blending an aromatic vinyl compound type polymer and an olefin type polymer, since the compatibility between these resins is poor. Therefore, various compatibilizing agents have been studied.

As such compatibilizing agents, hydrogenated block copolymers (SEBS, SEPS, etc.) obtained by hydrogenating block copolymers of e.g. an aromatic vinyl compound and a diene compound, have been employed. (J. Polym. Sci., Polym. Letters, 19, 79 (1981), JP-A-56-38338, U.S. Pat. No. 4,020,025, etc.). These resins are very expensive, since they are produced via a hydrogenation step which is highly costly. Further, the mechanical properties (breaking strength, tensile modulus of elasticity, elongation) etc. of the obtainable compatibilizing compositions are also inadequate.

U.S. Pat. No. 5,460,818 discloses a composition employing an ethylene/styrene pseudo-random copolymer obtained by means of a geometrically constrained catalyst (CGCT catalyst), as a compatibilizing agent for an aromatic vinyl compound type polymer and an olefin type polymer. However, in the pseudo-random copolymer, no chain structure of aromatic vinyl compound units is contained, and the content of aromatic vinyl compound units is limited to at most 50 mol % at the maximum, and in particular, the compatibility with an aromatic vinyl compound type polymer is low, whereby its performance as a compatibilizing agent for the physical properties of the composition are rather limited.

Further, apart from the above, JP-A-9-309925 and JP-A-11-130808 disclose high molecular weight ethylene/styrene copolymers which have styrene contents of from 1 to 55 mol % and from 1 to 99 mol %, respectively, and which have an ethylene/styrene alternating structure and a styrene chain structure, wherein the styrene chain structure has isotactic stereoregularity. However, also in these copolymers, the proportions of styrene chain structures contained are small in the compositional range where the styrene content is relatively low and where they have rubber elasticity and flexibility useful as compatibilizing agents, and no adequate improvement has been made in the compatibility with an aromatic vinyl compound type polymer.

Cross-linkeded Product of a Resin and a Resin Composition

A method for crosslinking by means of a crosslinking agent such as a peroxide or sulfur is known to improve the properties such as the compression set, of an olefin/diene type resin such as an ethylene/propylene/diene copolymer (EPDM), an elastomer, an olefin type resin such as an ethylene/propylene copolymer (EPR) or ethylene/octene, or an elastomer. However, a cross-linkeded product of such an olefin/diene type resin or an olefin type resin has a low polarity, and its compatibility with other resins, the coating property, etc., have been inadequate.

Further, WO96/07681, WO99/10395 and U.S. Pat. No. 5,869,591 disclose mainly cross-linkeded products of ethylene/aromatic vinyl compound pseudo-random copolymers. JP-A-11-293045, JP-A-11-293046 and JP-A-11-293072 disclose dynamic cross-linkeded products of ethylene/aromatic vinyl compound copolymers having aromatic vinyl compound chains and stereoregularity. Further, JP-A-7-278231 and JP-A-10-298242 disclose cross-linkeded products of ethylene/α-olefin/aromatic vinyl compound random copolymers, and JP-A-7-278230, JP-A-8-134140, JP-A-8-225615 and JP-A-10-168242 disclose cross-linkeded products of ethylene/α-olefin/aromatic vinyl compound/non-conjugated diene random copolymers. Further, JP-A-10-264325, JP-A-10-264313 and WO98/31540 disclose cross-linkeded products of ethylene/aromatic vinyl compound/non-conjugated polyene copolymers.

Cross-linkeded products employing such ethylene/aromatic vinyl compound (styrene) copolymers have had a drawback that particularly, the tensile modulus of elasticity, the heat resistance and the cold resistance are low, and no adequate mechanical strength can be obtained. Further, for the three-component type or four-component type copolymers, the polymerization behaviors tend to be complex, whereby reproducibility tends to be inadequate. For an industrial production, a complicated plant will be required, such being not economical.

Further, an ethylene/aromatic vinyl compound (styrene) copolymer itself has a low crosslinkable property. Accordingly, in order to obtain adequate degree of crosslinking, it is necessary to use a large amount of a crosslinking agent, a crosslinking accelerator, a crosslinking accelerating adjuvant and/or a co-crosslinking agent, such being disadvantageous from the viewpoint of costs. Further, it has had a drawback that due to such additives, a bad odor may remain in the product. To overcome such a drawback, if it is attempted to copolymerize a non-conjugated polyene or a non-conjugated diene in the first polymerization step to introduce crosslinking points to an ethylene/aromatic vinyl compound (styrene) copolymer, it will be required to copolymerize a relatively large amount of the diene, whereby the obtained copolymer itself is likely to undergo crosslinking during the polymerization and tends to be in-solubilized or gelled, thus leading to deterioration of the physical properties or processability.

Foamed Products of a Resin and a Resin Composition

Foamed products obtained by foaming thermoplastic resins are excellent in lightweight, heat insulating properties, sound-proofing properties, vibration-absorbing properties, shock-absorbing properties, gas-permeability, etc., and thus they are used as packaging materials such as food containers, shock-absorbing materials, heat-insulating materials, etc. As specific application fields, food-packaging materials, packing materials for e.g. instruments, building materials and construction materials, may, for example, be mentioned.

The thermoplastic resin as a base material for such a foamed product, may, for example, be an olefin type resin such as an ethylene or propylene type resin, a styrene type resin, a urethane type resin or a vinyl chloride type resin.

An olefin type resin such as polyethylene or polypropylene, usually has high crystallinity and undergoes a rapid viscosity change along with melting of the crystal, whereby mold processing is not necessarily easy. For the purpose of improving the melting properties, crosslinking or the like has been carried out. Further, it has been inadequate also with respect to the balance of the mechanical properties and heat resistance of the obtained foam.

An urethane type resin foam has a characteristic such that it is excellent in recovery from compression. However, the urethane bond is readily hydrolysable, whereby there is a problem in the chemical stability. Further, it has a drawback that the cost tends to be expensive for industrial production.

With respect to a PCV foam, with a view to improving the environmental aptitude of the material, there has been an increasing demand for substitution of a polyvinyl chloride type material for other materials, since chlorine or a chlorine type compound is generated during decomposition or incineration and an adverse effect of the contained plasticizer to a living body is feared.

WO99/10395, U.S. Pat. No. 5,869,591, JP-A-11-293023, WO99/47592 and JP-A-9-309925 disclose crosslinked products of ethylene/aromatic vinyl compound/(diene) copolymers (compositions) and their foamed products. Exemplified as Examples, are cross-linkeded products of ethylene/styrene copolymers such as pseudo-random copolymers, and the cross-linkeded structure is a network structure having diene moieties in the polymer main chain connected by a crosslinking agent.

These foamed products composed mainly of ethylene/styrene copolymers have a characteristic that they are superior to a styrene composition in flexibility. However, at a low temperature, such flexibility tends to be lost, and it also has a drawback that the heat resistance is low. Therefore, the low temperature characteristics and the heat resistance are improved by crosslinking or making a composition with a resin such as LLDPE. Even then, no adequate improvement has been attained in the temperature dependency of the soft touch feeling. Further, a foamed product composed mainly of an ethylene/styrene copolymer is excellent as a soft foam since the initial modulus of elasticity is low, but it is not suitable for use in an application to a foam which is required to have a certain degree of stiffness and flexibility at the same time.

DISCLOSURE OF THE INVENTION

The present invention is firstly to provide a novel cross-copolymer which overcomes the above-mentioned drawbacks of conventional ethylene/styrene copolymers and ethylene/α-olefin copolymers and various graft and cross-copolymers heretofore proposed and to provide a novel, efficient and economically excellent process for its production.

The present invention is secondly to provide various resin compositions or processed products containing the cross-copolymer, which have the above-mentioned problems of various conventional resin compositions or processed products solved or improved.

Cross-copolymer (a Cross-copolymer)

The cross-copolymer of the present invention is a cross-copolymer which is a copolymer obtained by cross-copolymerizing (intersectingly copolymerizing) a vinyl compound polymer to an olefin/styrene/diene copolymer having a styrene content of from 0.03 mol % to 96 mol %, a diene content of from 0.001 mol % to 3 mol % and the rest being an olefin (which will be referred to as a cross-copolymerized olefin/styrene/diene copolymer or an olefin/styrene/diene type cross-copolymer in this specification), wherein cross-copolymerized cross chains are other than a syndiotactic aromatic vinyl compound polymer (syndiotactic polystyrene).

Further, the cross-copolymer of the present invention is a copolymer which can be obtained by the following process i.e. by the coordination polymerization step and the crossing step.

Further, the present invention is a cross-copolymer constituted preferably by the structure shown in FIG. 1 or comprising mainly the structure shown in FIG. 1.

Namely, as shown in FIG. 1, it is a copolymer having mainly a structure in which a main chain olefin/styrene/diene copolymer and a vinyl compound polymer are cross-bonded (intersectingly bonded), at one point or plural points of the main chain. Such a cross-bonding structure may be rephrased as a star structure. Further, in the classification by the POLY division of the United States Chemical Society, it is called a segregated star copolymer (Polymer Preprints, 1998, March). The vinyl compound polymer cross-bonded to the main chain olefin/styrene/diene copolymer will be referred to as a cross chain.

Whereas as shown in FIG. 2, a graft copolymer known to those skilled in the art is a copolymer having mainly polymer chains branched from one point or plural points of the main chain.

With a structure such that a polymer main chain is cross-bonded (intersectingly bonded) with other polymer chains (which may be called also as a star structure), it is usually possible to obtain superior strength of the interface of the polymer microstructure as compared with a grafted structure, when it is employed as a composition or a compatibilizing agent, whereby it is believed to present high mechanical properties.

Further, the present invention is an olefin/styrene/diene type cross-copolymerization product excellent in processability, whereby MFR as measured under a load of 5 kg at 200° C. is at least 0.05 g/10 min, preferably at least 0.2 g/10 min.

Further, the present invention is a cross-copolymer characterized in that the cross-copolymerized cross chains have substantially no stereoregularity. Namely, it is characterized in that the racemic diad index or meso diad index is less than 0.85, preferably at most 0.75 in an olefin/styrene/diene cross-copolymer.

The present invention is preferably an olefin/styrene/diene type cross-copolymer wherein the olefin is ethylene or at least two olefins including ethylene.

Further, the present invention is more preferably an olefin/styrene/diene type cross-copolymer having an aromatic vinyl compound polymer as cross chains.

The olefin/styrene/diene type cross-copolymer of the present invention is a cross-copolymer obtained by using an olefin/styrene/diene copolymer having a styrene content of from 0.03 mol % to 96 mol %, a diene content of from 0.0001 mol % to 3 mol % and the rest being an olefin.

According to the present invention, a process for producing an olefin/styrene/diene type cross-copolymer or cross-copolymerization product having excellent mechanical properties and high heat resistance and being excellent in processability and economical efficiency, is provided, and the olefin/styrene/diene type cross-copolymer or cross-copolymerization product is provided. Further, an excellent process for producing an olefin/diene type cross-copolymer or cross-copolymerization product is provided. These cross-copolymers and cross-copolymerization products are extremely useful in a wide range of applications.

BEST MODE FOR CARRYING OUT THE INVENTION

Figure 1:
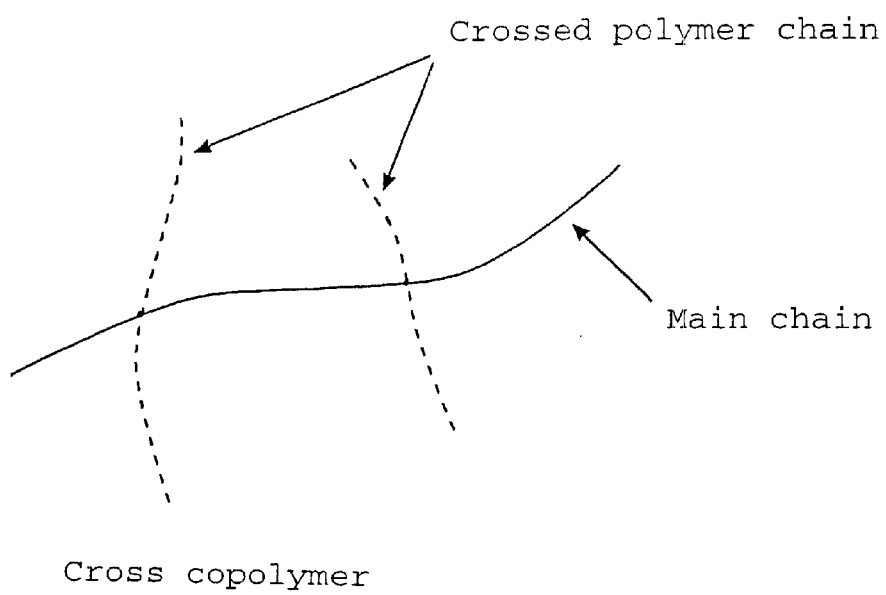
FIG. 1 is a schematic view illustrating the structure mainly contained in the crossed copolymer of the present invention.
Figure 2:
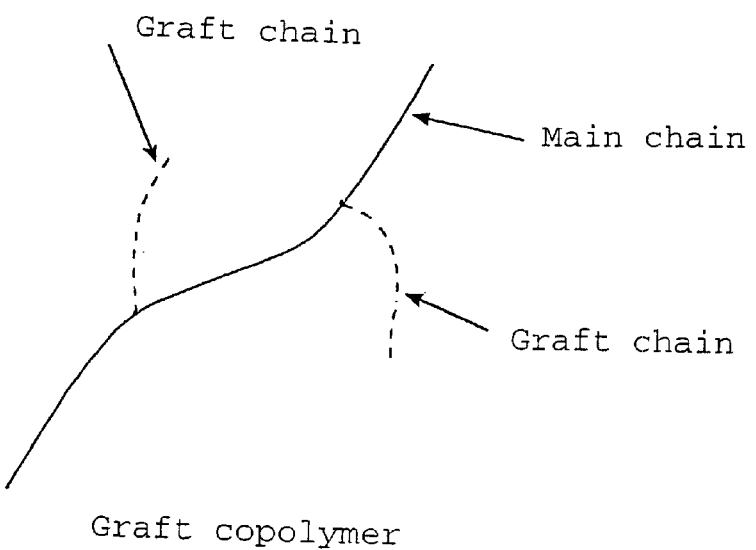
FIG. 2 is a schematic view illustrating the structure of a conventional grafted copolymer.

Now, the present invention will be described in detail.

In the specification of the present invention, a cross-copolymerization product is a composition containing a cross-copolymer which can be obtained directly from the following process i.e. the coordination polymerization step and the crossing step.

Process for Producing an Olefin/styrene/diene Type Cross-copolymerization Product The present invention is a cross-copolymerization product which can be obtained by the following process. Further, the process for producing the cross-copolymerization product is capable of producing a cross-copolymerization product which is uniform and which has good processability and excellent physical properties with efficiency and economical feasibility suitable for industrial application.

Namely, the present invention is a process employing at least two polymerization steps comprising, as a coordination polymerization step, carrying out copolymerization of a styrene monomer, an olefin monomer and a diene monomer by means of a coordination polymerization catalyst to synthesize an olefin/styrene/diene copolymer, and then, as a crossing step, in the coexistence of this copolymer and a vinyl compound monomer, obtaining an olefin/styrene/diene cross-copolymerization product containing an olefin/styrene/diene cross-copolymer having a vinyl compound polymer cross-copolymerized by means of an anionic, radical or cationic polymerization initiator.

Coordination Polymerization Step

The olefin/styrene compound/diene copolymer to be used in the present invention, can be obtained by copolymerizing a styrene monomer, an olefin monomer and a diene monomer in the presence of a single site coordination polymerization catalyst.

The olefin to be used in the coordination polymerization step of the present invention may, for example, be ethylene or a $C_{3-20}$ α-olefin, such as propylene, 1-butene, 1-hexene, 4-methyl-1-pentene or 1-octene, or a cyclic olefin such as cyclopentene or norbornene. Preferably, a mixture of ethylene with an α-olefin such as propylene, 1-butene, 1-hexene or 1-octene, an α-olefin such as propylene, or ethylene, is employed. More preferably, ethylene or a mixture of ethylene with an α-olefin, is employed. Particularly preferably, ethylene is employed.

The styrene to be used in the present invention, is preferably employed alone, but it may be employed as a mixture with other aromatic vinyl compound, such as p-chlorostyrene, p-tert-butylstyrene, α-methylstyrene, vinyl naphthalene, p-methylstyrene, vinyl naphthalene or vinyl anthracene.

Further, as the diene to be used in the coordination polymerization step of the present invention, a coordination-polymerizable diene may be employed. Preferably, 1,4-hexadiene, 1,5-hexadiene, ethylidene, norbornene, dicyclopentadiene, norbornadiene, 4-vinyl-1-cyclohexene, 3-vinyl-1-cyclohexene, 2-vinyl-1-cyclohexene, 1-vinyl-1-cyclohexene, o-divinylbenzene, p-divinylbenzene, m-divinylbenzene, or a mixture of them, may be mentioned.

Further, it is possible to employ a diene wherein a plurality of double bonds (vinyl groups) are bonded via a $C_{6-30}$ hydrocarbon group containing a single or plural aromatic vinyl ring structures. Preferred is a diene wherein one of double bonds (vinyl groups) is used for coordination polymerization so that remaining double bonds in a polymerized state are anion-, radical- or cation-polymerizable. Most preferably, o-, p- or m-divinylbenzene, or a mixture thereof, is suitably employed.

In the present invention, the amount of the diene to be used in the coordination polymerization step is from 1/50,000 to 1/100, preferably from 1/20,000 to 1/400, particularly preferably from 1/10,000 to 1/1,000, of the amount of styrene to be used, in a molar ratio. If the coordination polymerization step is carried out at a diene concentration higher than this, many crosslinking structures of polymer will be formed during the polymerization, whereby gelation or the like will take place, or the processability or physical properties of the cross-copolymer finally obtainable via the crossing step, tend to deteriorate, such being undesirable. Further, if the coordination polymerization step is carried out at a diene concentration higher than this, the residual diene concentration in the coordination polymerization solution tends to be high, and if such a polymer solution is used for the crossing step (such as anionic polymerization) as it is, many crosslinking structures tend to form, whereby the obtained cross-copolymer tends to be likewise poor in the processability or physical properties. Further, the olefin/styrene/diene copolymer obtained in the coordination polymerization step has a styrene content of from 0.03 mol % to 96 mol %, a diene content of from 0.0001 mol % to 3 mol % and the rest being an olefin, more preferably a styrene content of from 0.03 mol % to 50 mol %, a diene content of from 0.001 mol % to less than 0.2 mol % and the rest being an olefin. If the diene content in the copolymer becomes higher, the processability of the cross-copolymer finally obtainable via the crossing step, tends to be poor, such being undesirable.

In order to obtain a cross-copolymer excellent in low temperature characteristics, an olefin/styrene/diene copolymer having a styrene content of from 0.03 mol % to 25 mol %, preferably from 0.03 mol % to 15 mol %, particularly preferably from 3 mol % to 15 mol %, a diene content of from 0.001 mol % to 0.5 mol % and the rest being an olefin, is employed.

The single site coordination polymerization catalyst to be used in the coordination polymerization step may, for example, be a polymerization catalyst comprising a soluble transition metal catalyst and a cocatalyst i.e. a soluble Zieglar-Natta catalyst or a transition metal compound catalyst activated with methyl aluminoxane or a boron compound (a so-called metallocene catalyst or half metallocene catalyst, a CGCT catalyst, etc.).

Specifically, polymerization catalysts disclosed in the following literatures and patents, can be employed.

For example, metallocene catalysts disclosed in U.S. Pat. No. 5,324,800, JP-A-7-37488, JP-A-6-49132, Polymer Preprints, Japan, 42, 2292 (1993), Macromol. Chem., Rapid Commun., 17, 745 (1996), JP-A-9-309925, EP0872492A2 and JP-A-6-184179.

Half metallocene catalysts disclosed in Makromol. Chem. 191, 2387 (1990).

CGCT catalysts disclosed in JP-A-3-163088, JP-A-7-53618 and EP-A-416815.

Soluble Zieglar-Natta catalysts disclosed in JP-A-3-250007 and Stud. Surf. Sci. Catal., 517 (1990).

An olefin/styrene/diene copolymer having a uniform composition with a diene uniformly contained in the polymer, is suitably employed to obtain a cross-copolymer or cross-copolymerization product of the present invention. However, it is difficult to obtain such a copolymer having a uniform composition by a Zieglar-Natta catalyst, and a single site coordination polymerization catalyst is preferably employed. The single site coordination polymerization catalyst is a polymerization catalyst comprising a soluble transition metal catalyst and a cocatalyst, or a polymerization catalyst comprising a transition metal compound catalyst activated with methyl aluminoxane or a boron compound (a so-called metallocene catalyst or half metallocene catalyst, a CGCT catalyst, etc.).

In the coordination polymerization step of the present invention, the coordination polymerization catalyst to be most preferably employed, is a polymerization catalyst comprising a transition metal compound represented by the following general formula (1) and a cocatalyst.

When a polymerization catalyst comprising a transition metal compound represented by the following general formula (1) and a cocatalyst, is employed, a diene, particularly divinylbenzene, can be copolymerized to a polymer in high efficiency, whereby it is possible to substantially reduce the amount of the diene to be employed in the coordination polymerization step and the amount of an unreacted diene remaining in the polymerization solution.

If the amount of the diene to be employed in the coordination polymerization step is large, i.e. if the concentration is high, crosslinking of the polymer takes place substantially as the diene unit structures serve as crosslinking points during the coordination polymerization, whereby gelation or insolubilization takes place, and the processability of the cross-copolymer or cross-copolymerization product tends to deteriorate. Further, if the non-polymerized diene remains substantially in the polymerization solution obtained in the coordination polymerization step, the crosslinking degree of cross chains will be remarkably high in the subsequent anionic polymerization, whereby the obtained crossed copolymer or cross-copolymerization product will be insolubilized or gelled to deteriorate the processability.

Further, when a polymerization catalyst comprising a transition metal compound represented by the following general formula (1) and a cocatalyst, is employed, it is possible to produce an olefin/styrene/diene copolymer having a uniform composition with a remarkably high activity suitable for industrial application. Further, a copolymer having high transparency can be presented especially with a copolymer having a styrene content of from 1 mol % to 20 mol %. Further, with a composition having a styrene content of from 1 mol % to 96 mol %, an olefin/styrene/diene copolymer excellent in mechanical properties, having an isotactic stereoregularity and a head-to-tail styrene chain structure, can be presented.

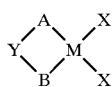

General formula (1)

wherein A and B are a group selected from an unsubstituted or substituted cyclopentaphenanthryl group, an unsubstituted or substituted benzoindenyl group, an unsubstituted or substituted cyclopentadienyl group, an unsubstituted or substituted indenyl group, or an unsubstituted or substituted fluorenyl group;

Y is a methylene group, a silylene group, an ethylene group, a germilene group or a boron residue, which has bonds to A and B and which further has hydrogen or a group containing a $C_{1-15}$ hydrocarbon (which may have from 1 to 3 nitrogen, oxygen, sulfur, phosphorus or silicon atoms), the substituents may be the same or different from one another, and Y may have a cyclic structure such as a cyclohexylidene group or a cyclopentylidene group;

X is hydrogen, a halogen, a $C_{1-15}$ alkyl group, a $C_{6-10}$ aryl group, a $C_{8-12}$ alkylaryl group, a silyl group having a $C_{1-4}$ hydrocarbon substituent, a $C_{1-10}$ alkoxy group, or a dialkyl amide group having a $C_{1-6}$ alkyl substituent; and M is zirconium, hafnium or titanium.

Particularly preferred is a polymerization catalyst comprising a transition metal compound of the above general formula (1) wherein at least one of A and B is an unsubstituted or substituted cyclopentaphenanthryl group, an unsubstituted or substituted benzoindenyl group, or an unsubstituted or substituted indenyl group, and a cocatalyst.

The unsubstituted or substituted cyclopentaphenanthryl group can be represented by the following formulae Ka 7 to Ka 8.

In the following Ka 7 to Ka 14, each of R1 to R8 is hydrogen, a $C_{1-20}$ alkyl group, a $C_{6-10}$ aryl group, a $C_{7-20}$ alkylaryl group, a halogen atom, an $OSiR_3$ group, a $SiR_3$ group or a $PR_2$ group (each R represents a $C_{1-10}$ hydrocarbon group). Further, the plurality of R1 or R2 may be the same or different from one another and adjacent R1 groups or R2 groups may together form a 5- to 8-membered aromatic or alicyclic ring. The plurality of R3, R4 or R5 may be the same or different from one another, and adjacent R3 groups, R4 groups or R5 groups may together form a 5- to 8-membered aromatic or alicyclic ring, (provided that a case where they form an unsubstituted cyclopentaphenanthryl group is excluded). The plurality of R6, R7 or R8 may be the same or different from one another.

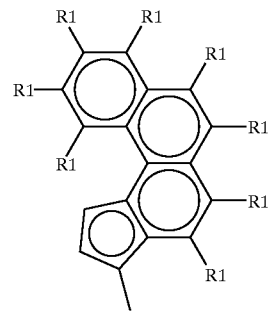

Ka 7

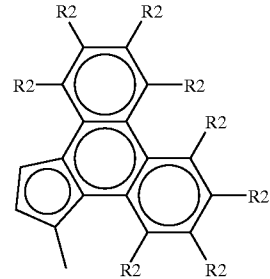

Ka 8

The unsubstituted cyclopentaphenanthryl group may specifically be a 3-cyclopenta[c]phenanthryl group or a 1-cyclopenta[1]phenanthryl group.

The unsubstituted or substituted benzoindenyl group can be represented by the following Ka 9 to Ka 11.

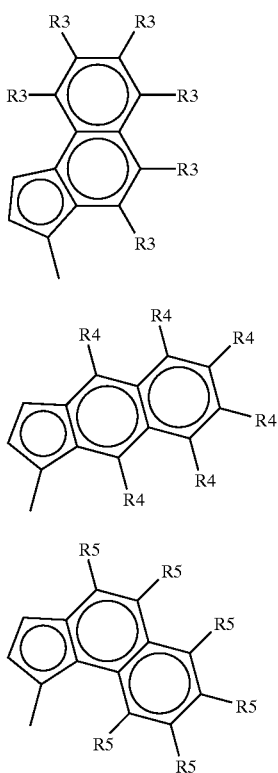

The unsubstituted benzoindenyl group may, for example, be 4,5-benzo-1-indenyl (another name: benzo(e)indenyl), 5,6-benzo-1-indenyl or 6,7-benzo-1-indenyl, and the substituted benzoindenyl group, may, for example, be α-acenaphtho-1-indenyl.

The unsubstituted or substituted cyclopentadienyl group, the unsubstituted or substituted indenyl group, or the unsubstituted or substituted fluorenyl group may be represented by the formulae Ka 12 to Ka 14.

The unsubstituted indenyl group may be 1-indenyl, and the substituted indenyl may, for example, be 4-alkyl-1-indenyl, 4-aryl-1-indenyl, 4,5-dialkyl-1-indenyl, 4,6-dialkyl-1-indenyl, 5,6-dialkyl-1-indenyl, 4,5-diaryl-1-indenyl, 5-aryl-1-indenyl, 4-aryl-5-alkyl-1-indenyl, 2,6-dialkyl-4-aryl-1-indenyl, 5,6-diaryl-1-indenyl or 4,5,6-triaryl-1-indenyl.

The unsubstituted cyclopentadienyl may be cyclopentadienyl, and the substituted cyclopentadienyl group may, for example, be 4-aryl-1-cyclopentadienyl, 4,5-diaryl-1-cyclopentadienyl, 5-alkyl-4-aryl-1-cyclopentadienyl, 4-alkyl-5-aryl-1-cyclopentadienyl, 4,5-dialkyl-1-cyclopentadienyl, 5-trialkylsilyl-4-alkyl-1-cyclopentadienyl or 4,5-dialkylsilyl-1-cyclopentadienyl.

The unsubstituted fluorenyl may be a 9-fluorenyl group, and the substituted fluorenyl group may, for example, be a 7-methyl-9-fluorenyl group or a benzo-9-fluorenyl group.

When both A and B are an unsubstituted or substituted cyclopentaphenanthryl group, an unsubstituted or substituted benzoindenyl group, or an unsubstituted or substituted indenyl group, they may be the same or different.

For the production of a copolymer to be used in the present invention, it is particularly preferred that at least one of A and B is an unsubstituted or substituted cyclopentaphenanthryl group or an unsubstituted or substituted benzoindenyl group.

Further, it is most preferred that at least one of A and B or both are an unsubstituted or substituted benzoindenyl group.

In the above general formula (1), Y is a methylene group, a silylene group, an ethylene group, a germilene group or a boron residue, which has bonds to A and B and which further has hydrogen or a $C_{1-15}$ hydrocarbon group (which may contain from 1 to 3 nitrogen, oxygen, sulfur, phosphorus or silicon atoms), as a substituent. The substituents may be the same or different from one another. Further, Y may have a cyclic structure such as a cyclohexylidene group or a cyclopentylidene group.

Preferably, Y is a substituted methylene group which has bonds to A and B and which is substituted by hydrogen or a $C_{1-15}$ hydrocarbon group. The hydrocarbon substituent may, for example, be an alkyl group, an aryl group, a cycloalkyl group or a cycloaryl group. The substituents may be the same or different from one another.

Particularly preferably, Y is, for example, —CH$_2$—, —CMe$_2$—, —CEt$_2$—, —CPh$_2$—, a cyclohexylidene group or a cyclopentylidene group. Here, Me represents a methyl group, Et an ethyl group, and Ph a phenyl group.

X is hydrogen, a halogen, a $C_{1-15}$ alkyl group, a $C_{6-10}$ aryl group, a $C_{8-12}$ alkylaryl group, a silyl group having a $C_{1-4}$ hydrocarbon substituent, a $C_{1-10}$ alkoxy group, or a dialkylamide group which has a $C_{1-6}$ alkyl substituent. The halogen may, for example, be chlorine or bromine, the alkyl group may, for example, be a methyl group or an ethyl group, the aryl group may, for example, be a phenyl group, the alkylaryl group may, for example, be a benzyl group, the silyl group may, for example, be a trimethylsilyl group, the alkoxy group may, for example, be a methoxy group, an ethoxy group or an isopropoxy group, and the dialkylamide group may, for example, be a dimethylamide group.

M is zirconium, hafnium or titanium, particularly preferably zirconium.

As examples of such a transition metal catalyst component, the following compounds may be mentioned in addition to the transition metal compounds having a substituted methylene-bridged structure, as specifically disclosed in EP-0872492A2 and JP-A-11-130808.

For example, dimethylmethylenebis(3-cyclopenta[c]phenanthryl)zirconium dichloride, dimethylmethylenebis(3-cyclopenta[c]phenanthryl)zirconium bisdimethylamide, di-n-propylmethylenebis(3-cyclopenta[c]phenanthryl)zirconium dichloride, di-i-propylmethylenebis(3-cyclopenta[c]phenanthryl)zirconium dichloride, cyclohexylidenebis(3-cyclopenta[c]phenanthryl)zirconium dichloride, cyclopentylidenebis(3-cyclopenta[c]phenanthryl)zirconium dichloride, diphenylmethylenebis(3-cyclopenta[c]phenanthryl)zirconium dichloride, dimethylmethylene(4,5-benzo-1-indenyl)(3-cyclopenta[c]phenanthryl)zirconium dichloride, dimethylmethylene(5,6-benzo-1-indenyl)(3-cyclopenta[c]phenanthryl)zirconium dichloride, dimethylmethylene(6,7-benzo-1-indenyl)(3-cyclopenta[c]phenanthryl)zirconium dichloride, dimethylmethylene(cyclopentadienyl)(3-cyclopenta[c]phenanthryl)zirconium dichloride, dimethylmethylene(1-indenyl)(3-cyclopenta[c]phenanthryl)zirconium dichloride, dimethylmethylene(1-fluorenyl)(3-cyclopenta[c]phenanthryl)zirconium dichloride, dimethylmethylene(4-phenyl-1-indenyl)(3-cyclopenta[c]phenanthryl)zirconium dichloride, dimethylmethylene(4-naphthyl-1-indenyl)(3-cyclopenta[c]phenanthryl)zirconium dichloride, dimethylmethylene(3-cyclopenta[c]phenanthryl)(4,5-naphtho-1-indenyl)zirconium dichloride, dimethylmethylene(3-cyclopenta[c]phenanthryl)(α-acenaphtho-1-indenyl)zirconium dichloride, dimethylmethylenebis(1-cyclopenta[c]phenanthryl)zirconium dichloride, dimethylmethylenebis(1-cyclopenta[c]phenanthryl)zirconium bisdimethylamide, di-n-propylmethylenebis(1-cyclopenta[c]phenanthryl)zirconium dichloride, di-i-propylmethylenebis(1-cyclopenta[c]phenanthryl)zirconium dichloride, cyclohexylidenebis(1-cyclopenta[c]phenanthryl)zirconium dichloride, cyclopentylidenebis(1-cyclopenta[c]phenanthryl)zirconium dichloride, diphenylmethylenebis(1-cyclopenta[c]phenanthryl)zirconium dichloride, dimethylmethylene(4,5-benzo-1-indenyl)(1-cyclopenta[c]phenanthryl)zirconium dichloride, dimethylmethylene(5,6-benzo-1-indenyl)(1-cyclopenta[c]phenanthryl)zirconium dichloride, dimethymethylene(6,7-benzo-1-indenyl)(1-cyclopenta[c]phenanthryl)zirconium dichloride, dimethylmethylene(cyclopentadienyl)(1-cyclopenta[c]phenanthryl)zirconium dichloride, dimethylmethylene(1-indenyl)(1-cyclopenta[c]phenanthryl)zirconium dichloride, dimethylmethylene(1-fluorenyl)(1-cyclopenta[c]phenanthryl)zirconium dichloride, dimethylmethylene(4-phenyl-1-indenyl)(1-cyclopenta[c]phenanthryl)zirconium dichloride, dimethylmethylene(4-naphthyl-1-indenyl)(1-cyclopenta[c]phenanthryl)zirconium dichloride, dimethylmethylene(1-cyclopenta[c]phenanthryl)(4,5-naphtho-1-indenyl)zirconium dichloride, dimethylmethylene(1-cyclopenta[c]phenanthryl)(α-acenaphtho-1-indenyl)zirconium dichloride, dimethylmethylene(1-cyclopenta[c]phenanthryl)(3-cyclopenta[c]phenanthryl)zirconium dichloride, dimethylmethylenebis(4,5-benzo-1-indenyl)zirconium bis(dimethylamide), or dimethylmethylene(1-indenyl)(4,5-benzo-1-indenyl)zirconium bis(dimethylamide), may be mentioned.

In the foregoing, zirconium complexes are exemplified, but similar compounds as the above may suitably be employed also with respect to the titanium and hafnium complexes. Further, a mixture of a raceme and a meso form may be employed. Preferably, a raceme or a pseudo-raceme is employed. In such cases, D-isomers or L-isomers may be employed.

As the cocatalyst to be used in the process of the present invention, a cocatalyst which has been commonly used in combination with a conventional transition metal component, may be used. As such a cocatalyst, an aluminoxane (or alumoxane) or a boron compound is suitably employed.

Further, the cocatalyst to be used at that time, is preferably an aluminoxane (or alumoxane) represented by the following general formula (4) or (5).

General Formula (4)

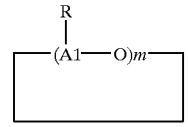

wherein R is a $C_{1-5}$ alkyl group, a $C_{6-10}$ aryl group or hydrogen, and m is an integer of from 2 to 100. The plurality of R may be the same or different from one another.

General Formula (5)

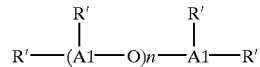

wherein R' is a $C_{1-5}$ alkyl group, a $C_{6-10}$ aryl group or hydrogen, and n is an integer of from 2 to 100. The plurality of R' may be the same or different from one another.

As the aluminoxane, methyl alumoxane, ethyl alumoxane or triisobutyl alumoxane is preferably employed. Particularly preferably, methyl alumoxane is employed. As the case requires, a mixture of such alumoxanes of different kinds may be employed. Further, such an alumoxane may be used in combination with an alkyl aluminum such as trimethyl aluminum, triethyl aluminum or triisobutyl aluminum, or with a halogen-containing alkyl aluminum such as dimethyl aluminum chloride.

The addition of an alkyl aluminum is effective to remove a substance which hinders the polymerization, such as a polymerization inhibitor in styrene or moisture in styrene or in a solvent, or for detoxification against the polymerization reaction.

However, if the amount of such a substance is reduced to a non-influential level by a known method such as preliminarily distilling the solvent or the like, bubbling it with a dry inert gas or passing it through a molecular sieve, or if the amount of the alumoxane to be used is slightly increased or dividedly added, the addition of the alkyl aluminum at the time of the polymerization is not necessarily required.

In the process of the present invention, a boron compound known as a cocatalyst, such as boron compound specifically exemplified as a cocatalyst in EP-0872492A2, may be employed in combination with the above transition metal catalyst component. Such a boron compound and the above-mentioned organic aluminum compound may be used at the same time.

Especially when a boron compound is employed as a cocatalyst, it is effective to add an alkyl aluminum compound such as triisobutyl aluminum to remove impurities which adversely affect the polymerization, such as water contained in the polymerization system.

At the time of producing an olefin/styrene/diene copolymer to be used in the present invention, the above described various monomers, the transition metal catalyst compound as a metal complex and the cocatalyst are brought in contact with one another. With respect to the order of contact and the contacting method, optional known methods may be employed.

The above copolymerization or polymerization method may, for example, be a method of polymerizing in a liquid monomer without using a solvent, or a method of employing a single solvent or a mixed solvent selected from a saturated aliphatic or aromatic hydrocarbon or a halogenated hydrocarbon, such as pentane, hexane, heptane, cyclohexane, benzene, toluene, ethylbenzene, xylene, chloro-substituted benzene, chloro-substituted toluene, methylene chloride or chloroform. Preferably, a mixed alkane type solvent, cyclohexane, toluene or ethylbenzene is employed. The polymerization mode may be solution polymerization or slurry polymerization. Further, as the case requires, a known method such as batch polymerization, continuous polymerization, preliminary polymerization or multi-step polymerization, may be employed.

Linear or loop single or connected plural pipe polymerizers may also be employed. In such a case, the pipe polymerizers may have various known mixers such as dynamic or static mixers or static mixers equipped with a cooling means, or various known coolers such as coolers equipped with cooling slender pipes. Further, they may have a batch type preliminary polymerizer. Further, a method such as gas phase polymerization may be employed.

The temperature for polymerization is suitably from −78° C. to 200° C. A polymerization temperature lower than −78° C., is industrially disadvantageous, and if it exceeds 200° C., decomposition of the metal complex tends to take place, such being undesirable. Industrially more preferably, it is from 0° C. to 160° C., particularly preferably from 30° C. to 160° C.

The pressure during the polymerization is usually from 0.1 atm to 100 atm, preferably from 1 to 30 atm, particularly industrially preferably from 1 to 10 atm.

When an organic aluminum compound is used as a cocatalyst, it is used in a ratio to the metal of the complex of from 0.1 to 100,000, preferably from 10 to 10,000, by an aluminum atom/complex metal atom ratio. If the ratio is smaller than 0.1, the metal complex cannot effectively be activated, and if it exceeds 100,000, such is economically disadvantageous.

When a boron compound is used as a cocatalyst, it is used in a ratio of from 0.01 to 100, preferably from 0.1 to 10, particularly preferably 1, by a boron atom/complex metal atom ratio.

If the ratio is smaller than 0.01, the metal complex cannot effectively be activated, and if it exceeds 100, such is economically disadvantageous.

The metal complex and the cocatalyst may be mixed and prepared outside the polymerization tank, or may be mixed in the tank at the time of polymerization.

Olefin/styrene/diene Copolymer to be used in the Present Invention

The olefin/styrene/diene copolymer to be used in the present invention can be synthesized from the respective monomers of styrene, an olefin and a diene by means of the above-mentioned coordination polymerization catalyst, preferably, a single site coordination polymerization catalyst in the above-described coordination polymerization step.

As the olefin/styrene/diene copolymer obtained in the coordination polymerization step of the present invention, preferred is an ethylene/styrene/diene copolymer, an ethylene/styrene/α-olefin/diene copolymer or an ethylene/styrene/cyclic olefin/diene copolymer, and particularly preferably, an ethylene/styrene/diene copolymer, may be employed.

Further, the olefin/styrene/diene copolymer obtained in the coordination polymerization step of the present invention may have a cross-linkeded structure with the contained diene monomer units, but it is necessary that the gel content is less than 10 wt %, preferably less than 0.1 wt %, of the entirety.

Now, a typical suitable ethylene/styrene/diene copolymer to be used in the present invention, will be described.

The ethylene/styrene/diene copolymer obtained by the coordination polymerization step preferably has a chain structure of head-to-tail styrene units attributable to peaks observed at from 40 to 45 ppm by the 13C-NMR measurement based on TMS. Further, it is preferred to have a chain structure of styrene units attributable to peaks observed at 42.3 to 43.1 ppm, 43.7 to 44.5 ppm, 40.4 to 41.0 ppm and 43.0 to 43.6 ppm.

Further, the copolymer to be suitably used in the present invention, is an ethylene/styrene/diene copolymer obtainable by means of a metallocene catalyst capable of producing an isotactic polystyrene, and an ethylene/styrene/diene copolymer obtainable by means of a metallocene catalyst capable of producing polyethylene by homopolymerization of ethylene.

Therefore, the obtained ethylene/styrene/diene copolymer may have ethylene chain structures, head-to-tail styrene chain structures and structures having ethylene units and styrene units bonded, in its main chain.

On the other hand, with conventional so-called pseudo-random copolymers, no styrene head-to-tail chain structure is observed even when the styrene content is in the vicinity of the maximum of 50 mol %. Further, even if homopolymerization of styrene is attempted by means of a catalyst for the preparation of a pseudo-random copolymer, no polymer can be obtained. Depending upon the polymerization conditions, etc., a very small amount of an atactic styrene homopolymer may sometimes be obtainable, but this should be understood to have been formed by cation polymerization or radical polymerization due to methylalumoxane which coexists or due to an alkylaluminum included therein.

The ethylene/styrene/diene copolymer obtainable in the coordination polymerization step in the present invention, is a copolymer wherein the stereoregularity of phenyl groups in the alternating structure of styrene and ethylene represented by the following general formula (3) contained in its structure, is such that the isotactic diad index (or the meso diad index) m is larger than 0.5, preferably larger than 0.75, particularly preferably larger than 0.95.

The isotactic diad index m of the alternating copolymer structure of ethylene and styrene, can be obtained by the following formula (ii) from an area Ar of the peak attributable to the r structure of the methylene carbon peak and an area Am of the peak attributable to the m structure appearing in the vicinity of 25 ppm:

$$m=Am/(Ar+Am) \qquad \text{Formula (ii)}$$

The positions of the peaks may sometimes shift more or less depending upon the measuring conditions or the solvent. For example, when chloroform-d is used as a solvent, and TMS is used as standard, the peak attributable to the r structure appears in the vicinity of from 25.4 to 25.5 ppm, and the peak attributable to the m structure appears in the vicinity of from 25.2 to 25.3 ppm.

Further, when tetrachloroethane-d2 is used as a solvent, and the center peak at 73.89 ppm of the triplet of tetrachloroethane-d2 is used as standard, the peak attributable to the r structure appears in the vicinity of from 25.3 to 25.4 ppm, and the peak attributable to the m structure appears in the vicinity of from 25.1 to 25.2 ppm.

Here, the m structure represents a meso diad structure, and the r structure represents a racemic diad structure.

With the ethylene/styrene/diene copolymer of the present invention, no peak attributable to the r-structure of the alternating structure of ethylene and styrene is substantially observed.

The ethylene/styrene/diene copolymer to be obtained in the coordination polymerization step is preferably a copolymer wherein the alternating structure index λ (represented by the following formula (i)) indicating the proportion of the alternating structure of styrene and ethylene represented by the general formula (3) contained in the copolymer structure, is smaller than 70 and larger than 0.01, preferably smaller than 30 and larger than 0.1.

$$\lambda = A3/A2 \times 100 \quad \text{Formula (i)}$$

where A3 is the sum of areas of three peaks a, b and c attributable to an ethylene/styrene alternating structure represented by the following general formula (4'), obtained by the 13C-NMR measurement, and A2 is the sum of areas of peaks attributable to the main chain methylene and methine carbon, as observed within a range of from 0 to 50 ppm by 13C-NMR using TMS as standard.

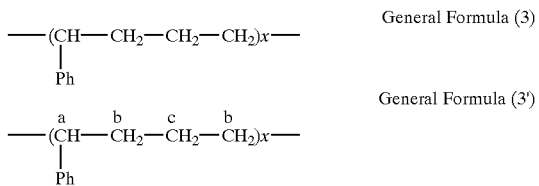

General Formula (3)

General Formula (3')

(wherein Ph represents a phenyl group, and x represents the number of repeating units and is an integer of at least 2.).

For an ethylene/styrene/diene copolymer having a diene content of at most 3 mol %, preferably less than 1 mol %, it is effective to have head-to-tail styrene chains and/or to have isotactic stereoregularity in the ethylene/styrene alternating structure, and/or to have an alternating structure index λ of smaller than 70, so that it will be an elastomer copolymer having a high transparency and high mechanical strength such as breaking strength. A copolymer having such characteristics can be suitably employed in the present invention.

Especially, a copolymer having a high level of isotactic stereoregularity in the ethylene/styrene alternating structure and an alternating structure index λ of smaller than 70, is preferred as the copolymer of the present invention. Further, a copolymer having a head-to-tail styrene chain, an isotactic stereoregularity in the ethylene/styrene alternating structure, and an alternating structure index λ of smaller than 70, is particularly preferred as the copolymer of the present invention.

Namely, a preferred ethylene/styrene/diene copolymer of the present invention has a characteristic such that it has an alternating structure of ethylene and styrene having high stereoregularity and at the same time has various structures such as ethylene chains having various lengths, inversion bonds of styrene and styrene chains having various lengths simultaneously. Further, the ethylene/styrene/diene copolymer of the present invention has a characteristic such that the proportion of the alternating structure can be variously changed by the content of styrene in the copolymer, the polymerization catalyst or the polymerization conditions employed, within such a range that the value λ obtained by the above formula is more than 0.01 and less than 70.

It is important that the alternating index λ is lower than 70 in order to present significant mechanical strength, solvent resistance, toughness and transparency despite a crystallizable polymer, or in order to be a partially crystallizable polymer, or in order to be a non-crystallizable polymer.

This stereoregular alternating structure is a crystallizable structure. Accordingly, various characteristics such as a non-crystlalline polymer or a polymer having a partially crystallized structure, may be imparted to the copolymer to be used in the present invention, by controlling the styrene content or the degree of crystallization by a suitable method.

As compared with a conventional ethylene/styrene copolymer or ethylene/styrene/diene copolymer having no stereoregularity or no head-to-tail styrene chain, the copolymer to be used in the present invention has the properties such as the initial tensile modulus of elasticity, hardness, breaking strength, solvent resistance and transparency improved in various regions of the styrene content and various degrees of crystallization, and thus, they show the physical properties characteristic as novel low crystallizable resins, thermoplastic elastomers or transparent soft resins.

Further, the ethylene/styrene/diene copolymer of the present invention which basically contains no halogen or no elutable plasticizer, has a basic characteristic that the safety is high.

The above-described olefin/styrene/diene copolymer to be preferably employed in the present invention, particularly an ethylene/styrene/divinylbenzene copolymer, can be obtained by means of a polymerization catalyst comprising a transition metal compound represented by the above general formula (1) and a cocatalyst.

In the foregoing, as a typical preferred example of the olefin/styrene/diene copolymer to be used in the present invention, an ethylene/styrene/diene copolymer has been described, but the olefin/styrene/diene copolymer to be used in the present invention is not, of course, limited to this.

The weight average molecular weight of the olefin/styrene/diene copolymer to be used in the present invention is at least 10,000, preferably at least 30,000, particularly preferably at least 60,000, and at most 1,000,000, preferably at most 500,000. The molecular weight distribution (Mw/Mn) is at most 6, preferably at most 4, most preferably at most 3.

Here, the weight average molecular weight is a molecular weight calculated as polystyrene obtained by using standard polystyrene by GPC. The same will apply to the following description.

The weight average molecular weight of the olefin/styrene/diene copolymer to be used in the present invention can be adjusted as the case requires, within the above range, by a known method employing a chain transfer agent such as hydrogen or by changing the polymerization temperature.

Crossing Step

Now, the process for producing the olefin/styrene/diene type cross-copolymer or cross-copolymerization product of the present invention (crossing step) will be described.

For the crossing step of the present invention, anionic polymerization, radical polymerization or cationic polymerization may be employed depending upon the type of the vinyl compound monomer to be polymerized in the cross-copolymerization step.

In each of these polymerization methods, the conversion of the vinyl compound monomer species to be polymerized in the crossing step is preferably at least 20%, particularly preferably at least 50%, most preferably at least 70%.

The length (the molecular weight) of the cross chain moiety can be assumed from the molecular weight of the homopolymer not-crossed. The length is preferably from 500 to 500,000, particularly preferably from 5,000 to 500,000, most preferably from 10,000 to 150,000, as the weight average molecular weight. Further, the molecular weight distribution (Mw/Mn) is preferably at most 6, particularly preferably at most 4, most preferably at most 3.

The crossing step of the present invention is preferably carried out following the above-mentioned coordination polymerization step by using the polymerization solution obtained in the coordination polymerization step. However, the cross-copolymerization step may be carried out in the presence of anionic, radical or cationic polymerization initiator by recovering the copolymer from the polymerization solution obtained in the above-described coordination polymerization step, dissolving it in a new solvent and adding monomers to be used in the crossing step. Further, it is also possible to recover the copolymer from the polymerization solution obtained in the above-mentioned coordination polymerization step and carrying out cross-copolymerization by suspension polymerization or emulsion polymerization in the solvent and/or the monomer to be used in the crossing step.

When radical polymerization is employed for the crossing step of the present invention, a known radical polymerization initiator or polymerization method may be employed.

Specifically, radical polymerization initiators disclosed in the Fourth Edition of the Organic Peroxide Catalogue of Nippon Yushi K.K. (published in April, 1996) or in Catalogue "Azo Polymerization Initiators" of Wako Jyunyaku K.K. (published in 1987) can be suitably employed. Further, it is also possible to carry out radical polymerization by heat polymerization without using an initiator. In such a case, any monomer may be employed so long as it is a radical polymerizable vinyl compound monomer. However, a vinyl compound monomer preferably employed may, for example, be an aromatic vinyl compound such as styrene, p-methylstyrene, p-tert-butylstyrene, p-chlorostyrene, α-methylstyrene, vinylnaphthalene or vinylanthracene, a diene compound. such as butadiene, isoprene or chloroprene, vinylcyclohexene, vinylcyclohexane, an acrylate such as methyl acrylate, a methacrylate such as methyl methacrylate, acrylonitrile, a polar monomer such as maleic anhydride, or a mixture thereof.

Preferably, an aromatic vinyl compound, or a mixture of an aromatic vinyl compound with a monomer radical-polymerizable therewith, is employed, and most preferably, an aromatic vinyl compound is employed.

Particularly preferably, it is possible to employ a known polymerization method and polymerization conditions, such as slurry polymerization, bulk polymerization, solution polymerization or emulsion polymerization.

As the polymerization mode, an optional known method may be employed such as batch polymerization, plug flow continuous polymerization, continuous polymerization employing a loop-type reactor, multi-step continuous polymerization, batch system polymerization or preliminary polymerization.

The polymerization temperature is suitably from 0° C. to 300° C. A polymerization temperature lower than 0° C. is industrially disadvantageous, since the polymerization speed is low, and if the temperature exceeds 300° C., depolymerization or the like is likely to take place, whereby the molecular weight of the polymer tends to be low, such being undesirable. Industrially more preferably, it is from 50° C. to 300° C.

The pressure at the time of the polymerization is suitably from 0.1 atm to 100 atm, preferably from 1 to 30 atm, particularly industrially preferably from 1 to 10 atm.

Particularly preferred as the crossing step of the present invention is an anionic polymerization step employing an anionic polymerization initiator and anionic polymerizable monomer. The anionic polymerization is very preferred in the present invention, since the conversion of the vinyl compound monomer species is extremely high, it is possible to obtain a polymer having a relatively high molecular weight even with a low monomer concentration, and a sufficiently high polymerization rate can be obtained even with a low monomer concentration condition. Further, the anionic polymerization has a merit from the viewpoint of the process, since the vinyl compound monomer conversion is high, whereby the anion polymerizable monomer will be consumed and will not substantially remain in the polymer solution, and post treatment of the polymerization solution or the polymer recovery step can be simplified.

In the anionic polymerization step (crossing step), any monomer may be used so long as it is an anion polymerizable vinyl compound monomer. The anion polymerizable vinyl compound monomer is disclosed, for example, in "Anionic Polymerization" Marcel Dekker, Inc., 1996, Henry L. Hsieh and Roderic P. Quirk.

Especially, in the present invention, an aromatic vinyl compound such as styrene, p-methylstyrene, p-tert-butylstyrene, p-chlorostyrene, α-methylstyrene, vinylnaphthalene or vinylanthracene, a diene compound such as butadiene or isoprene, an acrylate such as methyl acrylate, a methacrylate such as methyl methacrylate, or a mixture thereof, may be employed. Preferably, an aromatic vinyl compound or a mixture of an aromatic vinyl compound with a monomer anion-copolymerizable therewith is employed, and most preferably, an aromatic vinyl compound is employed.

In the anionic polymerization step of the present invention, to the monomer (such as styrene) remaining in the polymerization solution in the coordination polymerization step, the same type of a vinyl compound monomer may be added afresh all at once, continuously or stepwise dividedly. When it is stepwise dividedly added, the proportion of the structure having cross chains will be remarkably high, and it is possible to further improve the mechanical properties of the composition containing them.

In a case where the monomer to be polymerized in the anionic polymerization step of the present invention is different from the monomer to be used in the coordination polymerization step, for example, in a case where it is a monomer different from styrene, it is preferred that the copolymer is separated and recovered from the polymerization solution, and this polymer is again dissolved in a solvent, and polymerization is carried out by adding a monomer to be polymerized by the anionic polymerization afresh. Otherwise, the anionic polymerization may be carried out by adding the fresh monomer all at once, or stepwise, to the polymerization solution obtained in the coordination polymerization step. In such a case, cross chains will have a random or block or tapered block copolymer structure of the monomer added afresh and the monomer remained in the coordination polymerization step.

The anionic polymerization step (crossing step) of the present invention is preferably carried out following the above-mentioned coordination polymerization step. At that time, the copolymer obtained in the coordination polymerization step may be separated and purified from the polymerization solution by means of an optional polymer recovery method such as a crumb forming method, a steam stripping method or a direct solvent removal method employing an evaporation tank or an evaporation extruder, and then used in the anionic polymerization step. However, it is economically preferred to use the polymerization solution from the coordination polymerization directly to the subsequent anionic polymerization step after releasing or without releasing the residual olefin from the polymerization solution. It is one of the features of the present invention that the coordination polymerization solution containing the polymer can be used in the crossing step without separating the polymer from the coordination polymerization solution.

In a case where the monomer to be polymerized in the anionic polymerization step is styrene, styrene monomer may be added, as the case requires. However, the monomer remained without being polymerized in the coordination polymerization step, may be employed as it is. Further, the above-mentioned anion-polymerizable vinyl compound monomer may be added as the case requires.

As the solvent, a mixed alkane type solvent or a solvent such as cyclohexane or benzene, which does not create a disadvantage such as a chain transfer during the anionic polymerization in the anionic polymerization step, is particularly preferred. However, other solvent such as toluene or ethylbenzene may also be employed if the polymerization temperature is not higher than 150° C.

As the polymerization mode, an optional known method such as batch polymerization, continuous polymerization, batch type polymerization, slurry polymerization or preliminary polymerization, may be employed.

The polymerization temperature is suitably from −78° C. to 200° C. A polymerization temperature lower than −78° C. is industrially disadvantageous, and if it exceeds 150° C., chain transfer or the like will take place, such being undesirable. Industrially more preferably, it is from 0° C. to 200° C., particularly preferably from 30° C. to 150° C.

The pressure during the polymerization is suitably from 0.1 atm to 100 atm, preferably from 1 to 30 atm, industrially particularly preferably from 1 to 10 atm.

In the anionic polymerization step of the present invention, a known anionic polymerization initiator may be employed. Such an anionic polymerization initiator is disclosed, for example, in "Anionic Polymerization" Marcel Dekkar, Inc., 1996, Henry L. Hsieh and Roderic P. Quirk. Preferably, an alkyl lithium compound or a lithium salt or sodium salt of biphenyl, naphthalene, pyrene or the like, particularly preferably, sec-butyl lithium or n(normal)-butyl lithium, is employed. Further, a polyfunctional initiator, a dilithium compound or a trilithium compound may also be used. Further, a known anionic polymerization terminal coupling agent may be employed, as the case requires.

In a case where methylalmoxane is employed as a cocatalyst for the polymerization catalyst in the coordination polymerization step, the amount of the initiator is preferably at least equivalent, particularly preferably at least 2 equivalents, of the oxygen atom contained therein. In a case where a boron compound is employed as a cocatalyst for the polymerization catalyst in the coordination polymerization step, the amount is sufficiently small as compared with the equivalent of the oxygen atom in the methylalmoxane, whereby the amount of the initiator can be reduced.

In the anionic polymerization step, the length of cross chains, or the molecular weight of the homopolymer not-crossed, can optionally be changed by properly adjusting the amount of the initiator.

The length (the molecular weight) of the cross chain moiety can be assumed from the molecular weight of the homopolymer not-crossed. The length is preferably from 500 to 500,000, particularly preferably from 5,000 to 500,000, most preferably from 10,000 to 150,000, as the weight average molecular weight. Further, the molecular weight distribution (Mw/Mn) is preferably at most 6, particularly preferably at most 4, most preferably at most 3.

The ratio of the cross-copolymerized copolymer (the cross-copolymerization ratio) among the olefin/styrene/diene copolymer or the olefin/diene copolymer used, is at least 1 wt %, preferably at least 10 wt %, particularly preferably from 30 wt % to 100 wt %, based on the initial olefin/styrene/diene copolymer.

The Properties and Applications of the Olefin/styrene/diene Type Cross-copolymer or Cross-copolymerization Product Now, the physical properties of the olefin/styrene/diene type cross-copolymer or cross-copolymerization product of the present invention and its applications will be described.

The olefin/styrene/diene type cross-copolymer or cross-copolymerization product of the present invention by itself has high mechanical properties (breaking strength, tensile modulus of elasticity), high temperature characteristics and transparency depending upon the composition. Further, it has characteristics that the components or the composition of the main chain, the crossing ratio, the crossing density, the components or the composition of the cross chain, the molecular weight of the cross chain, the proportion of the polymer not-crossed (homopolymer), etc., may be optionally changed, and the mechanical properties, high temperature characteristics, hardness, optical properties, etc., may be adjusted within a wide range.

Further, it has good processability, since the contained gel content is very small. Further, it has a merit that a high temperature (at least about 270° C.) is not required for processing, since the cross chains contain no syndiotactic aromatic vinyl compound polymer (syndiotactic polystyrene) structure.

Further, the olefin/styrene/diene type cross-copolymer or the cross-copolymerization product of the present invention may be used alone, or may be used as a composition with other polymer. Taking the use as a composition into consideration, cross chains made of a syndiotactic aromatic vinyl compound polymer (syndiotactic polystyrene) which has a low compatibility with other resin, especially with an atactic aromatic vinyl compound type resin and thus has difficulty in processability, are not suitable. Taking the use as a composition into consideration, a cross-copolymer or a cross-copolymerization products having no stereo-regularity in the cross chains, namely the racemic diad index or meso diad index being at most 0.85, preferably at most 0.75, is preferred.

In the crossing step of the present invention, usually depending upon the polymerization conditions or the composition of charged monomers, a polymer of the same type as the formed cross chains will form, and the resulting polymer will be a composition having an optional composition comprising a copolymer obtained by the coordination polymerization, a cross-copolymer having cross chains and "a non-crossed polymer of the same type as the cross chains". In this specification, this composition is referred to as a cross-copolymerization product. In this case, the amount of "a polymer not crossed of the same type as cross chains" is at most 90 wt %, preferably at most 50 wt %, particularly preferably at most 30 wt %, of the total. By changing the polymerization conditions, this amount of "a non-crossed polymer of the same type as cross chains" can be changed. Such a "a non-crossed polymer of the same type as cross chains" can be removed by e.g. solvent fractionation, but may be used as it is without being subjected to fractionation.

Further, the amount of "an olefin/styrene/diene copolymer" having no cross chain is at most 99 wt %, preferably at most 50 wt %, particularly preferably at most 30 wt %, of the entirety.

Here, "an olefin/styrene/diene copolymer" means an olefin/styrene/diene copolymer obtained in the above coordination polymerization step.

The cross-copolymer serves as a compatibilizing agent, whereby the cross-copolymerization product will be well compatibilized and will show good physical properties.

Further, it is considered that when used as such a composition (a cross-copolymerization product), the cross-copolymer of the present invention having a structure (which may be referred to also as a star structure) wherein the polymer main chain and other polymer chain are crossed (intersectingly bonded), provides superior strength of the interface of the polymer microstructure and gives high mechanical properties, as compared with a commonly grafted copolymer.

In the present invention, particularly in an olefin/styrene/diene type cross-copolymerization product obtained by cross-copolymerization employing a styrene monomer, the styrene content (the total of the amount of styrene in the olefin/styrene/diene copolymer used, the amount of styrene in the cross chains and the amount of styrene in the polystyrene) based on the entirety is from 1 mol % to 99 mol %, preferably from 5 mol % to 80 mol %.

In the present invention, in an olefin/styrene/diene type cross-copolymerization product obtained by cross-polymerization employing a styrene monomer and other vinyl compound monomer, the styrene content (the total amount of the amount of styrene in the olefin/styrene/diene copolymer used, the amount of styrene in the cross chains and the amount of styrene in the polymer not-crossed) based on the entirety is from 1 mol % to 99 mol %, preferably from 5 mol % to 80 mol %.

Further, in the present invention, in an olefin/styrene/diene type cross-copolymerization product obtained by cross-copolymerization employing a vinyl compound other than styrene, the vinyl compound content (the total amount of the amount of the vinyl compound in cross chains and the amount of the vinyl compound in the polymer not crossed) based on the entirety is from 0.01 mol % to 80 mol %, preferably from 0.5 mol % to 50 mol %.

For example, the ethylene/styrene/diene type cross-copolymerization product obtained by cross-copolymerizing polystyrene to an ethylene/styrene/diene copolymer by anion polymerization or radical polymerization, contains an ethylene/styrene/diene copolymer, a polystyrene-cross-copolymerized ethylene/styrene/diene copolymer and a polystyrene. The polystyrene-cross-copolymerized ethylene/styrene/diene copolymer serves as a compatibilizing agent for an ethylene/styrene/diene copolymer and a polystyrene, whereby the compatibility of this cross-copolymerization product is good, and it can have high mechanical properties (initial modulus of elasticity, hardness, breaking strength and elongation), and heat resistance. Depending upon the composition, this cross-copolymerization product shows a wide range of nature from an elastomer to a plastic. Further, it can have high transparency as well, by copolymerizing a polar monomer having a suitable refractive index to the cross chains, or by adjusting the composition of the copolymer obtained by the coordination polymerization, the cross-copolymer and the polystyrene.

An ethylene/styrene/diene type cross-copolymerization product wherein the cross chains are composed of a copolymer of styrene with a methacrylate, particularly methyl methacrylate (MMA), has particularly high transparency and depending upon the composition, can cover a wide rage of physical properties ranging from a transparent plastic to a transparent elastomer. Such a copolymer can be economically prepared, by adding MMA and, if necessary, a styrene monomer, to a coordination polymerization solution containing an ethylene/styrene/divinylbenzene copolymer and an unreacted styrene monomer, followed by radical polymerization by heating or by adding a radical polymerization initiator. It can also be prepared by dissolving an ethylene/styrene/divinylbenzene copolymer recovered from the coordination polymerization solution in styrene and MMA monomers, if necessary, adding a solvent, followed by radical polymerization in the same manner. The cross-copolymerization product is obtainable as a composition containing an ethylene/styrene/divinylbenzene copolymer, a styrene/MMA copolymer-crossed ethylene/styrene/divinylbenzene copolymer and a styrene/MMA copolymer not crossed, in an optional ratio.

Among cross-copolymerization products of the present invention prepared in the crossing step by anionic polymerization, those having anion-polymerizable diene units of e.g. butadiene or isoprene, as cross chains, have good crosslinking properties and are capable of forming cross-linkeded products having a high crosslinking degree by using a relatively small amount of a crosslinking agent, a crosslinking aid, etc. Heretofore, a good crosslinkable polymer has been obtained by copolymerizing a crosslinkable diene monomer at the time of polymerizing in one step by means of a coordination polymerization catalyst or the like. However, by such a method, it has been usually difficult to obtain a copolymer having a high diene content. According to the process of the present invention, in the coordination polymerization step, only a very small amount of a diene is employed, and in the crossing step, an optional amount of a crosslinkable diene may be added and copolymerized, whereby the amount of the diene to be copolymerized can optionally be controlled. In such a case, the diene content is from 0.01 mol % to 80 mol %, preferably from 0.5 mol % to 30 mol %, based on the entire polymer. Further, the copolymerization style of diene units in the cross chains may be any style such as an optional block structure such as diblock or triblock, a tapered block structure or a random structure.

Further, the cross-copolymerization product of the present invention may have a characteristic that the temperature dependency of the modulus of elasticity is small, by adjusting the composition. Namely, E' obtained from the viscoelasticity spectrum as measured at 1 Hz is within a range of from $2 \times 10^7$ Pa to $2 \times 10^9$ Pa at 0° C. and from $5 \times 10^6$ Pa to $1 \times 10^8$ Pa at 100° C. Preferably, it is within a range of from $5 \times 10^7$ Pa to $5 \times 10^8$ Pa at 0° C. and from $1 \times 10^7$ Pa to $1 \times 10^8$ Pa at 100° C. Or, the ratio of E' at 0° C.: E' at 100° C. is within a range of from 1:1 to 100:1, preferably within a range of from 1:1 to 10:1. Further, E' rapidly lowers at a temperature of about 110° C. or higher and becomes to be at most about $10^6$ Pa at 130° C. The cross-copolymer of the present invention can have suitable elongation, flexibility, good processability and a characteristic that the temperature dependency of the modulus of elasticity is small, at the same time.

The cross-copolymer or cross-copolymerization product of the present invention contains essentially no chlorine, whereby it is highly safe and has a merit in that a load to the environment is small at the time of disposal treatment, incineration or embedding treatment.

To the cross-copolymer or cross-copolymerization product of the present invention, additives such as a softening agent, a heat stabilizer, an antistatic agent, a weather resisting agent, an anti-aging agent, a filler, a colorant, a lubricant, an anti-fogging agent and a blowing agent, may be incorporated, as the case requires, within a range not to impair the purpose of the present invention. The cross-copolymer or cross-copolymerization product of the present invention can be suitably used as the following films, sheets, tubes or containers, and is also useful as floor materials, building materials, wall materials, wall papers, automobile interior materials, sealing materials such as packing materials and synthetic leathers.

Applications of the Cross-copolymer; Films, Sheets, Tubes

The cross-copolymer of the present invention has a high tensile modulus of elasticity, hardness, breaking strength and proper elongation, and therefore is useful as various packaging or packing films, containers, sheets or tubes.

The cross-copolymer having such transparency that the haze of a sheet having a thickness of 1 mm is at most 50%, preferably at most 30%, particularly preferably at most 10%, is useful particularly as a transparent film in view of its good mechanical properties (breaking strength, elongation, tensile modulus of elasticity, permanent elongation). Depending upon its composition, such a film is flexible and has good elongation recovery and therefore can be used as a single layer or multi-layer stretch packaging film excellent in strength. By optimizing the composition, it can be made to have physical properties, particularly tensile modulus of elasticity and cutting properties, close to soft polyvinyl chloride, and it can readily be adapted to an automatic packaging machine for a stretch film made of soft polyvinyl chloride, which has been heretofore commonly employed.

Further, among the films, one having a peak of tan δ in the viscoelasticity spectrum at a temperature of at least 80° C., preferably at least 90° C., particularly preferably at least 100° C. or having a value of E' being at least $10^7$ at a temperature of at least 100° C., is useful as a film mainly for food packaging, which can be used in an electric oven, since it has high heat resistance.

The present film also has a shrinking property and is useful also as a shrink packaging film. Further, among the present films, one having a tensile modulus of elasticity of preferably higher than 50 MPa, particularly preferably higher than 100 MPa, can be used as a packaging film or sheet. As such an example, a blister, a PTP (press through package) packaging sheet or a heat sealing film may, for example, be mentioned.

The thickness of the film, sheet or tube is not limited, but usually it has a thickness of at most 3 mm and at least 10 μm. Particularly, the film preferably has a thickness of at most 1 mm and at least 10 μm, preferably at most 200 μm and at least 10 μm. The film or sheet can be prepared by an optional molding method or production method known to those skilled in the art. Further, the film may have other polymer, elastomer, rubber or the like blended, as the case requires, or may be combined with other film such as an ethylene/vinyl acetate resin or polyolefin type resin film to have a multi-layer structure. Likewise, as the case requires, a stabilizer, an aging preventive agent, a light resistance-improving agent, an ultraviolet absorber, a plasticizer, a softening agent, a lubricant, a processing aid, a colorant, an antistatic agent, an antifogging agent, a blocking-preventive agent, a crystal nucleating agent, a blowing agent, etc., may be added. These additives may be used alone or in a combination of a plurality of them.

Further, in order to improve the physical properties of the cross-copolymerization product of the present invention, an optional amount of an olefin/styrene copolymer having an optional styrene content may be added to obtain a composition. Preferably, from 10 to 90 wt %, based on the entirety, of an olefin/styrene copolymer such as an ethylene/styrene copolymer, may be added. In such a case, the olefin may be the same or different from the olefin to be used in the cross-copolymer. Especially, a composition with an ethylene/styrene copolymer having a styrene content of from 1 to 50 mol %, preferably from 1 to 25 mol %, can be used as an elastomer having an initial modulus of elasticity, hardness, heat resistance and transparency suitable for the particular purpose, as the balance of the mechanical strength, heat resistance and cold resistance can be controlled, and it is useful, for example, as a stretch packaging film, a shrink packaging film, a sheet, a tube, various packaging materials or a container.

As described above, the cross-copolymerization product of the present invention or its composition has high mechanical properties. Namely, it has high flexibility and at the same time has a high initial modulus of elasticity, high temperature characteristics (heat resistance) which a conventional ethylene/styrene random or pseudo-random copolymer itself can hardly have simultaneously, and thus is very useful as a substitute for a soft or hard vinyl chloride resin.

Applications of the Cross-copolymerization Product; Resin Compositions

Now, applications of the cross-copolymerization product of the present invention will be described.

In the following description relating to the applications, "a cross-copolymerization product" is a concept including a pure "cross-copolymer".

The meanings of other terms to be used in the following description relating to the applications, are as follows.

Aromatic Vinyl Compound Type Resin

A homopolymer of an aromatic vinyl compound, and a copolymer of an aromatic vinyl compound with at least one monomer component copolymerizable therewith, wherein the aromatic vinyl compound content is at least 10 wt %, preferably at least 30 wt %. The aromatic vinyl compound monomer to be used for the aromatic vinyl compound type polymer includes styrene and various substituted styrenes such as p-methylstyrene, m-methylstyrene, o-methylstyrene, o-t-butylstyrene, m-t-butylstyrene, p-t-butylstyrene and α-methylstyrene, and further, a compound having a plurality of vinyl groups in one molecule, such as divinylbenzene, may also be mentioned. Further, a copolymer of a plurality of such aromatic vinyl compounds, may also be employed. The stereoregularity among mutual aromatic groups of the aromatic vinyl compound may be atactic, isotactic or syndiotactic.

The monomer copolymerizable with the aromatic vinyl compound includes butadiene, isoprene, other conjugated dienes, acrylic acid, methacrylic acid and amide derivatives or ester derivatives, maleic anhydride and its derivatives. The copolymerization mode may be any one of block copolymerization, tapered block copolymerization, random copolymerization and alternating copolymerization. Further, it may be one having the above aromatic vinyl compound graft-polymerized to a polymer made of the above-mentioned monomers, which contains at least 10 wt %, preferably at least 30 wt %, of the aromatic vinyl compound.

The above aromatic vinyl compound type polymer is required to have a weight average molecular weight of at least 30,000, preferably at least 50,000, as calculated as styrene, in order to show the performance as a practical resin.

The aromatic vinyl compound type resin to be used, may, for example, be isotactic polystyrene (i-PS), syndiotactic polystyrene (s-PS), atactic polystyrene (a-PS), rubber-reinforced polystyrene (HIPS), an acrylonitrile/butadiene/styrene copolymer (ABS) resin, a styrene/acrylonitrile copolymer (AS resin), a styrene/methacrylate copolymer such as a styrene/methyl methacrylate copolymer, a styrene/diene block/tapered copolymer (such as SBS, SIS), a hydrogenated styrene/diene block/tapered copolymer (such as SEBS, SEPS), a styrene/diene copolymer (such as SBR), a hydrogenated styrene/diene copolymer (such as hydrogenated SBR), a styrene/maleic acid copolymer, or a styrene/imidated maleic acid copolymer. Further, it is a concept including a petroleum resin.

Olefin Type Polymer

For example, low density polyethylene (LDPE), high density polyethylene (HDPE), linear low density polyethylene (LLDPE), isotactic polypropylene (i-PP), syndiotactic polypropylene (s-PP), atactic polypropylene (a-PP), a propylene/ethylene block copolymer, a propylene/ethylene random copolymer, an ethylene/propylene/diene copolymer (EPDM), an ethylene/vinyl acetate copolymer, polyisobutene, polybutene, a cyclic olefin polymer such as polynorbornene and a cyclic olefin copolymer such as an ethylene/norbornene copolymer, may be mentioned. It may be an olefin type resin co-polymerized with a diene such as butadiene or α-ω-diene, as the case requires.

The above olefin type polymer is required to have a weight average molecular weight of at least 10,000, preferably at least 30,000, as calculated as styrene, in order to show the performance as a practical resin.

Other Resins, Elastomers and Rubbers

A polyamide such as nylon, a polyimide, a polyester such as polyethylene terephthalate, polyvinyl alcohol, and a styrene type block copolymer such as SBS (styrene/butadiene block copolymer), SEBS (hydrogenated styrene/butadiene block copolymer), SIS (styrene/isoprene block copolymer), SEPS (hydrogenated styrene/isoprene block copolymer), SBR (styrene/butadiene block copolymer) or hydrogenated SBR, which is not in the scope of the above aromatic vinyl compound type resin, a natural rubber, a silicone resin, and a silicone rubber.

Fillers

Known fillers may be employed. As preferred examples, calcium carbonate, talc, clay, calcium silicate, magnesium carbonate, magnesium hydroxide, mica, barium sulfate, titanium oxide, aluminum hydroxide, silica, carbon black, wood powder and wood pulp may, for example, be mentioned. Further, glass fibers, known graphites or conductive fillers such as carbon fibers, may also be employed.

Plasticizers

Known plasticizers, such as paraffin type, naphthene type or aroma type process oils, mineral oil type softening agents such as liquid paraffin, castor oil, linseed oil, an olefin type wax, a mineral type wax and various esters, may be used.

The cross-copolymerization product of the present invention can be used as a composition with other resin. Such a composition may, for example, be a composition comprising an aromatic vinyl compound type polymer and a cross-copolymerization product, a composition comprising an olefin type resin and a cross-copolymerization product, or a composition comprising an aromatic vinyl compound type polymer, an olefin type resin and, as a compatibilizing agent, a cross-copolymerization product. Further, it may suitably be used as a composition with a filler or a plasticizer.

For the production of the polymer composition of the present invention, a suitable known blending method may be employed. For example, melt-mixing can be carried out by means of a single screw or twin screw extruder, a Banbury mixer, a plasto mill, a co-kneader or a heated roll. Prior to the melt mixing, it is advisable to uniformly mix the respective materials by means of e.g. a Henschel mixer, a ribbon blender, a super mixer or a tumbler. The melt mixing temperature is not particularly limited, but it is usually from 100 to 300° C., preferably from 150 to 250° C.

As molding methods for various compositions of the present invention, known molding methods such as vacuum molding, injection molding, blow molding or extrusion molding, may be employed.

Composition Comprising the Cross-copolymerization Product and an Aromatic Vinyl Compound Type Polymer The composition comprising the cross-copolymerization product and an aromatic vinyl compound type polymer according to the present invention has a composition comprising from 1 to 99 wt % of the cross-copolymerization product and from 99 to 1 wt % of an aromatic vinyl compound type resin. This composition can have a wide range of physical properties ranging from a plastic having high toughness to a soft elastomer depending upon the composition. Particularly, with a composition comprising from 1 to 50 wt % of the cross-copolymerization product and from 99 to 50 wt % of an aromatic vinyl compound type resin, it is useful as a plastic having high toughness, and with a composition comprising from 50 to 99 wt % of the cross-copolymerization product and from 50 to 1 wt % of an aromatic vinyl compound type resin, it is useful as an elastomer having a wide range of mechanical properties, particularly a high tensile modulus of elasticity.

For example, in order to improve the physical properties of the cross-copolymerization product of the present invention as an elastomer, an optional amount of polystyrene may be incorporated to obtain a composition. A composition containing from 50 to 99 wt %, based on the entirety, of polystyrene is useful as an impact resistant resin having a still higher modulus of elasticity, hardness and heat resistance. For example, the cross-copolymerization product composed of a polystyrene-cross-copolymerized ethylene/styrene/diene copolymer can be made to be a novel styrene type resin having impact resistance by combining it with polystyrene to form a composition. This composition has a characteristic that it is excellent in the surface gloss. Otherwise, by combining it with various styrene type resins (GP-PS, HI-PS, ABS, a styrene/acrylate copolymer, a styrene/methacrylate copolymer) to form a composition, it can be made into an impact resistant or transparent novel styrene type resin having well balanced physical properties. Especially, a composition combined with a styrene/methacrylate copolymer, such as a styrene/methyl methacrylate copolymer, has high transparency and can cover a wide range of physical properties ranging from a transparent plastic to a transparent elastomer depending upon the composition.

To this composition, the above-mentioned "other resins, elastomers and rubbers", a plasticizer, a filler or a stabilizer, an aging-preventive agent, a light resistance-improving agent, an ultraviolet absorber, a softening agent, a lubricant, a processing aid, a colorant, an antistatic agent, an anti-fogging agent, a blocking-preventive agent, a crystal nucleating agent, a blowing agent, etc., may be incorporated, as the case requires.

Composition Comprising the Cross-copolymerization Product and an Olefin Type Polymer The composition comprising the cross-copolymerization product and an olefin type polymer according to the present invention as a composition comprising from 1 to 99 wt % of the cross-copolymerization product and from 99 to 1 wt % of an olefin type resin, preferably a composition comprising from 1 to 50 wt % of the cross-copolymerization product and from 99 to 50 wt % of an olefin type resin. With this composition, it is possible to adjust the balance of mechanical strength of the polyolefin, and it is useful for an application of general purpose such as films or containers, or for automobile parts such as bumpers or instrument panels, or for housing parts for household products such as refrigerators or washing machines. Further, it is possible to improve the printability and tinting property of a polyolefin type resin.

Especially, the composition with polypropylene has an improved impact resistance and is excellent in the balance of various mechanical properties such as flexural strength and flexural modulus of elasticity. As compared with polypropylene having an olefin type elastomer incorporated as an impact improving agent, a decrease of the surface hardness is small i.e. it has a characteristic that the surface scratchability is low.

To this composition, the above-mentioned "other resins, elastomers and rubbers", a plasticizer, a filler or a stabilizer, an aging-preventing agent, a light resistance-improving agent, an ultraviolet absorber, a softening agent, a lubricant, a processing aid, a colorant, an antistatic agent, an anti-fogging agent, a blocking-preventive agent, a crystal nucleating agent, a blowing agent, etc. may be incorporated, as the case requires.

Composition Comprising an Aromatic Vinyl Compound Type Polymer, an Olefin Type Polymer and the Cross-copolymerization Product The cross-copolymerization product of the present invention can be suitably used as a compatibilizing agent for an aromatic vinyl compound type resin and an olefin type resin, or as a composition. When used as a compatibilizing agent or a composition, it is used in a composition comprising from 1 to 98 wt % of the cross-copolymerization product, based on the weight of the entirety, and from 99 to 2 wt % of the total of the olefin type resin and the aromatic vinyl compound type resin (provided that each of the olefin type resin and the aromatic vinyl compound type resin is at least 1 wt %). Preferably, it is used in a composition comprising from 1 to 50 wt % of the cross-copolymerization product, based on the weight of the entirety, and from 99 to 50 wt % of the total of the olefin type resin and the aromatic vinyl compound type resin (provided that each of the olefin type resin and the aromatic vinyl compound type resin is at least 1 wt %). Most preferably, it is used in a composition comprising from 1 to 30 wt % of the cross-copolymerization product, based on the weight of the entirety, and from 99 to 70 wt % of the total of the olefin type resin and the aromatic vinyl compound type resin (provided that each of the olefin type resin and the aromatic vinyl compound type resin is at least 10 wt %). To this composition, the above-mentioned "other resins, elastomers and rubbers", a plasticizer, a filler or a stabilizer, an aging-preventive agent, a light resistance-improving agent, a ultraviolet absorber, a softening agent, a lubricant, a processing aid, a colorant, an antistatic agent, an anti-fogging agent, a blocking-preventive agent, a crystal nucleating agent, a blowing agent, etc., may be incorporated, as the case requires.

Filler Composition

This composition has a composition comprising from 90 to 1 wt % of a filler and from 10 to 99 wt % of the cross-copolymerization product, preferably a composition comprising from 75 to 25 wt % of a filler and from 25 to 75 wt % of the cross-copolymerization product. Especially, the addition of the filler is effective for imparting flame retardancy, for improving the surface hardness and the modulus of elasticity, for imparting an antistatic property or for improving the heat resistance, and it is useful as a building material, a floor material or a wall material. To this composition, the above-mentioned "other resins, elastomers and rubbers", a plasticizer or a stabilizer, an aging-preventive agent, a light resistance-improving agent, an ultraviolet absorber, a softening agent, a lubricant, a processing aid, a colorant, an antistatic agent, an anti-fogging agent, a blocking-preventive agent, a crystal nucleating agent, a blowing agent etc., may be incorporated, as the case requires.

Thermoplastic Composition

This composition has a composition comprising from 50 to 1 wt % of a plasticizer and from 50 to 99 wt % of the cross-copolymerization product, preferably a composition comprising from 30 to 1 wt % of a plasticizer and from 70 to 99 wt % of the cross-copolymerization product. By the combination with a plasticizer, the molding processability can be improved, and it is possible to lower the glass transition temperature by DSC and to improve the physical properties at low temperatures.

Specifically, such a softening agent or a plasticizer may be added at the time of processing by an extruder or a kneader, or may preliminarily be incorporated to the copolymer at the time of preparation of an olefin/styrene/diene copolymer. To this composition, the above-mentioned filler or stabilizer, an aging-preventive agent, a light resistance-improving agent, an ultraviolet absorber, a softening agent, a lubricant, a processing aid, a colorant, an antistatic agent, an anti-fogging agent, a blocking-preventive agent, a crystal nucleating agent, a blowing agent, etc., may be incorporated, as the case requires.

In general, when a filler is added to a resin, the fluidity decreases, and the processability deteriorates. But, by an addition of a plasticizer, the deterioration of the processability can be prevented. With the composition comprising the cross-copolymerization product and a filler, it is possible to obtain a filler composition having a good balance of physical properties and processability by an addition of a plasticizer. In this case, preferred is a resin composition comprising from 30 to 98 wt % of the cross-copolymerization product and from 70 to 2 wt % of the total of the plasticizer and the filler, provided that each of the plasticizer and the filler is at least 1 wt %.

Cross-linked Product

The cross-copolymerization product of the present invention, preferably a cross-copolymerization product comprising an ethylene/styrene/divinylbenzene type cross-copolymer, a polymer having radical-crosslinkable monomer (such as butadiene or isoprene) units in cross chains, or an ethylene/styrene/divinylbenzene type cross-copolymer having, as cross chains, a (block, random or tapered random) copolymer of such a monomer with styrene, can be cross-linkeded by a known method. Such a product can be an elastomer having the mechanical properties at a high temperature, such as the breaking strength, the tensile modulus of elasticity and the compression permanent set, further improved.

The thermoplastic resin which can be blended to the present invention, may, for example, be an olefin type resin, an aromatic vinyl compound type resin, "other resins, elastomers and rubbers". In this case, it is preferred to crosslink a composition comprising from 1 to 100 wt %, preferably from 30 to 100 wt %, of the cross-copolymerization product.

The rubbers include, for example, natural rubber, isoprene rubber, butadiene rubber, styrene/butadiene rubber, chloroprene rubber and acrylonitrile/butadiene rubber.

Further, the cross-copolymerization product of the present invention may be blended with other resin such as a crystallizable olefin resin and subjected to so-called dynamic vulcanization (dynamically heat treated for crosslinking) in the presence of an organic peroxide or a phenol resin crosslinking agent.

As the crystallizable olefin resin to be used here, a homopolymer of a $C_{2-20}$ α-olefin or its copolymer, may be mentioned.

Specific examples of such a crystallizable olefin resin include ① an ethylene homopolymer by a low pressure method, a high pressure method, etc., ② a copolymer of ethylene with at least one vinyl monomer selected from e.g. other α-olefin, vinyl acetate and ethyl acrylate, ③ a propylene homopolymer, ④ a random copolymer of propylene with at most 10 mol % of other α-olefin, ⑤ a block copolymer of propylene with at most 30 mol % of an α-olefin, ⑥ a 1-butene homopolymer, ⑦ a random copolymer of 1-butene with at most 10 mol % of other α-olefin, ⑧ a 4-methylpentene-1 homopolymer, and ⑨ a random copolymer of 4-methylpentene-1 with at most 20 mol % of other α-olefin.

Among the above-described crystallizable olefin resins, an ethylene homopolymer, a propylene homopolymer or a propylene/α-olefin polymer having a propylene content of at least 50 mol %, is particularly preferred. The crystallizable olefin resins as mentioned above, may be employed alone or in combination. Further, it is possible to utilize a blend product of the cross-copolymerization products of the present invention which are different in the styrene content or the composition. These may be added prior to the dynamic vulcanization reaction and reacted together with the main components, or may be added after completion of the reaction to use them as a mere blend material.

The cross-linked product (inclusive of the dynamic vulcanizate) of the cross-copolymer of the present invention is superior in the mechanical properties such as the tensile modulus of elasticity and the breaking strength, as compared with a known ethylene/styrene copolymer, and the heat resistance and the mechanical properties at a high temperature are improved. Further, as compared with a conventional cross-linked product of a polyolefin type elastomer, it has characteristics superior in the printability, the mechanical strength or the compatibility with various resins.

To the cross-linked product of the cross-copolymerization product of the present invention, a crosslinking accelerator, a crosslinking accelerating adjuvant, a co-crosslinking agent, a dispersant, a softening agent, an adhesion-preventing agent, a scorch-preventing agent, a filler, a pigment, a blowing agent, etc., may be added in addition to the crosslinking agent.

As the crosslinking agent which can be used in the present invention, a peroxide crosslinking agent or a sulfur crosslinking agent may, for example, be mentioned. These crosslinking agents may be used alone or in combination as a mixture of a plurality of them. The peroxide crosslinking agent may, for example, be t-butyl peroxide, di-(t-butyl) peroxide, t-butyl peroxy-isopropyl carbonate, t-butylcumyl peroxide, t-butyl peroxybenzoate, dicumyl peroxide, cumene peroxide or benzoyl peroxide.

The amount of such a crosslinking agent is not particularly limited, but it is preferably from 0.01 to 10 parts by weight, per 100 parts by weight of the resin composition. If the amount of the crosslinking agent is small, the crosslinking tends to be inadequate. On the other hand, if the amount is excessive, an unreacted crosslinking agent will remain and will bring about deterioration of the physical properties, etc.

As the crosslinking accelerator which can be used in the present invention, a guanidine derivative, thiourea, a xanthate, a dithiocarbamate, an aldehyde ammonia compound, thiuram sulfide, a thiazole derivative or a sulfenamide compound may, for example, be mentioned. Specifically, N,N-diphenylguanidine, N,N-o-tolylguanidine, N,N-o-tolylguanidine, N,N-dibutylthiourea, N,N-diethylthiourea, zinc dibutylxanthogenate, zinc isopropylxanthogenate, sodium isopropylxanthogenate, zinc dimethyldithiocarbamate, zinc diethyldithiocarbamate, zinc dibutyldithiocarbamate, hexa methylenetetramine, acetaldehydeaniline, mercaptobenzothiazole, a sodium salt of mercaptobenzothiazole, tetramethylthiuram monosulfide, tetramethylthiuram disulfide, mercaptobenzothiazole, dibenzothiazyl disulfide, N-cyclohexyl-2-benzothiazole sulfenamide, N-oxydiethylene2-benzothiazole sulfenamide, a zinc compound or magnesium oxide may, for example, be mentioned.

The amount of such a crosslinking accelerator is not particularly limited, but it is preferably at most 10 parts by weight, per 100 parts by weight of the resin composition. If the amount is excessive, deterioration of various physical properties is likely to be brought about.

As the co-crosslinking agent which can be used in the present invention, divinylbenzene, sulfur, p-quinone dioxime, p,p-dibenzoylquinonedioxime, dinitrosobenzene, N-methyl-N'-4-dinitrosoaniline, ethylene glycol dimethacrylate, trimethylolpropane dimethacrylate or maleic anhydride, may, for example, be mentioned.

The amount of the co-crosslinking agent is not particularly limited, but it is preferably at most 20 parts by weight.

As the resin which can be blended to the cross-linked product of the present invention, the above-mentioned aromatic vinyl compound type resin or the olefin type resin may be mentioned, and a thermoplastic resin or thermosetting resin may, for example, be used without any particular limitation.

A method for producing the cross-linked product of the present invention is not particularly limited. However, Banbury mixer, Brabender, laboplasto mill, a kneader, a roll, a single screw extruder or a twin screw extruder may, for example, be mentioned. As the system, either a batch system or a continuous system may be employed. In order to uniformly mix the starting materials, it is also possible to carry out blending preliminarily by e.g. a Henschel mixer, a super mixer or a tumbler.

The kneading and the crosslinking may be carried out independently or may be carried out simultaneously (dynamic crosslinking method or dynamic vulcanization method).

The temperature range for such kneading and crosslinking processes is not particularly limited, but it is preferably from 50 to 350° C., more preferably from 100° C. to 280° C.

The molding method for the cross-linked product of the present invention is not particularly limited, but extrusion molding, injection molding, calendar-forming, compression molding, blow molding, foam molding or transfer molding, may, for example, be mentioned.

Applications of the cross-linked product of the cross-copolymerization product of the present invention are not particularly limited. However, exterior parts for automobiles, interior parts for automobiles, parts of household electrical products, foam materials, packaging containers, gaskets or sealing materials, may, for example, be mentioned.

The molded product of the present invention may be subjected to secondary processing, as the case requires.

As the secondary processing, mechanical processing, bonding, printing, coating, surface treatment or coating of e.g. an anti-fogging agent, may be mentioned.

Foamed Product

Further, the cross-copolymerization product of the present invention can be used preferably as a foamed product (foamed material). A known method may be employed for the method for producing a foam. Usually, the cross-copolymerization product of the present invention and a foaming agent (blowing agent), and if necessary, a crosslinking agent and other additives, are heated and melted, and heat-compressed while extruding, whereupon the pressure is reduced for foaming to obtain a foam. An addition of a blowing agent and, if necessary, a radical crosslinking agent, may be during dry blending prior to heating the polymer or may be after the heat melting. Such heat blending may be carried out by a known method using e.g. an extruder, a mixing machine or a blender. The crosslinking may be carried out by a method of using radiation (electron rays, γ rays, etc.), other than the method of adding the above crosslinking agent. As mentioned above, with the cross-copolymerization product of the present invention, the physical properties can be adjusted within a wide range, and with the foam made of the cross-copolymerization product, the physical properties can be adjusted within a wide range depending upon the particular application. For example, it is possible to present foam materials covering a wide range of physical properties from a relatively hard foam material such as polystyrene to a flexible foam material analogue made of polyurethane or polyolefin. Such foam materials can be prepared also from a material prepared by blending the above aromatic vinyl compound type resin, the olefin type resin, "other resins, elastomers and rubbers", etc. to the cross-copolymerization product. As such an example, a foam material made of a blend material combined with LLDPE or a polystyrene type resin, may be mentioned. In such a case, a foam made of a resin composition containing from 1 to 100 wt %, preferably from 30 to 100 wt %, of the cross-copolymerization product, is employed.

The method for producing the foamed product of the present invention is not particularly limited, but may be a known technique such as a method of adding a blowing agent such as an inorganic type or organic type chemical blowing agent or a physical blowing agent. The known technique relating to the foamed product is disclosed, for example, in "Plastic Form Handbook (Nikkan Kogyo Shinbunsha, published in 1973)".

As the inorganic type blowing agent, sodium bicarbonate, ammonium carbonate, ammonium bicarbonate, ammonium nitrite, an azide compound, sodium borohydride or a metal powder may, for example, be mentioned.

As the organic type blowing agent, azodicarbonamide, azobisformamide, azobisisobutylonitrile, barium azodicarboxylate, N,N'-dinitrosopentamethylenetetramine, N,N'-dinitroso-N,N'-dimethylterephthalamide, benzenesulfonylhydrazide, p-toluenesulfonylhydrazide, p,p'-oxybisbenzenesulfonylhydrazide or p-toluenesulfonylsemicarbazide may, for example, be mentioned.

As the physical blowing agent, a hydrocarbon such as pentane, butane or hexane, a halogenated hydrocarbon such as methyl chloride or methylene chloride, a gas such as nitrogen or air, or a fluorinated hydrocarbon such as trichlorofluoromethane, dichlorodifluoromethane, trichlorotrifluoroethane, chlorodifluoroethane or hydrofluorocarbon may, for example, be mentioned. Further, a microcapsule type blowing agent may, for example, be mentioned.

The amount of the chemical blowing agent is not particularly limited and is determined by the physical properties of the desired foamed product.

The foaming degree of the foamed product of the present invention is not particularly limited, but it is preferably from 1.01 to 300 times, more preferably from 1.1 to 50 times.

The state of bubbles present in the foamed product of the present invention is also not particularly limited and may be closed cells, continuous cells or a mixed state thereof. Likewise, the shape of bubbles is not particularly limited and may be spherical, dodecahedron, a non-specific shape, etc.

With respect to the foamed product of the present invention, crosslinking may be carried out as the case requires, by means of an electron beam, radiation, a chemical means such as a peroxide, etc. Further, at that time, a crosslinking adjuvant, a co-crosslinking agent, etc., may be used.

As examples of the oxide crosslinking agent, 1,1-bis-(t-butyloxy)-3,3,5-trimethylcyclohexane, dicumylperoxide, t-butylcumyl peroxide, n-butyl-4,4-bis(t-butylperoxy) valerate, α, α'-bis(t-butylperoxy)-m-diisopropylbenzene, 2,5-dimethyl-2,5-di(t-butylperoxy)hexane, benzoyl peroxide, m-toluoyl peroxide, t-hexylperoxy-2-ethyl hexanate, t-butyl peroxy-2-ethyl hexanate, t-butylperoxy isobutylate and 1-cyclohexyl-1-methylecylperoxy-2-ethyl hexanoate may, for example, be mentioned.

The amount of the crosslinking agent is not particularly limited, but it is preferably from 0.001 to 30 wt %.

As the crosslinking aid, divinylbenzene, diallylbenzene, divinylnaphthalene, polyethylene dimethacrylate, trimethylolpropane trimethacrylate, 1,2,4-triallyl trimellitate, 1,9-nonanediol dimethacrylate or a polyene compound, may, for example, be mentioned.

As the nucleating agent useful in the present invention, talc, calcium carbonate, magnesium carbonate, clay, natural silicic acid, titanium oxide, zeolite, aluminum hydroxide, carbon or the like, and an organic type nucleating agent such as a phosphoric acid type, phenol type or an amine type, may, for example, be mentioned.

As the thermoplastic resin which can be blended to the present invention, an olefin type resin, an aromatic vinyl compound type resin or a rubber may, for example, be mentioned.

The rubber may, for example, be natural rubber, isoprene rubber, butadiene rubber, styrene/butadiene rubber, chloroprene rubber or acrylonitrile/butadiene rubber.

To the foamed product of the present invention, a dispersant, a softening agent, a tacking-preventive agent, a filler or a pigment may, for example, be incorporated, as the case requires.

The production method for the foamed product of the present invention is not particularly limited. The method for producing the foamed product is not particularly limited, and a physical foaming method by gas injection, a foaming method by means of water or a chemical foaming method by means of a chemical blowing agent may, for example, be mentioned. Further, beads or the like may be permitted to contain a blowing agent and later used for foaming.

The method of molding the obtained foamed product into e.g. sheets or films is not particularly limited and may, for example, be extrusion molding, injection molding or blow molding. Further, the sheets or films may be formed into e.g. containers by e.g. thermoforming or compression forming. Further, embossing or printing may also be carried out. The cross-copolymerization product has a characteristic that it has excellent printability. The foamed product of the present invention can be used as building materials such as floor materials, wall materials and wall papers, interior and exterior products for automobiles, electrical parts, gaskets, cushion materials or containers for e.g. food products.

Applications of the Cross-copolymer Composition, the Cross-linked Product and the Foamed Product The cross-copolymer composition, the cross-linked product and the foamed product of the present invention are useful like the above cross-copolymerization product, as films, sheets, tubes, containers, etc. Particularly, they can be suitably used as building materials, wall materials, wall papers or floor materials. Such building materials, wall materials, wall papers or floor materials are disclosed, for example, in WO96/04419, DE-A-4324127, EP0661345 and WO98/10160. When used for such applications, they provide high mechanical strength and elongation, and the mechanical property such as the modulus of elasticity can be optionally changed from a region of a polyolefin analogue to a region of soft PVC or hard PVC, and further, they have high heat resistance and hardness, which are the reasons for their usefulness. It is valuable that the filler can be incorporated in a high content while maintaining the physical properties at a certain level, since this means that flame retardancy can be imparted when they are used in such applications.

Process for Producing an Olefin/diene Type Cross-copolymer

The olefin/diene type cross-copolymer of the present invention can be produced in accordance with the above-mentioned method for producing the olefin/styrene/diene type cross-copolymer.

In the olefin/diene type cross-copolymer, the amount of the diene to be used in the coordination polymerization step is at most 0.5 vol %, preferably at most 0.1 vol %, most preferably at most 0.05 vol % and at least 0.0005 vol %, as the concentration to the solvent in the polymerization solution. If the coordination polymerization step is carried out at a diene concentration higher than this, a crosslinking structure of the polymer tends to be substantially formed during the polymerization, whereby gelation or the like tends to take place, and the processability or physical properties of the cross-copolymerized polymer finally obtained via the crossing step tend to deteriorate, such being undesirable. Further, if the coordination polymerization step is carried out at a diene concentration higher than this, the concentration of the residual diene in the coordination polymerization solution tends to be high, and if such a polymerization solution is used as it is in the crossing step (anionic polymerization or the like), a cross-linked structure tends to form substantially, and the processability of the obtained cross-copolymer likewise tends to deteriorate. Further, the olefin/diene copolymer obtained in the coordination polymerization step preferably has a diene content of from 0.0001 mol % to 3 mol % and the rest being an olefin, preferably a diene content of from 0.001 mol % to less than 1 mol % and the rest being an olefin. If the diene content in the copolymer becomes higher, the processability of the cross-copolymerized polymer finally obtainable via the crossing step tends to deteriorate, such being undesirable.

As the coordination polymerization catalyst to be used in the coordination polymerization step for the production of the olefin/diene type cross-copolymer, a single site coordination polymerization catalyst to be used in the above-mentioned method for producing the olefin/styrene/diene type cross-copolymer, can be used. Preferably, a polymerization catalyst comprising a soluble transition metal catalyst represented by the above general formula (1) and the following general formula (2) and a cocatalyst, is employed.

Particularly preferably, a polymerization catalyst comprising a soluble transition metal catalyst represented by the above general formula (1) and a cocatalyst, is employed.

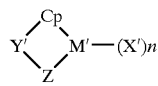

General Formula (2)

wherein Cp is a group selected from an unsubstituted or substituted cyclopentaphenanthryl group, an unsubstituted or substituted benzoindenyl group, an unsubstituted or substituted cyclopentadienyl group, an unsubstituted or substituted indenyl group or an unsubstituted or substituted fluorenyl group; Y' is a methylene group, a silylene group, an ethylene group, a germilene group or a boron residue, which has bonds to Cp and Z and which further has hydrogen or a $C_{1-15}$ hydrocarbon group, the substituents may be the same or different from one another, and Y' may have a cyclic structure; Z is a group containing nitrogen, oxygen or sulfur, which has a bond to Y' with a ligand coordinated to M' with nitrogen, oxygen or sulfur and which further has hydrogen or a $C_{1-15}$ substituent, M is zirconium, hafnium or titanium;

X' is hydrogen, a halogen, a $C_{1-15}$ alkyl group, a $C_{6-10}$ aryl group, a $C_{8-12}$ alkylaryl group, a silyl group having a $C_{1-4}$ hydrocarbon substituent, a $C_{1-10}$ alkoxy group or a dialkylamide group having a $C_{1-6}$ alkyl substituent; and n is an integer of 1 or 2.

For the crossing step in the production of the olefin/diene type cross-copolymer, the method shown in the crossing step in the above-mentioned process for producing the olefin/styrene/diene type cross-copolymer is applied as it is.

Physical Properties and Applications of the Olefin/diene Type Cross-copolymer

The olefin/diene type cross-copolymer has good low temperature properties and good compatibility with various resins although the mechanical property is inferior as compared with the corresponding olefin/styrene/diene type cross-copolymer. Therefore, it is useful for the applications of the above olefin/styrene/diene type cross-copolymer i.e. as a composition comprising a cross-copolymer and an aromatic vinyl compound, a composition of an olefin type polymer, or a composition comprising an aromatic vinyl compound type polymer and an olefin type polymer. Further, it can suitably be employed as the above-mentioned filler composition, the plasticizer composition, the cross-linked product or the foamed product.

Process for Producing a Syndiotactic Polystyrene-cross-copolymerized Ethylene/styrene/diene Cross-copolymer The present invention is further a process for producing a syndiotactic polystyrene-cross-copolymerized olefin/styrene/diene cross-copolymer or a syndiotactic polystyrene-cross-copolymerized olefin/diene cross-copolymer, characterized in that by a coordination polymerization step employing a polymerization catalyst comprising a transition metal compound represented by the above general formula (1) and the above cocatalyst, an olefin/styrene/diene copolymer, preferably an ethylene/styrene/diene copolymer, or an olefin/diene copolymer, preferably an ethylene/α-olefin/diene copolymer, is synthesized, and by dividedly adding or not adding a styrene monomer, a crossing step is carried out by coordination polymerization employing a catalyst for polymerization of syndiotactic polystyrene.

Particularly, a transition metal compound suitably employed for the process for producing a syndiotactic polystyrene-cross-copolymerized olefin/styrene/diene cross-copolymer or a syndiotactic polystyrene-crosscopolymerized olefin/diene cross-copolymer, is particularly preferably such that in the general formula (1) at least one of A and B is an unsubstituted or substituted cyclopentaphenanthryl group or an unsubstituted or substituted benzoindenyl group.

Further, it is most preferred that at least one or both of A and B are an unsubstituted or substituted benzoindenyl group.

By employing a polymerization catalyst comprising a transition metal compound represented by the above general formula (1) and a cocatalyst in the coordination polymerization step, it is possible to produce the olefin/styrene/diene copolymer or the olefin/diene copolymer with a remarkably high activity which is suitable for industrial application. Further, it is possible to copolymerize into the main chain a diene in an amount sufficient for crossing even at a low diene concentration in the polymerization solution, whereby the residual diene concentration in the obtainable polymer solution is very low and can be used as it is for the crossing step. Therefore, such is very economical as a production process. Since the residual diene concentration in the polymer solution is low, whereby the obtainable cross-copolymer can have good mechanical properties and processability as the crosslinking degree or the gel content is very low.

In the coordination polymerization step of the present invention, the amount of the diene preferably employed, is at most 1/300 (molar ratio), more preferably at most 1/500, of the amount of styrene to be used.

The types of monomers such as an olefin and a diene to be used, are the same as described above. Preferably, as the olefin, ethylene or a mixture of ethylene with a $C_{3-8}$ α-olefin, is employed, and as the diene, divinylbenzene is employed. The polymerization method for the coordination polymerization step or the crossing step (coordination polymerization) of the present invention may be the same as the one for the above-mentioned coordination polymerization step.

As the catalyst for the polymerization of syndiotactic polystyrene, to be used in the crossing step of the present invention, a known catalyst may be employed. For example, a transition metal compound and a cocatalyst as disclosed in JP-A-8-231622, or a titanium compound and a cocatalyst as disclosed in JP-A-8-151414, may be mentioned.

Preferably, a polymerization catalyst comprising a transition metal compound represented by the following formula and a cocatalyst, is employed.

LMX$_3$                                   General formula:

Here, L is a cyclopentadienyl group or a substituted cyclopentadienyl group having, as a substituent, a $C_{1-30}$ alkyl, alkylaryl or arylalkyl group wherein adjacent two carbon atoms may have a 4- to 8-membered ring. Here, the substituent for the cyclopentadienyl group may contain from 1 to 3 silicon, boron, nitrogen or phosphorus atoms, as the case requires. As preferred L, a cyclopentadienyl group, a pentamethylcyclopentadienyl group, an indenyl group, a 2-methylindenyl group, a 1,2,3-trimethylindenyl group, a 4-phenyl-indenyl group, a 2-methyl-4-phenyl-indenyl group, a 4,5-benzoindenyl group, a 2-methyl-4,5-benzoindenyl group or a 3-cyclopenta-[C]-phenanthryl group may, for example, be mentioned. As X, a halogen such as chlorine or fluorine, an alkoxy group such as a methoxy group, hydrogen, a dialkylamide group such as a dimethylamide group, or a benzyl group, may be mentioned. M is titanium, zirconium, hafnium, and titanium is preferably employed.

The content of styrene contained in the syndiotactic structure in the syndiotactic polystyrene-cross-copolymerized olefin/styrene/diene cross-copolymer or the syndiotactic polystyrene-cross-copolymerized olefin/diene cross-copolymer obtained by the present invention, is from 1 mol % to 99 mol %, preferably from 10 mol % to 95 mol %. Further, the molecular weight of the cross chain can be assumed from the analysis of the polymer not crossed, and it is at least 1,000 and at most 500,000, preferably at least 10,000 and at most 300,000, by the weight average molecular weight, and the molecular weight distribution is at most 5, preferably at most 3 and at least 1.2. The olefin/styrene/diene copolymer or the olefin/diene copolymer to be used, can be obtained likewise by means of a transition metal compound represented by the above general formula (1) and the above cocatalyst. The composition and the molecular weight of the olefin/styrene/diene copolymer to be used are also the same as the above-mentioned olefin/styrene/diene copolymer.

The syndiotactic polystyrene-cross-copolymerized or syndiotactic polystyrene-cross-copolymerized olefin/diene cross-copolymer obtained by the present invention is useful as a heat resistant elastomer or as a syndiotactic polystyrene having the impact resistance and toughness improved. Further, the impact resistance and toughness can be improved by adding it to a syndiotactic polystyrene.

EXAMPLES

Now, the present invention will be described with reference to Examples, but the present invention is by no means restricted to the following Examples.

The analyses of copolymers obtained in the respective Examples and Comparative Examples were carried out by the following methods.

The 13C-NMR spectrum was measured by using TMS as standard, by using a chloroform-d solvent or a 1,1,2,2-tetrachloroethane-d2 solvent, by means of α-500 manufactured by Nippon Denshi Kabushiki Kaisha. Here, the measurement using TMS as standard is the following measurement. Firstly, using TMS as standard, the shift value of the center peak of triplet 13C-NMR peaks of 1,1,2,2-tetrachloroethane-d2 was determined. The shift value of the triplet center peak of 1,1,2,2-tetrachloroethane-d2 was 73.89 ppm. Then, the copolymer was dissolved in 1,1,2,2-tetrachloroethane-d2, and the 13C-NMR was measured, whereby each peak shift value was calculated, based on the triplet center peak of 1,1,2,2-tetrachloroethane-d2 being 73.89 ppm. The measurement was carried out by dissolving the polymer in such solvent in an amount of 3 wt/vol %.

The 13C-NMR spectrum measurement for quantitive analysis of peak areas, was carried out by a proton gate decoupling method having NOE erased, by using pulses with a pulse width of 45° and a repeating time of 5 seconds as standard.

When the measurement was carried out under the same conditions except that the repeating time was changed to 1.5 seconds, the measured values of peak areas of the copolymer agreed to the values obtained in the case where the repeating time was 5 seconds, within measurement error.

The styrene content in the copolymer was determined by 1H-NMR. As the apparatus, α-500 manufactured by Nippon Denshi Kabushiki Kaisha and AC-250 manufactured by BRUCKER COMPANY, were employed. The determination was carried out by using a chloroform-d solvent or 1,1,2,2-tetrachloroethane-d2 and comparing the intensity of the proton peak attributable to a phenyl group (6.5 to 7.5 ppm) and the proton peak attributable to an alkyl group (0.8 to 3 ppm), measured by using TMS as standard.

The diene (divinylbenzene) content in the copolymer was measured by 1H-NMR.

As the molecular weights in Examples, weight average molecular weights as calculated as standard polystyrene, were obtained by means of GPC (Gel Permeation Chromatography).

A copolymer soluble in THF at room temperature, was measured by means of HLC-8020 manufactured by TOSOH CORPORATION using THF as the solvent.

A copolymer insoluble in THF at room temperature, was measured at 145° C. by means of HLC-8121 apparatus manufactured by TOSOH CORPORATION using o-dichlorobenzene as the solvent.

In a case where a plurality of overlapping peaks were observed in the CPC curve, peak separation was carried out.

The DSC measurement was carried out by using DSC 200 manufactured by Seiko Denshi K.K. in a nitrogen stream at a temperature raising rate of 10° C./min.

Press Molding and Tensile Test

By a heat-pressing method (temperature: 180° C., time: 3 minutes, pressure: 50 kg/cm²), a film (sheet) having a thickness of 1.0 mm was prepared and used.

Tensile Test

With respect to a film sample, in accordance with JIS K-6251, the film was cut into a shape of test piece No. 1, and measured at a tensile speed of 500 mm/min by means of AGS-100D model tensile tester manufactured by Shimadzu Corporation.

Otherwise, in accordance with JIS K-6251, the film was punched out in a JIS NO. 2 small size (½) test piece and measured at a tensile speed of 100 mm/min by means of Tensilon RTM-1T model tensile tester. The tensile modulus of elasticity (initial modulus of elasticity) was obtained from the inclination of the tangent line at an elongation of 0% in the stress/strain curve of the tensile test.

Permanent Elongation

The strain recovery in a tensile test was measured by the following method. The elastic recovery was obtained as follows:

Using the JIS No. 2 small size (½) test piece and with a chuck distance of 20 mm (L0), it was pulled by a tensile tester to a strain of 100% and maintained for 10 minutes, whereupon the stress was released (without repulsion) and the length after 10 minutes was represented by (L), and it was obtained from the following formula.

Elastic recovery=$\{1-(L-L0)/L0\}\times100$

Further, the permanent elongation was obtained from:

Permanent elongation=$\{(L-L0)/L0\}\times100$

Measurement of Dynamic Viscoelasticity

Using a dynamic viscoelasticity measuring apparatus (RSA-II, manufactured by Rheometrix Company), it was measured at a frequency of 1 Hz within a temperature range of from −120° C. to +150° C. (the measuring temperature range was slightly changed depending upon the properties of the sample). From the sheet having a thickness of 0.1 mm prepared by heat-pressing, a sample for measurement (3 mm×40 mm) was obtained.

Hardness

With respect to the hardness, durometer hardness of types A and D was obtained in accordance with the test method for durometer hardness of plastics as prescribed in JIS K-7215.

Vicat Softening Point

A sheet having a thickness of 4 mm was prepared by a heat pressing method, and a test specimen of 10 mm×10 mm was cut out. In accordance with JIS K-7206, it was measured under a load of 320 g at an initial temperature of 40° C. under a temperature raising condition of 50° C./hr using HDT & VSPT tester S3-FH, manufactured by Toyo Seiki.

Total Light Transmittance, Haze

With respect to the transparency, the total light transmittance and the haze were measured by means of turbidity meter NDH2000, manufactured by Nippon Denshoku Kogyo K.K. in accordance with the test method for optical characteristics of plastics as prescribed in JIS K-7105 with respect to a sheet having a thickness of 1 mm molded by heat pressing (temperature: 200° C., time: 4 minutes, pressure: 50 kg/cm²G).

Impact Resistance Test

A ¼ inch bar was molded and notched, and the impact resistance was obtained at 23° C. in accordance with the Izod impact test method of hard plastics as prescribed in JIS K-7110.

Flexural Modulus of Elasticity, Strength

A ¼ inch bar was molded, and they were obtained at 23° C. in accordance with the flexural test method of hard plastics as prescribed in JIS K-7203.

MFR

It was measured in accordance with a flow test method of thermoplastics as prescribed in JIS K-7210. The measurement was carried out at a test temperature of 200° C. under a test load of 5 kgf.

Comparative Samples

Comparative preparation examples of ethylene/styrene copolymers used as Comparative Examples and the analytical results are shown in Tables 1 and 2.

Divinylbenzene

The divinylbenzene used in the following polymerization is one having a purity of 80%, manufactured by Aldrich Company. In the following polymerization, when used in an amount of 2 ml per 200 ml of styrene, the amount of divinylbenzene will be 1/160 of the amount of styrene by molar ratio. When used in an amount of 1 ml per 800 ml of styrene, it will be 1/1,270.

TABLE 1

Comparative Preparation Examples (Preparation of styrene/ethylene copolymers)

| | Coordination polymerization step | | | | | |
|---|---|---|---|---|---|---|
| | Catalyst μmol | MAO mmol | St l | Solvent l | Et pressure MPa | Polymerization temperature ° C. | Polymerization time min |
| SE1 | 86 | M840 | 12 | 60 | 1.0 | 51–91 | 120 |
| SE2 | 76 | M840 | 5 | 64 | 1.0 | 39–71 | 120 |
| SE3 | 84 | M840 | 12 | 60 | 1.0 | 40–80 | 150 |
| SE4 | 84 | P84 | 18 | 54 | 0.4 | 40–45 | 180 |
| SE5 | 84 | P168 | 6 | 66 | 1.0 | 50–80 | 150 |
| SE6 | 84 | P84 | 12 | 60 | 1.0 | 40–69 | 240 |
| SE7 | 84 | P84 | 3 | 69 | 1.0 | 45–55 | 120 |
| SE8 | 84 | P84 | 3 | 69 | 1.0 | 50–70 | 90 |

Catalyst: rac-Dimethylmethylenebis(4,5-benzo-1-indenyl) zirconium dichloride

TABLE 2

Analytical results of comparative ethylene/styrene copolymers

|  | Obtained amount kg | Styrene content mol % | Mw /10⁴ | Mw/Mn | Glass transition temperature ° C. | Melting point ° C. |
|---|---|---|---|---|---|---|
| SE-1 | 10 | 24.5 | 16.8 | 2.3 | −16 | — |
| SE-2 | 15 | 15.0 | 11.8 | 2.7 | −27 | 67 |
| SE-3 | 12 | 26 | 16.9 | 2.5 | −21 | — |
| SE-4 | 7 | 43.2 | 40.3 | 1.9 | 3 | 28 |
| SE-5 | 10 | 15.8 | 19.4 | 2.3 | −28 | 62 |
| SE-6 | 5 | 26 | 24.9 | 2.2 | −20 | 42 |
| SE-7 | 5 | 5.2 | 24.8 | 2.1 | −22 | 102 |
| SE-8 | 30 | 7.0 | 20.7 | 1.9 | −26 | 91 |

SE8 is a mixture of 5 batches polymerized under the same conditions.

Preparation of Polystyrene-cross-copolymerized Ethylene/styrene/diene Copolymers Example 1

Using rac-dimethylmethylenebis(4,5-benzo-1-indenyl) zirconium dichloride as a catalyst, the preparation was carried out as follows.

Polymerization was carried out by means of an autoclave having a capacity of 10 l and equipped with a stirrer and a jacket for heating and cooling.

4600 ml of dried cyclohexane, 200 ml of dried styrene and 0.5 ml of divinylbenzene were charged and heated and stirred at an internal temperature of 50° C. About 100 l of nitrogen was bubbled to purge the interior of the system. 4.2 mmol of triisobutyl aluminum and 4.2 mmol, based on Al, of methyl alumoxane (PMAO-3A, manufactured by TOSOH AKZO K.K.) were added, the internal temperature was raised to 70° C., and ethylene was immediately introduced. After the pressure was stabilized at 0.6 MPa (5 kg/cm²G), from a catalyst tank installed above the autoclave, about 50 ml of a toluene solution having 8.4 μmol of rac-dimethylmethylenebis(4,5-benzo-1-indenyl) zirconium dichloride and 0.84 mmol of triisobutyl aluminum dissolved therein, was added to the autoclave. Polymerization (the coordination polymerization step) was carried out for 3 hours while maintaining the internal temperature at 70° C. and the pressure at 0.6 MPa.

Under the conditions shown in Table 1, polymerization was carried out by the same apparatus and procedure as in Example 1. When the consumption of ethylene reached about 80 l in a standard state (polymerization time: 30 minutes), ethylene was purged. A part (about 800 ml) of the polymerization solution was taken out, and 25 g of a styrene/ethylene/diene copolymer (polymer 2-A) was recovered by a methanol precipitation method.

Thereafter, from a port at an upper portion of the autoclave, a butyl lithium/hexane solution (manufactured by Kanto Kagaku K.K.) was introduced in an amount corresponding to 16.8 mmol of butyl lithium. The polymerization temperature was raised immediately to 70° C. and maintained for 30 minutes.

After completion of the polymerization, the obtained polymer solution was discharged into a vessel having a small amount of butanol preliminarily introduced, and then, introduced in small portions into a large amount of a methanol solution which was vigorously stirred, to recover the polymer. This polymer was dried in air at room temperature for one day, and then, dried under vacuum at 80° C. until weight change was no longer observed. 342 g of the polymer (polymer 1-B) was obtained.

Example 2

Under the conditions as shown in Table 1, polymerization was carried out by the same apparatus and procedure as in Example 1. When the consumption of ethylene reached about 80 l in a standard state (polymerization time: 30 minutes), ethylene was purged. A part (about 800 l) of the polymerization solution was taken out, and 25 g of a styrene/ethylene/diene copolymer (polymer 2-A) was recovered by a methanol precipitation method.

Thereafter, in the same manner as in Example 1, anionic polymerization was carried out as a result, 260 g of a polymer (polymer 2-B) was obtained.

Examples 3, 4 and 5

Under the conditions as shown in Table 1, polymerization was carried out by the same apparatus and procedure as in Example 1.

Example 6

Polymerization was carried out by means of a polymerizer having a capacity of 150 l and equipped with stirrer and a jacket for heating and cooling. 69 l of dried cyclohexane, 3 l of dried styrene and 7.5 ml of divinylbenzene were charged and heated and stirred at an internal temperature of 50° C. 84 mmol of triisobutylaluminum and 84 mmol, based on Al, of methylalumoxane (PMAO-3A, manufactured by TOSO AKZO K.K.) were added. Ethylene was immediately introduced, and after the pressure was stabilized at 1.0 MPa (9 kg/cm²G), from a catalyst tank installed above the polymerizer, about 100 ml of a toluene solution having 84 μmmol of catalyst rac-dimethylmethylenebis(4,5-benzo-1-indenyl)zirconium dichloride and 2 mmol of triisobutylaluminum dissolved therein, was added to the polymerizer. Heat generation started immediately. Therefore, cooling water was introduced into the jacket. The internal temperature rose to 55° C. at the maximum, but was thereafter maintained to be about 50° C., and polymerization was carried out for 50 minutes while maintaining the pressure at 1.0 MPa. After releasing the ethylene, the gas phase portion of the polymerizer was purged a few times with nitrogen. The internal temperature of the polymerizer was raised to about 70° C., and 3 l of styrene was added. From the tank installed above the polymerizer, a n-butyllithiumhexane solution was added in an amount corresponding to 210 mmol of butyl lithium to initiate anionic polymerization, and after stirring at 70° C. for 30 minutes, treatment was carried out by a crumb forming method as follows to recover the polymer.

The polymerization solution was introduced over a period of one hour into 300 l of vigorously stirred water heated to 97° C. and containing a dispersant (Pluronic: trade name). Then, after stirring at 97° C. for one hour, the hot water containing the crumb was put into cool water to recover the crumb. The crumb was dried in air at 50° C. and then vacuum deaerated at 60° C. to obtain 9.0 kg of a polymer having a good crumb shape having a size of a few mm (polymer 6-B).

Examples 7 and 8

Polymerization was carried out under the conditions as shown in Table 1 by the same apparatus and procedure as in Example 6.

Examples 9 to 16

Under the conditions as shown in Table 1, polymerization was carried out by the same apparatus and procedure as in Example 1. However, in Examples 10 and 12, butadiene was added in the crossing step, and in Example 16, isoprene was added for polymerization. The addition of such a diene was carried out after releasing ethylene and before the addition of butyl lithium. Further, in Example 15, rac-dimethylmethylene(4,5-benzo-1-indenyl)(1-indenyl) zirconium dichloride was employed instead of rac-dimethylmethylenebis(4,5-benzo-1-indenyl)zirconium dichloride.

In Examples 10, 11, 12, 13 and 15, sec-butyllithium was used, and in other Examples, n-butyllithium was used.

Comparative Examples 1 and 2

Under the conditions as shown in Table 1, polymerization was carried out in the same manner as in Example 1 except that no divinylbenzene was used.

Comparative Example 3

Using as a catalyst 16.8 mmol of dimethylsilanediyl (tetramethylcyclopentadienyl)(n-tert-butylamide)titanium dichloride and 16.8 mmol of methylalumoxane, polymerization was carried out in the same manner as in Example 1 under the conditions as shown in Table 1. However, under these conditions, polymerization did not substantially proceed for a polymerization time of 2.5 hours, whereby no crossing step was carried out.

The polymerization conditions of the respective Examples are summarized in Table 3.

TABLE 3

| | Polymerization conditions | | | | | | | | | | | | |
|---|---|---|---|---|---|---|---|---|---|---|---|---|---|
| | Coordination polymerization step | | | | | | | | | Crossing step (anionic polymerization step) | | | |
| Ex. | Catalyst $\mu$mol | MAO mmol | St ml | DVB ml | Solvent ml | Et pressure MPa | Polymerization temperature °C | Et consumption l | Polymerization time | Added monomer | Amount of BuLi mmol | Polymerization temperature °C | Polymerization time h |
| Ex. 1 | A 8.4 | P: 4.2 | 200 | 0.5 | C: 4600 | 0.6 | 70 | About 170 | 3 h | — | n 16.8 | 70 | 0.5 |
| Ex. 2 | A 8.4 | P: 4.2 | 200 | 0.5 | C: 4600 | 0.6 | 70 | About 80 | 30 min. | — | n 16.8 | 70 | 0.5 |
| Ex. 3 | A 8.4 | P: 4.2 | 200 | 1.0 | C: 4600 | 0.6 | 70 | About 80 | 50 min. | — | n 16.8 | 70 | 0.5 |
| Ex. 4 | A 8.4 | P: 8.4 | 800 | 1.0 | T: 4000 | 1.1 | 50 | About 200 | 1.5 h | — | n 18.9 | 50–70 | 1.0 |
| Ex. 5 | A 8.4 | P: 8.4 | 800 | 1.0 | T: 4000 | 1.1 | 50 | About 100 | 1.0 h | — | n 18.9 | 50–70 | 1.0 |
| Ex. 6 | A 84 | P: 84 | 3 l | 7.5 | C: 69 l | 1.0 | 50–55 | Unmeasured | 50 min. | St: 3 l | n 210 | 70 | 0.5 |
| Ex. 7 | A 84 | P: 84 | 6 l | 10 | C: 66 l | 1.0 | 50–72 | Unmeasured | 40 min. | St: 3 L | N 210 | 70 | 0.5 |
| Ex. 8 | A 84 | P: 84 | 6 l | 7.5 | C: 66 l | 1.0 | 55–60 | Unmeasured | 55 min. | — | n 210 | 70 | 0.5 |
| Ex. 9 | A 8.4 | P: 8.4 | 800 | 0.5 | T: 4000 | 1.1 | 50 | About 200 | 1 h 30 min. | — | n 18.9 | 70–90 | 0.5 |
| Ex. 10 | A 8.4 | P: 8.4 | 400 | 0.5 | T: 4400 | 0.6 | 50 | About 200 | 2 h | Bd: 15 g | s 18.9 | 70 | 0.5 |
| Ex. 11 | A 8.4 | P: 8.4 | 800 | 1.0 | T: 4000 | 1.1 | 50 | About 300 | 1 h 35 min. | — | s 18.9 | 70–110 | 0.5 |
| Ex. 12 | A 8.4 | P: 8.4 | 800 | 1.0 | T: 4000 | 1.1 | 50 | About 300 | 1.5 h | Bd: 15 g | s 21.0 | 70 | 0.5 |
| Ex. 13 | A 6.4 | P: 8.4 | 200 | 2.0 | C: 4600 | 0.6 | 70 | About 150 | 1 h 15 min. | — | s 25.2 | 70 | 0.5 |
| Ex. 14 | A 6.4 | P: 4.2 | 200 | 2.0 | C: 4600 | 0.6 | 70 | About 80 | 1 h | — | n 16.8 | 70 | 0.5 |
| Ex. 15 | B 8.4 | P: 8.4 | 800 | 1.0 | C: 4000 | 1.1 | 50 | About 200 | 1.5 h | — | s 18.9 | 70 | 0.5 |
| Ex. 16 | A 8.4 | P: 4.2 | 200 | 1.0 | C: 4600 | 0.6 | 70 | About 150 | 30 min. | IP: 100 ml | n 16.8 | 70 | 0.5 |
| Comp. Ex. 1 | A 8.4 | P: 8.4 | 800 | 0 | T: 4000 | 1.1 | 50 | About 200 | 1 h 3 min. | — | s 18.9 | 70 | 0.5 |
| Comp. Ex. 2 | A 6.4 | P: 4.2 | 200 | 0 | C: 4600 | 0.6 | 70 | About 80 | 1 h | — | n 16.8 | 70 | 0.5 |
| Comp. Ex. 3 | C 16.8 | P: 16.8 | 800 | 1 | T: 4000 | 1.1 | 70 | About 6 | 2.5 h | — | — | — | — |

Catalyst A: rac-dimethylenebis(4,5-benzo-1-indenyl)zirconium dichloride
Catalyst B: rac-dimethylene(4,5-benzo-1-indenyl) (1-indenyl)zirconium dichloride
Catalyst C: dimethylsilanediyl (tetramethylcyclopentadienyl) (n-tert-butylamide)titanium dichloride
MAO P: PMAO
M: MMAO
Solvent T: toluene
C: cylohexane
Butyllithium
n: n-butyllithium
s: sec-butyllithium
Bd: butadiene
IP: isoprene Table 4 shows the analytical results of the polymers obtained in the Respective Examples and Comparative Examples. In Table 4 and subsequent Tables, polymer A in each Example represents a copolymer obtained in the coordination polymerization step, and polymer B represents a copolymer obtained in the crossing step (anionic polymerization step).

TABLE 4

Polymerization results and analytical results of polymers

| Ex. | Polymer 1) | Obtained amount 2) | Styrene content (mol %) | Mw/10⁴ | Mw/Mn | Glass transition temperature ° C. | Melting point ° C. |
|---|---|---|---|---|---|---|---|
| Ex. 1 | 1-A | 45 g | 8.3 | Unmeasured | Unmeasured | −24 | 89.6 |
|  | 1-B | 342 g | 19.7 | Unmeasured | Unmeasured | −23* | 88.7 |
| Ex. 2 | 2-A | 25 g | 9.7 | 9.8 | 2.4 | −25 | 82.0 |
|  | 2-B | 260 g | 41.4 | Unmeasured | Unmeasured | −26* | 81.1 |
| Ex. 3 | 3-A | 30 g | 9.6 | 9.5 | 2.3 | −22 | 81.1 |
|  | 3-B | 240 g | 37.9 | 16.5 | 4.0 | −24, 95 | 82.8 |
|  |  |  |  | 3.4 | 1.05 |  |  |
| Ex. 4 | 4-A | 45 g | 12.2 | 19.2 | 1.9 | −20 | 71.7 |
|  | 4-B | 683 g | 38.3 | 22.8 | 2.5 | −20, 96 | 73.5 |
| Ex. 5 | 5-A | 17 g | 11.0 | 16.8 | 1.7 | −20 | 72.6 |
|  | 5-B | 474 g | 42.3 | 28.8 | 2.7 | −21, 102 | 71.8 |
|  |  |  | 11.5 | 1.1 |  |  |  |
| Ex. 6 | 6-B | 9.0 kg | 22.2 | Unmeasured | Unmeasured | −21* | 91.3 |
| Ex. 7 | 7-A | 60 g | 12.8 | 15.9 | 2.1 | −22 | 72.7 |
|  | 7-B | 10.0 kg | 37.2 | 25.0 | 2.8 | −22, 97 | 72.6 |
|  |  |  |  | 12.5 | 1.05 |  |  |
| Ex. 8 | 8-B | 8.0 kg | 16.6 | 23.1 | 2.4 | −24* | 74.0 |
|  |  |  |  | 3.0 | 1.36 |  |  |
| Ex. 9 | 9-b | 930 g | 37.7 | 29.1 | 2.7 | −24, 104 | 75.1 |
|  |  |  |  | 11.0 | 1.3 |  |  |
| Ex. 10 | 10-B | 637 g | 25.0 3) | 36.7 | 2.0 | −22 | 73.5 |
|  |  |  |  | 9.6 | 1.4 |  |  |
| Ex. 11 | 11-B | 1144 g | 34.0 | 27.0 | 2.4 | −22, 98 | 73.4 |
|  |  |  |  | 4.9 | 1.1 |  |  |
| Ex. 12 | 12-B | 1155 g | 29.5 4) | 21.0 | 2.5 | −24, * | 73.5 |
|  |  |  |  | 5.0 | 1.1 |  |  |
| Ex. 13 | 13-A | 38 g | 10.3 | 10.5 | 3.04 | −23 | 89.0 |
|  | 13-B | 329 g | 24.9 | 23.4 | 4.36 | −26* | 98.5 |
|  |  |  |  | 1.6 | 1.10 |  |  |
| Ex. 14 | 14-A | 32 g | 9.8 | 6.4 | 2.29 | −25 | 83.6 |
|  | 14-B | 242 g | 35.1 | 8.4 | 3.57 | −238 | 83.7 |
|  |  |  |  | 3.3 | 1.22 |  |  |
| Ex. 15 | 15-B | 730 g | 42.5 | 23.8 | 2.2 | −23, 98 | 72.0 |
|  |  |  |  | 9.8 | 1.1 |  |  |
| Ex. 16 | 16-B | 447 g | 14.0 5) | Unmeasured | Unmeasured | −24* | 103.2 |
| Comp. Ex. 1 | R1-B | 996 g | 35.2 | 15.6 | 2.6 | −22, 95 | 68.4 |
|  |  |  |  | 7.9 | 1.03 |  |  |
| Comp. Ex. 2 | R2-A | 35 g | 9.1 | 9.7 | 2.07 | −22 | 86.2 |
|  | R2-B | 235 g | 36.9 | 9.1 | 2.30 | −23* | 86.2 |
|  |  |  |  | 3.1 | 1.04 |  |  |

1) In the column for polymer, -A represents a polymer recovered by withdrawing a part of the polymerization solution obtained in the coordination polymerization step, and -B represents a polymer obtained in the crossing step.
2) In the column for obtained amount, the value of -A represents the amount of the polymer recovered by withdrawing a part of the polymer solution obtained from the coordination polymerization step, and the value of -B represents the weight of the polymer obtained in the crossing step.
3) Further, 3.0 mol % of butadiene units are contained (calculated from the 1H-NMR spectrum).
4) Further, 1.5 mol % of butadiene units are contained (calculated from the 1H-NMR spectrum).
5) Further, 9.14 mol % of butadiene units are contained (calculated from the 1H-NMR spectrum).
*The glass transition points corresponding to the styrene homopolymer is not distinct as it overlaps the melting point peak.

The styrene/ethylene/diene copolymer to be suitably used in the present invention is a copolymer which is capable of containing in an optional proportion, a typical structure represented by the following general formula as a structure led from styrene units and ethylene units. In addition to the following structure, it has a small amount of a structure led from diene units.

Peaks attributable to the following are observed in the methine and methylene carbon regions of the 13C-NMR spectrum. a to o are symbols representing carbons shown in the chemical structural formulae of the following Ka 17 to Ka 26.

Based on the triplet center peak (73.89 ppm) of tetrachloroethane-d3, peaks attributable to the following are observed.

(1) Alternating structure of styrene and ethylene

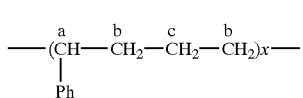
General Formula (3')

(wherein Ph represents a phenyl group, x represents the number of repeating units and is an integer of at least 2).

Namely, it shows a structure represented by the following formula, comprising methine carbons connected to Ph groups and three methylene carbons sandwiched therebetween.

In the following general formula, hydrogen atoms are omitted for simplification.

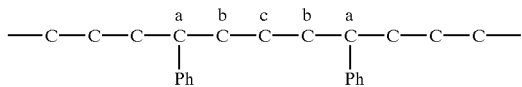

(2) Chain structure of ethylene

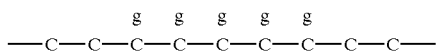

(3) Structure comprising an ethylene chain and 1 unit of styrene

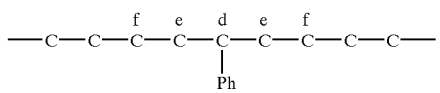

(4) Structure made of inversion (a tail-to-tail structure) of styrene units

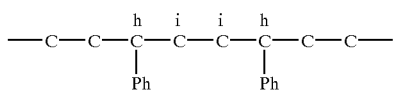

(5) Structure comprising ethylene units or ethylene chains and a head-to-tail chain of two styrene units

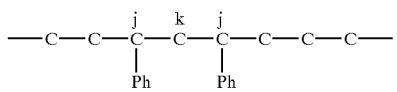

Or, a structure wherein styrene units and styrene/ethylene alternating structure units are randomly connected.
Styrene Unit

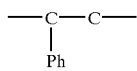

Alternating Structure Unit

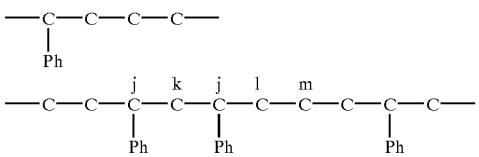

(6) Structure comprising a head-to-tail chain of at least 3 styrene units

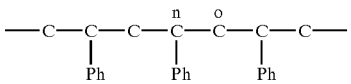

25.1 to 25.2 ppm (c)
36.4 to 36.5 ppm (b)
44.8 to 45.4 ppm (a)
29.4 to 29.9 ppm (g)
36.5 to 36.8 ppm (e)
27.2 to 27.6 ppm (f)
45.4 to 46.1 ppm (d, h)
34.5 to 34.9 ppm (i)
42.3 to 43.7 ppm (j)
43.7 to 44.5 ppm (k)
35.6 to 36.1 ppm (l)
24.0 to 24.9 ppm (m)
40.4 to 41.0 ppm (n)
43.0 to 43.6 ppm (o)

The foregoing peaks may have a certain shift, a microstructure of peaks or a peak shoulder due to an influence of the measuring conditions, a solvent, etc., a long distance effect from the adjacent structure or the styrene content.

Attribution of these peaks was made by various literatures such as Macromolecules, 13, 849 (1980), Stud. Surf. Sci. Catal., 517, 1990, J. Appl. Polymer Sci. 53, 1453 (1994), J. Polymer Phys. Ed., 13, 901 (1975), Macromolecules, 10, 773 (1977), European Patent 416815 and JP-A-4-130114, the 13C-NMR Inadequate method, the DEPT method and the peak shift prediction by the 13C-NMR data base STN (Specinfo).

The structural index $\lambda$ and the isotactic diad index m of styrene unit/ethylene unit alternating structure of the copolymer obtained in each Example were obtained in accordance with the above-mentioned formulae (i) and (ii), respectively.

Values $\lambda$ and m obtained in each Example are shown in Table 5. Further, the diene content obtained by 1H-NMR is shown.

TABLE 5

Analytical results of styrene/ethylene/diene copolymers

| Ex. | St content (mol %) | Divinylbenzene content (mol %) | $\lambda$ value | m value |
|---|---|---|---|---|
| Ex. 1 1-A | 8.3 | 0.04 ± 0.03 | 6 | >0.95 |
| Ex. 2 2-A | 9.7 | 0.05 ± 0.04 | 6 | >0.95 |
| Ex. 3 3-A | 9.6 | 0.10 ± 0.06 | 7 | >0.95 |
| Ex. 4 4-A | 12.2 | 0.05 ± 0.04 | 9 | >0.95 |
| Ex. 5 5-A | 11.0 | 0.08 ± 0.06 | 8 | >0.95 |

TABLE 5-continued

Analytical results of styrene/ethylene/diene copolymers

| Ex. | St content (mol %) | Divinylbenzene content (mol %) | λ value | m value |
|---|---|---|---|---|
| Ex. 7 7-A | 12.8 | 0.05 ± 0.04 | 7 | >0.95 |
| Ex. 13 13-A | 10.3 | About 0.1 | 7 | >0.95 |
| Ex. 14 14-A | 9.8 | About 0.1 | 6 | >0.95 |

Solvent fractionation of the polymer obtained by the crossing step of each Example or Comparative Example, was carried out. To remove a styrene homopolymer from the cross-copolymer (polymer B) obtained in each Example, the solvent fractionation was carried out in the following procedure. From 1 to 2 g of the crossed copolymer was accurately weighed and dissolved in a heated small amount or proper amount of toluene. The cross-copolymer of the Example can be substantially dissolved in toluene heated to about 100° C. This toluene solution was vigorously stirred and slowly dropwise added to cool acetone of 100 times in volume, and the acetone insoluble was collected by filtration and vacuum dried (at 80° C. until weight change was no longer observed), to obtain polymer C in each Example or Comparative Example, as the acetone insoluble fraction.

Figure 3:
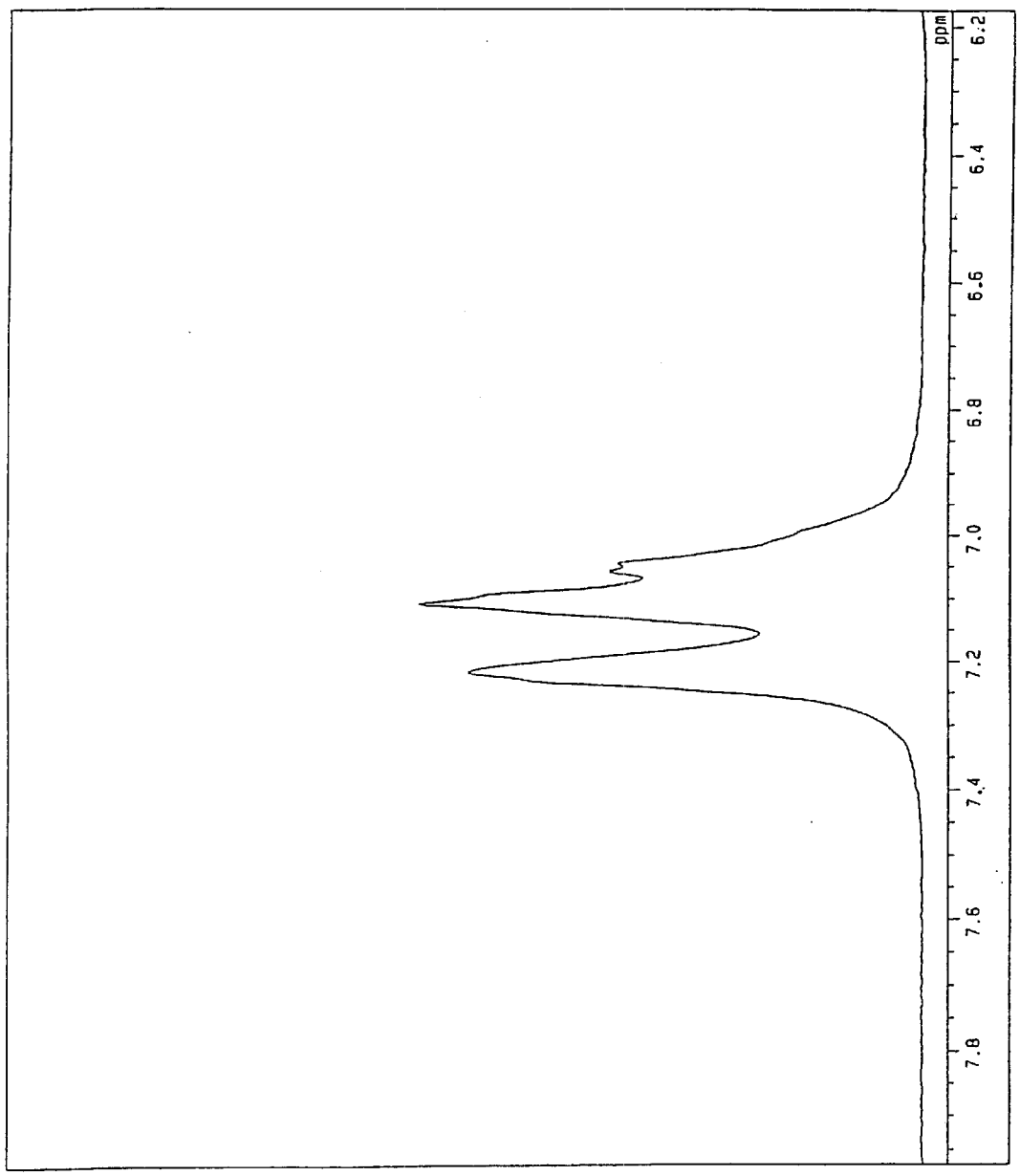
FIG. 3 is a 1H-NMR spectrum of 14-A obtained in the coordination polymerization step in Example 14.
Figure 4:
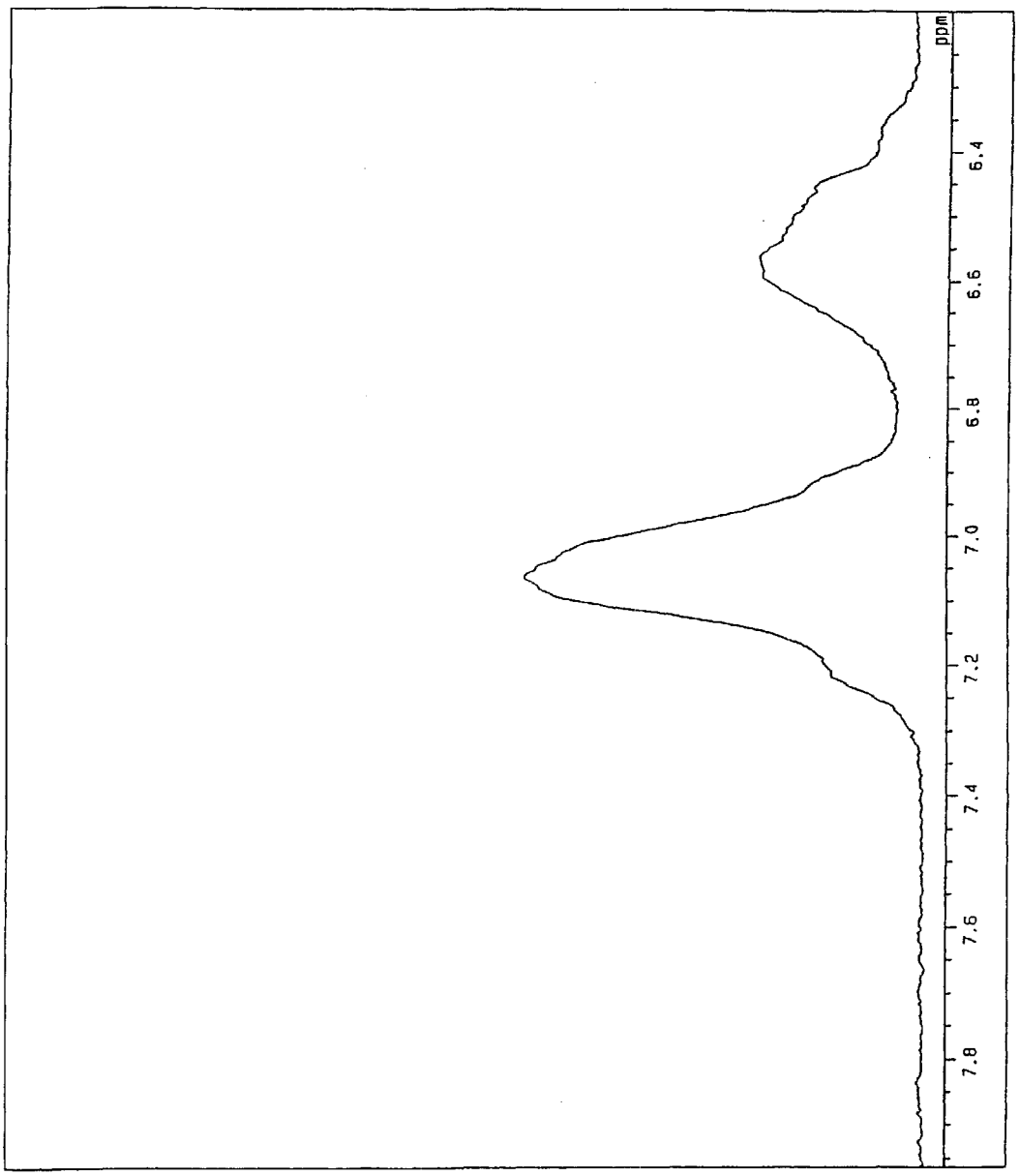
FIG. 4 is a 1H-NMR spectrum of 14-B obtained in the crossing step in Example 14.

In Table 4, the analytical results of polymer A obtained in the coordination polymerization step and polymer B obtained in the crossing step (anionic polymerization step), are shown. As compared with prior to the cross-copolymerization (polymer A), after the cross-copolymerization (polymer B), the styrene content is increased. The aromatic proton region in the 1H-NMR spectrum of polymer 14-A obtained in Example 14 is shown in FIG. 3, and that of polymer 14-B is shown in FIG. 4.

With polymer A, a proton peak attributable to styrene units of an ethylene/styrene/diene copolymer obtained by the coordination polymerization, is observed. However, with polymer B, a peak attributable to styrene units of an atactic polystyrene chain, is clearly observed additionally.

According to the GPC measurement, as compared with polymer A obtained in the coordination polymerization step, polymer B obtained in the crossing step has an increased molecular weight and molecular weight distribution. With polymer B obtained in the crossing step, a GPC peak with a narrow molecular weight distribution (1.0 to 1.3) is observed additionally. This indicates the presence of a polystyrene homopolymer by anionic living polymerization.

Further, in the DSC measurement, a glass transition point of from 90 to 100° C. attributable to an atactic PS chain structure, was observed.

In Table 6, the results of the solvent fractionation and the analytical results of the acetone-insoluble fractions (polymer 4-C, 7-C, 13-C and 14-C), are summarized.

A sharp GPC peak of an atactic PS homopolymer observed with polymer B obtained in the crossing step, has disappeared with polymer C, whereby it has been confirmed that polymer C which is an acetone-insoluble fraction obtained by the solvent fractionation, is a fraction which does not substantially contain a styrene homopolymer. Further, in polymer B obtained in the crossing step (polymer 4-B, 7-B, 13-B or 14-B), an acetone-soluble fraction (atactic polystyrene) was contained at a maximum of from 15 to 25 wt %.

TABLE 6

Analytical results of cross-copolymers after solvent fractionation

| Ex. | Polymer | Acetone insoluble fraction (wt.) | Styrene content (mol %) | $Mw/10^4$ | Mw/Mn | Glass transition temperature (° C.) | Melting point (° C.) |
|---|---|---|---|---|---|---|---|
| Ex. 4 | 4-C | 80–85 | 25.4 | 28.7 | 1.7 | −24 / 94 | 72.6 |
| Ex. 7 | 7-C | 79 | 28.1 | 26.9 | 2.1 | −20 / 95 | 70.9 |
| Ex. 13 | 13-C | 80 | 15.0 | 19.1 | 3.77 | −30* | 89.0 |
| Ex. 14 | 14-C | 75 | 24.7 | 11.5 | 3.33 | −22* | 87.0 |
| Comp. Ex. 2 | R2-C | 50 | 10.0 | Unmeasured | Unmeasured | Unmeasured | Unmeasured |

*The glass transition point corresponding to the styrene homopolymer overlaps the melting point peak and is not distinct.

Figure 5:
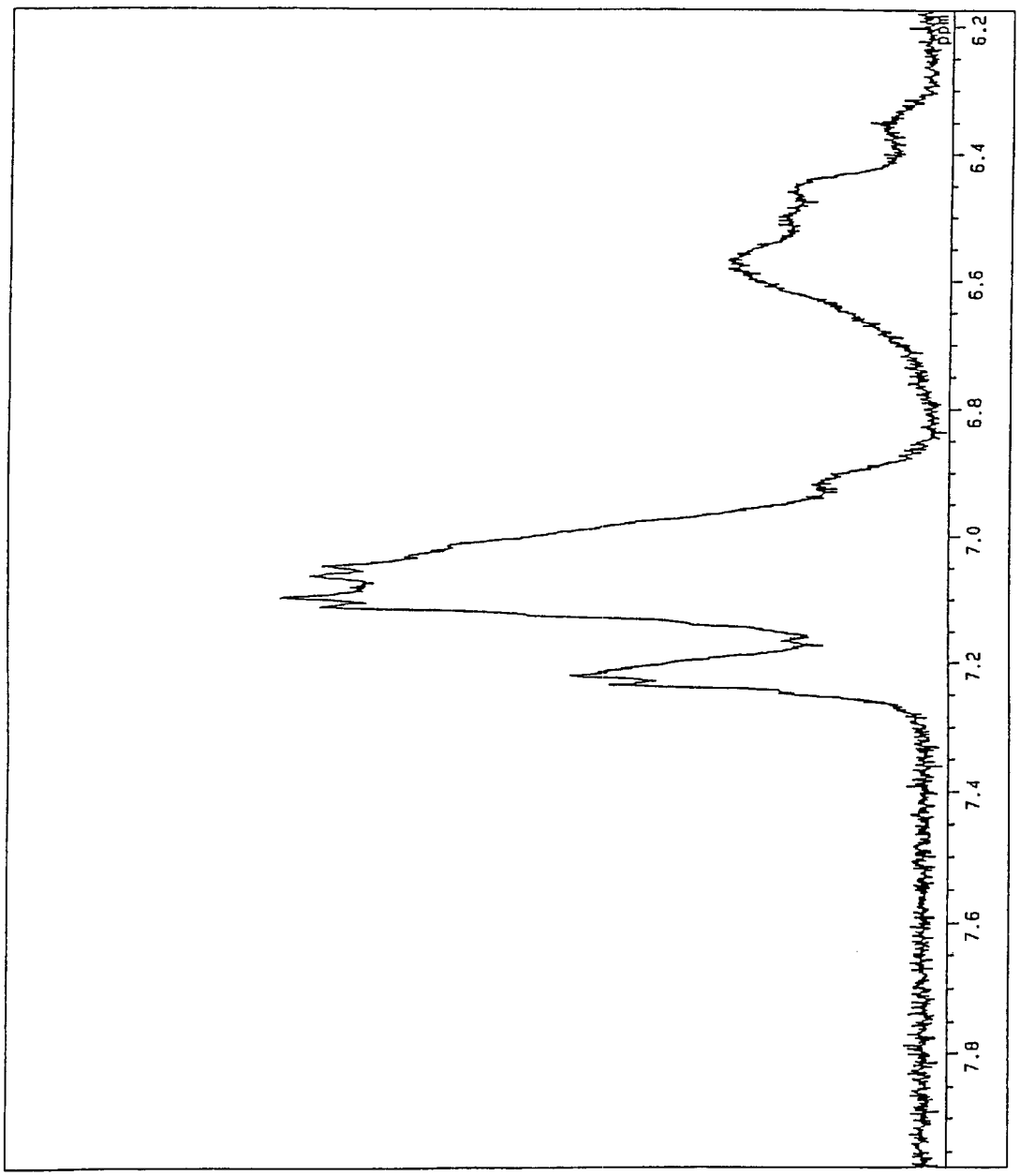
FIG. 5 is a 1H-NMR spectrum of an acetone-insoluble fraction 14-C obtained by a solvent fractionation in Example 14.

In FIG. 5, an aromatic proton region of the 1H-NMR spectrum of homopolymer 14-C obtained in Example 14, is shown. With polymer A, only a proton attributable to styrene units of a random copolymer obtained by the coordination polymerization, is observed, but with polymer C, like polymer B, a peak attributable to styrene units of a polystyrene chain, is clearly observed.

Further, polymer C has an increased molecular weight and molecular weight distribution as compared with the corresponding polymer A.

The styrene content of polymer C was measured by 1H-NMR. The styrene content is smaller than polymer B (in correspondence with the amount of the atactic polystyrene homopolymer removed by the solvent fractionation), but still increased as compared with the corresponding polymer A. This increased portion of the styrene content, corresponds to the amount of polystyrene in the crossed polymer chain.

From the molecular weights, the changes in the molecular weight distribution, the changes in the styrene content and the 1H-NMR spectrum, after the coordination polymerization, after the crossing step and after the solvent fractionation, formation of a cross-copolymer having polystyrene-cross-copolymerized to a styrene/ethylene/divinylbenzene, was confirmed.

Further, it is evident that B obtained in the crossing step in each Example is a composition (cross-copolymerization product) comprising a polystyrene homopolymer and a copolymer having polystyrene-cross-copolymerized to a styrene/ethylene/divinylbenzene copolymer.

Whereas, in Comparative Examples 1 and 2 wherein divinylbenzene was not employed in the coordination polymerization step, polymer B shows no significant increase of the molecular weight, as compared with polymer A. Although the styrene content of polymer B is increased, the styrene content of polymer C in the acetone insoluble fraction after the solvent fractionation, is substantially the same as polymer A, and polymer B obtained in the crossing step is considered to be a mixture of a styrene/ethylene copolymer and atactic polystyrene.

The composition of cross-copolymerization product 7-B was obtained from ethylene/styrene/divinylbenzene copolymer 7-A, cross-copolymerization product 7-B, the weight % of the acetone-insoluble fraction obtained by solvent fractionation, the styrene content of 7-C, the number average molecular weight and the weight balance (mass balance) obtained from the acetone-insoluble fraction, obtained in Example 7. As a result, 7-B was found to comprise 21 wt % (maximum) of atactic polystyrene, about 15 wt % of an ethylene/styrene/divinylbenzene copolymer and 64 wt % at the minimum of a polystyrene-cross-copolymerized ethylene/styrene/divinylbenzene cross-copolymer.

In Tables 7, 8 and 9, the test results of the physical properties of the polymers obtained in the respective Examples and Comparative Examples are shown.

TABLE 7

Physical properties of polymers

| Kind of | Ex. 1 | Ex. 2 | | Ex. 3 | Ex. 4 | Ex. 5 | Ex. 6 | Ex. 7 | Ex. 8 |
|---|---|---|---|---|---|---|---|---|---|
| polymer | 1-B | 2-B | 2-A | 3-B | 4-B | 5-B | 6-B | 7-B | 8-B |
| Breaking elongation (%) | 540 | 427 | 540 | 453 | 400 | 292 | 550 | 300 | 457 |
| Yield strength (MPa) | Yield point was not observed | Yield point was not observed | Yield point was not observed | Yield point was not observed | Yield point was not observed | Yield point was not observed | Yield point was not observed | Yield point was not observed | Yield point was not observed |
| Breaking strength (MPa) | 36.3 | 32.2 | 39.0 | 34.5 | 42.0 | 25.0 | 39.4 | 35.0 | 39.3 |
| Tensile modulus of elasticity (MPa) | 41.7 | 166 | 27.0 | 141 | 188 | 440 | 98.4 | 241 | 34.4 |
| 100% modulus (MPa) | 8.4 | 17.2 | 5.2 | 16.1 | 19.0 | 24 | 13.4 | 20.0 | 6.1 |
| 300% modulus (MPa) | 17.1 | 23.8 | 8.0 | 23.2 | 27.0 | — | 22.0 | 35.0 | 14.9 |
| Permanent elongation (%) | 25 | 65 | 15 | 65 | Unmeasured | Unmeasured | Unmeasured | Unmeasured | Unmeasured |
| Hardness (Shore A) | 90 | 96 | 88 | 95 | 97 | 99 | 97 | 97 | 97 |
| Hardness (Shore D) | 49 | 48 | 40 | 48 | 62 | 69 | 44 | 63 | 43 |
| Vicat softening point (° C.) | 88 | 93 | 83 | 92 | 101 | 104 | 98 | 96 | 87 |
| MFR (g/10 min.) 200° C. | 5.7 | 14.5 | 15.2 | 2.1 | 0.4 | 1.4 | 3.1 | 3.5 | 3.0 |

TABLE 8

Physical properties of polymers

| Kind of | Ex. 9 | Ex. 10 | Ex. 11 | Ex. 12 | Ex. 13 | | Ex. 14 | |
|---|---|---|---|---|---|---|---|---|
| polymer | 9-B | 10-B | 11-B | 12-B | 13-A | 13-B | 14-A | 14-B |
| Breaking elongation (%) | 320 | 400 | 300 | 410 | 577 | 440 | 617 | 313 |
| Yield strength (MPa) | Yield point was not observed | Yield point was not observed | Yield point was not observed | Yield point was not observed | Yield point was not observed | Yield point was not observed | Yield point was not observed | Yield point was not observed |
| Breaking strength (MPa) | 29.0 | 41.0 | 29.3 | 30.9 | 39.5 | 31.4 | 38.5 | 27.9 |
| Tensile modulus of elasticity | 241 | 113 | 165 | 66.2 | 21.7 | 58.9 | 25.2 | 256.4 |

TABLE 8-continued

Physical properties of polymers

| Kind of polymer | Ex. 9<br>9-B | Ex. 10<br>10-B | Ex. 11<br>11-B | Ex. 12<br>12-B | Ex. 13 | | Ex. 14 | |
|---|---|---|---|---|---|---|---|---|
| | | | | | 13-A | 13-B | 14-A | 14-B |
| (MPa) 100% modulus (MPa) | 21.3 | 15.6 | 18.9 | 10.0 | 5.1 | 8.7 | 4.6 | 16.1 |
| 300% modulus (MPa) | 20.5 | 24.7 | 26.9 | 16.7 | 8.1 | 18.8 | 7.8 | 25.7 |
| Permanent elongation (%) | Unmeasured | Unmeasured | Unmeasured | Unmeasured | 10 | 30 | 15 | 70 |
| Hardness (Shore A) | 98 | 96 | 98 | 97 | 87 | 94 | 88 | 98 |
| Hardness (Shore D) | 69 | 53 | 61 | 58 | 35 | 48 | 39 | 58 |
| Vicat softening point (° C.) | 105 | 78 | 88 | 94 | Unmeasured | Unmeasured | Unmeasured | Unmeasured |
| Haze (%) | 92.8 | 92.6 | 92.8 | 92.7 | 9.5 | 84.1 | 14.8 | 35.0 |
| MFR (g/10 min.) 200° C. | 5.3 | 0.3 | 8.5 | 3.6 | Unmeasured | Unmeasured | Unmeasured | Unmeasured |

TABLE 9

Physical properties of polymers

| Kind of polymer | Comp. Ex. 1<br>R1-B | Comp. Ex. 2<br>R2-B | Comp. Ex. 3<br>SE-6 | Comp. Ex. 4<br>SE-5 | Comp. Ex. 5<br>Blend 1 | Comp. Ex. 6<br>Blend 2 |
|---|---|---|---|---|---|---|
| Breaking elongation (%) | 31.4 | 28 | 763 | 723 | 82 | 130 |
| Yield strength (MPa) | Yield point was not observed | Yield point was not observed | Yield point was not observed | Yield point was not observed | Yield point was not observed | Yield point was not observed |
| Breaking strength (MPa) | 11.9 | 6.9 | 6.8 | 33.3 | 8 | 15 |
| Tensile modulus of elasticity (MPa) | 242 | 216 | 3 | 7.1 | 81 | 218 |
| 100% modulus (MPa) | — | — | 1.3 | 2.7 | — | 14 |
| 300% modulus (MPa) | — | — | 1.7 | 4.5 | — | — |
| Hardness (Shore A) | 98 | 98 | 60 | 78 | Unmeasured | Unmeasured |
| Hardness (Shore D) | 66 | 51 | 16 | 25 | 51 | 50 |
| Vicat softening point (° C.) | 95 | Unmeasured | 50 | 65 | Unmeasured | Unmeasured |
| MFR (g/10 min.) 200° C. | 15.7 | Unmeasured | | | Unmeasured | Unmeasured |

Comparative Example 5 Blend 1: 50 wt % of ethylene/styrene copolymer (SE-1) and 50 wt % of polystyrene were kneaded by Brabender.
Comparative Example 6 Blend 2: 50 wt % of ethylene/styrene copolymer (SE-2) and 50 wt % of polystyrene were kneaded by Brabender.

It is evident that with polymer B (cross-copolymerization product) obtained in the crossing step, the initial modulus of elasticity, 100% and 300% modulus, Shore hardness and Vicat softening point (heat resistance) of the polymer are remarkably improved as compared with polymer A (ethylene/styrene/diene copolymer) obtained in the coordination polymerization step. In Examples 4 and 7 wherein the amount of divinylbenzene used, was optimized, the mechanical strength (breaking strength) was also improved, and the elongation also shows a value of at least 300%.

Polymer C (acetone-insoluble fraction) was molded by heat pressing (180° C., 50 kg/cm$^2$) to prepare a film having a thickness of from 0.1 to 0.2 mm. This film was cut into No. 1 test piece shape, whereupon the tensile test was carried out in the same manner. The results were compared with polymer A obtained in the coordination polymerization step and with the copolymer and polymer obtained in the crossing step (Table 10).

The mechanical strength can not simply be compared, since the measuring method (the thickness and the shape of the test piece) is difference from the case of polymers A and B. However, it is evident that it shows a high tensile modulus of elasticity and shows an elongation of a high value of at least 200%, as compared with Comparative Examples or polymer A obtained in the coordination polymerization step. Since the sample was a film, the Vicat softening point was not measured. However, polymer 4-C or 7-C shows a high Tg (90 to 100° C.) attributable to a polystyrene structure of cross chains, whereby it is evident that the heat resistance is improved.

Further, particularly, 14-B obtained in Example 14 has relatively good transparency.

Whereas, polymer B obtained in Comparative Example 1 or 2 shows remarkably low breaking strength or elongation.

Further, a mixture of an ethylene/styrene copolymer with polystyrene, likewise has remarkably low breaking strength and elongation.

In the case of an ethylene/styrene copolymer obtained in a Comparative Preparation Example, the elongation is good, but the tensile modulus of elasticity is low, and also the breaking strength is low depending upon the composition. Further, the hardness and the Vicat softening point (heat resistance) are low.

small, crosslinking of diene units of the copolymer is suppressed to an extremely low level during the coordination polymerization, whereby formation of the gel component is suppressed. Further, also in the following anionic polymerization step, formation of a gel content or a crosslinking structure by the anionic polymerization will be suppressed as the amount/concentration of the diene is low. Namely, as the for mation of the gel content in the above coordination polymerization step and the anionic polymerization step is suppressed to an extremely low level, good moldability can be obtained.

In accordance with ASTM D-2765-84, the gel content of polymer B obtained in the crossing step was measured. Namely, accurately weighed 1.0 g of a polymer (a molded product having a diameter of about 1 mm and a length of about 3 mm) was enclosed in a 100 mesh stainless steel net bag and accurately weighed. This was extracted in boiling xylene for about 5 hours, whereupon the net bag was recovered and dried under vacuum at 90° C. for 10 hours. After cooling sufficiently, the net bag was accurately weighed, and the amount of the polymer gel was calculated by the following formula.

Gel amount=Weight of polymer remaining on the net/Weight of initial polymer×100

The results are shown in Table 11. In each case, the gel content was 0% (measurable lower limit: 0.1% or less),

TABLE 10

Physical properties of polymers after solvent fractionation

| | Example 4 | | | Example 7 | | |
|---|---|---|---|---|---|---|
| Kind of polymer | 4-A Polymer obtained in the coordination polymerization step | 4-B Polymer obtained in the crossing step | 4-C Solvent fractionated polymer (Acetone insoluble content) | 7-A Polymer obtained in the coordination polymerization step | 7-B Polymer obtained in the crossing step | 7-C Solvent fractionated polymer (Acetone insoluble content) |
| Breaking elongation (%) | 520 | 400 | 283 | 560 | 300 | 233 |
| Yield strength (MPa) | Yield point was not observed | Yield point was not observed | Yield point was not observed | Yield point was not observed | Yield point was not observed | Yield point was not observed |
| Breaking strength (MPa) | 26.0 | 42.0 | 24.7 | 31.0 | 35.0 | 23.3 |
| Tensile modulus of elasticity (MPa) | 13.7 | 188 | 101 | 12.1 | 241 | 41.9 |
| 100% modulus (MPa) | 4.0 | 19.0 | 17.0 | 3.3 | 20.0 | 13.0 |
| 300% modulus (MPa) | 7.5 | 27.0 | — | 8.0 | 28.0 | — |
| Vicat softening point (° C.) | 72 | 101 | Unmeasured | 73 | 96 | Unmeasured |

Further, the cross-copolymerization product (composition comprising a cross-copolymerized styrene/ethylene/diene copolymer and a homopolymer of polystyrene) obtained in the present invention shows good processability (MFR, the MFR as measured under a load of 5 kg at 200° C. is at least 0.2 g/10 min). This is attributable to the fact that the coordination polymerization catalyst used in the present invention is capable of copolymerizing the diene at a high efficiency, whereby sufficient crossing proceeds at a very low level of the amount of the diene used. It is considered that as the amount/concentration of the diene remaining in the coordination polymerization solution is sufficiently which indicates extremely low gel contents and crosslinking degrees of the cross-copolymers of the present invention.

TABLE 11

| | Gel content | |
|---|---|---|
| Example | | Gel content |
| Example 1 1-B | | 0% |
| Example 3 3-B | | 0% |
| Example 5 5-B | | 0% |

TABLE 11-continued

Gel content

| Example | | Gel content |
|---|---|---|
| Example 6 | 6-B | 0% |
| Example 7 | 7-B | 0% |
| Example 8 | 8-B | 0% |
| Example 9 | 9-B | 0% |

Figure 6:
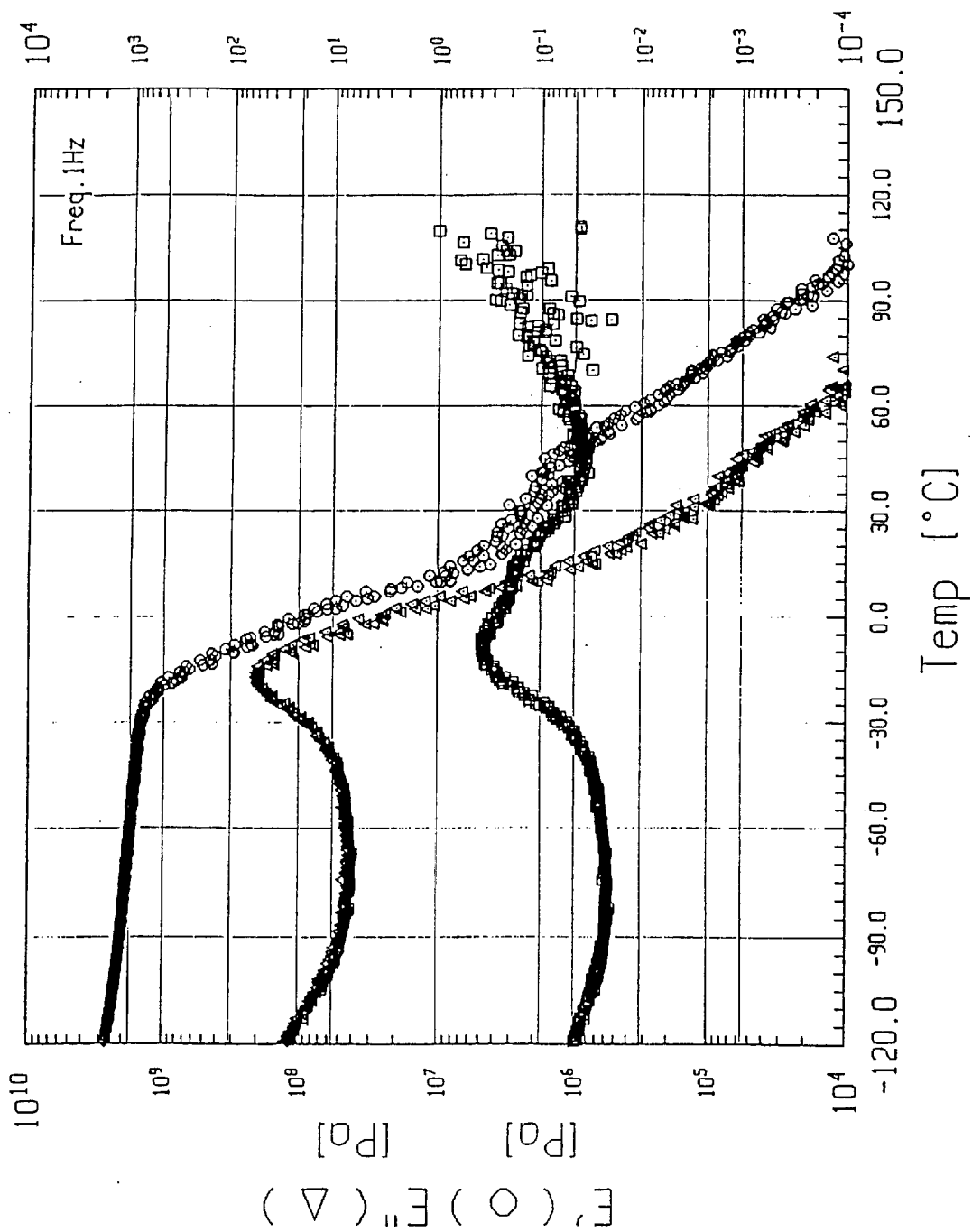
FIG. 6 is a viscoelasticity spectrum of 14-A obtained in the coordination polymerization step in Example 14.
Figure 7:
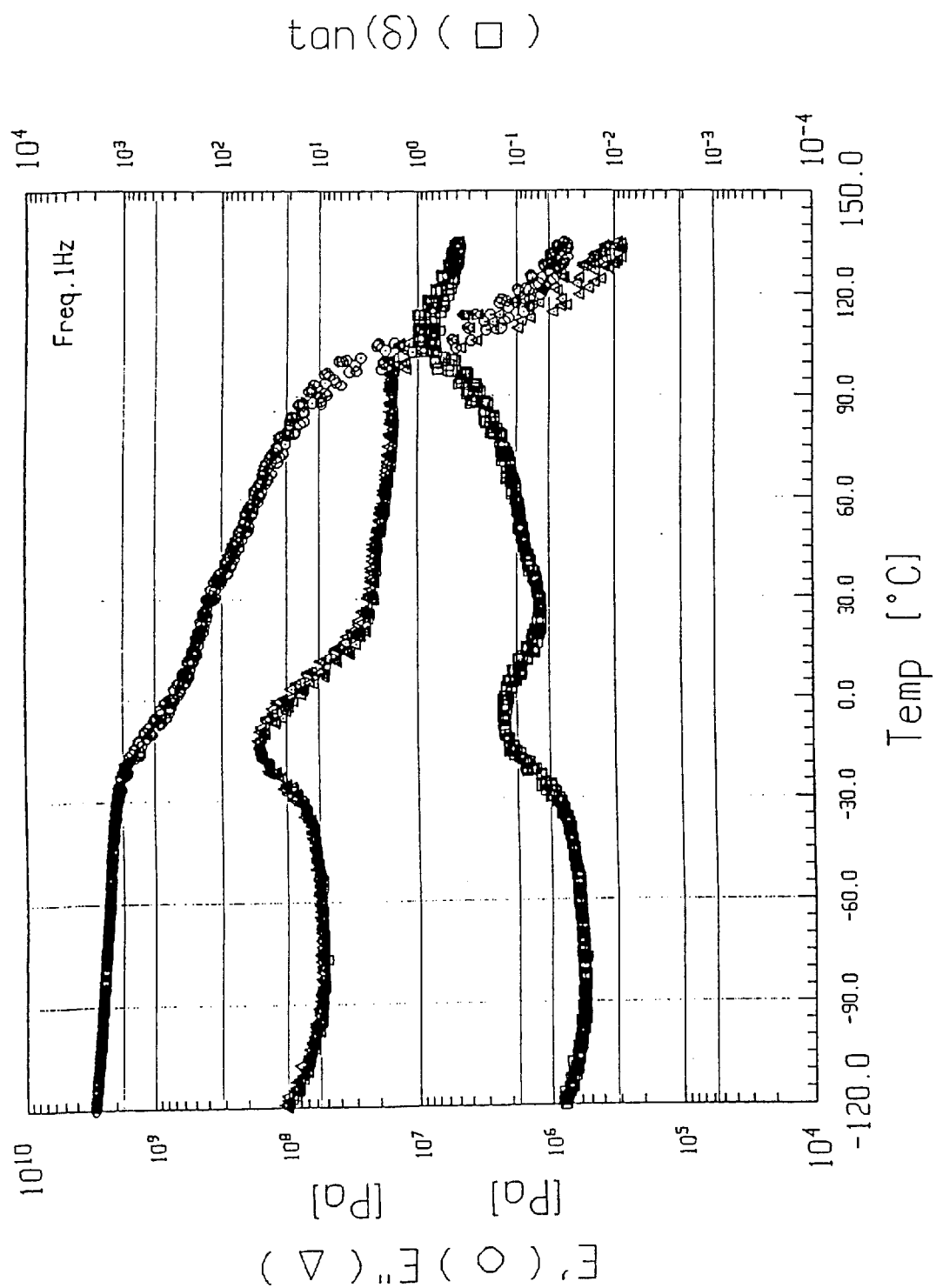
FIG. 7 is a viscoelasticity spectrum of 14-B obtained in the crossing step in Example 14.
Figure 8:
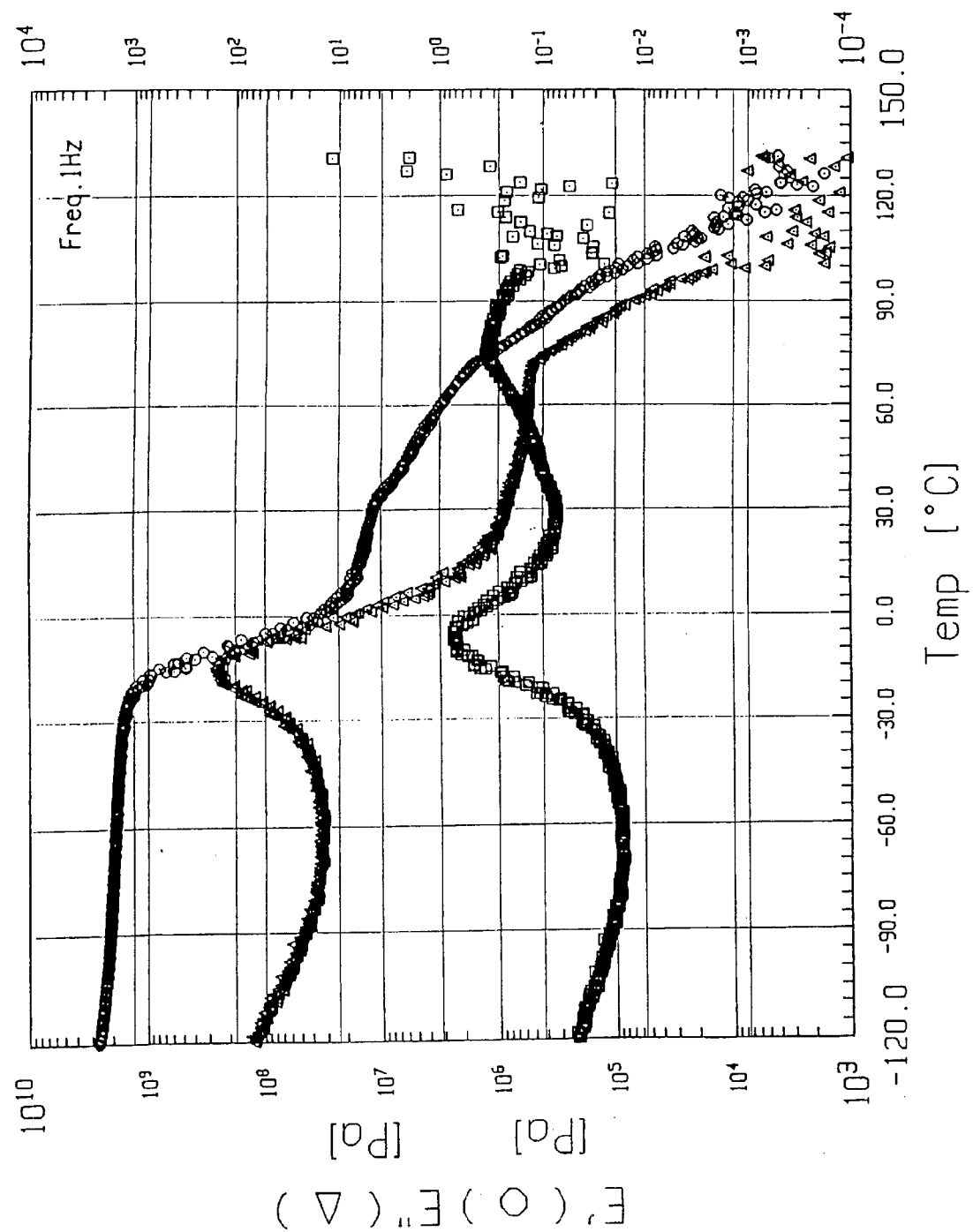
FIG. 8 is a viscoelasticity spectrum of 7-A obtained in the coordination polymerization step in Example 7.
Figure 9:
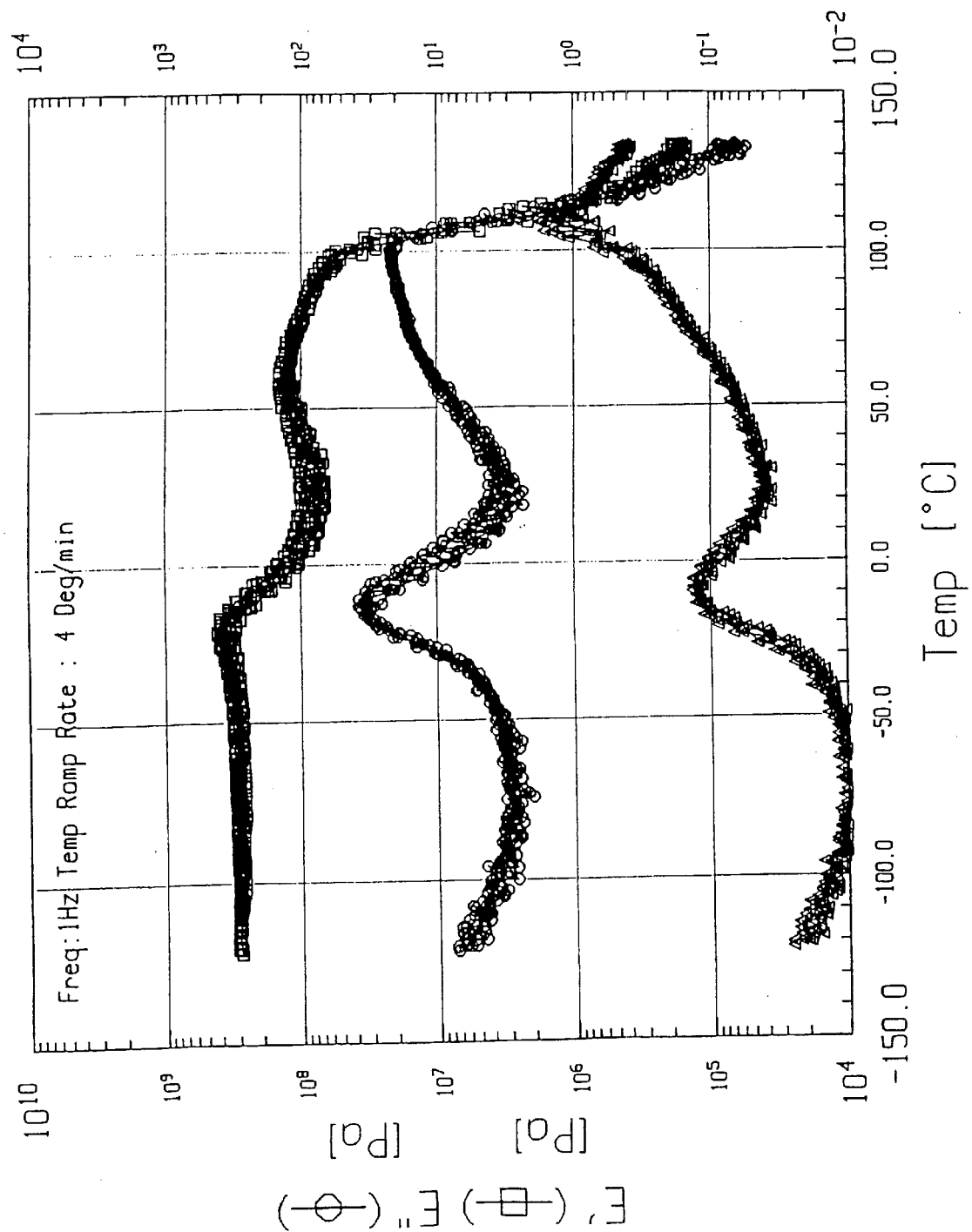
FIG. 9 is a viscoelasticity spectrum of 7-B obtained in the crossing step in Example 7.

FIG. 6 shows the viscoelasticity spectrum of 14-A obtained in Example 14, and FIG. 7 shows the viscoelasticity spectrum of 14-B obtained in Example 14. Further, FIG. 8 shows the viscoelasticity spectrum of 7-A obtained in Example 7, and FIG. 9 shows the viscoelasticity spectrum of 7-B obtained in Example 7. It is evident that by the cross-copolymerization, E' and E" values at from −20 to 100° C. are remarkably improved, and the high temperature mechanical properties are improved. Further, the polymers have a characteristic that E' takes substantially a constant value from −10° C. to 100° C. Especially, with 7-B, E' is within a range of from $5\times10^7$ Pa to $5\times10^8$ Pa at 0° C. and within a range of from $1\times10^7$ Pa to $1\times10^8$ Pa at 100° C., and thus this is a polymer wherein the change of E' due to the temperature is small.

Figure 10:
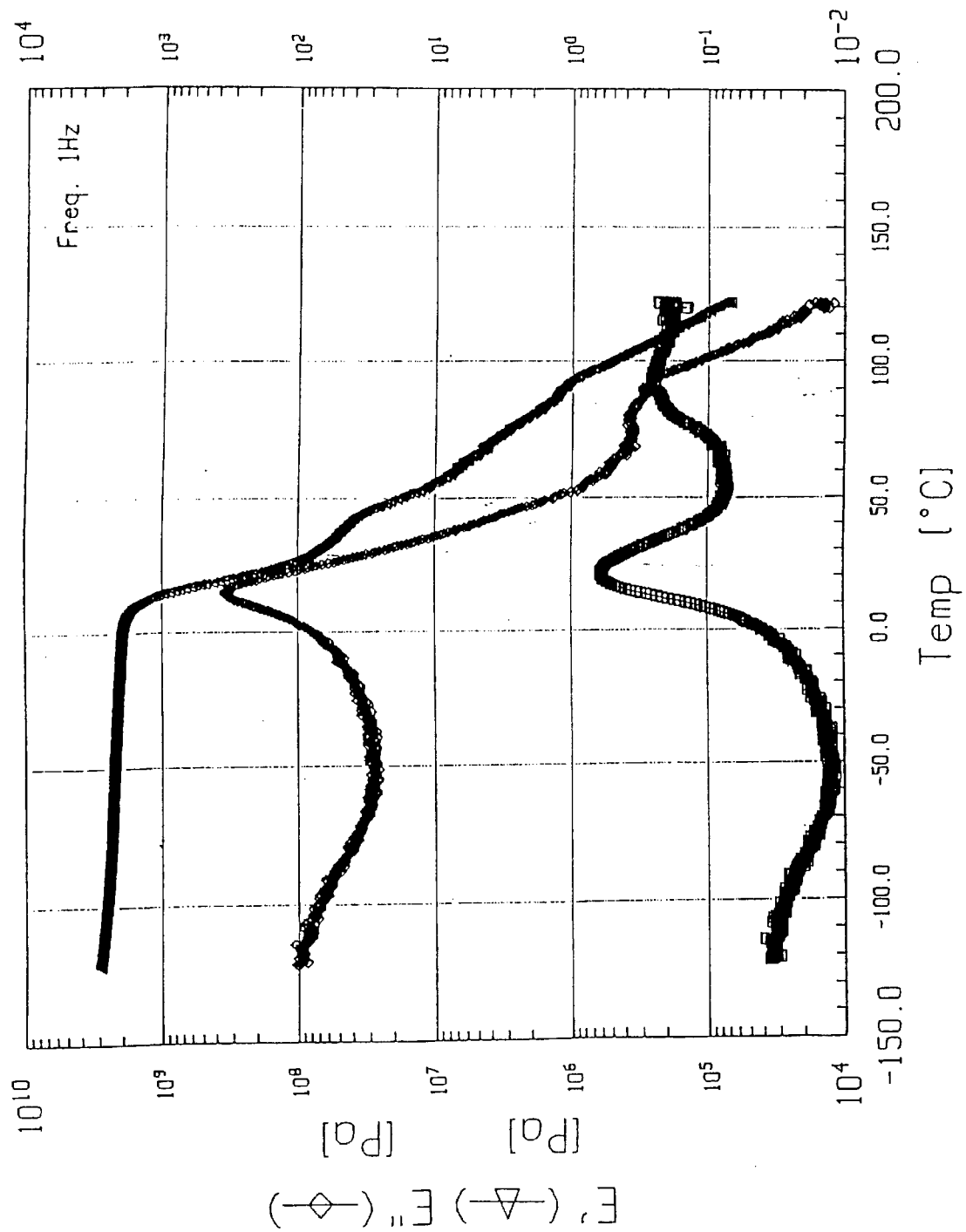
FIG. 10 is a viscoelasticity spectrum of an ethylene/styrene copolymer having substantially the same styrene content (37 mol %) as 7-B.

FIG. 10 shows the viscoelasticity spectrum of an ethylene/styrene copolymer having substantially the same styrene content.

Figure 11:
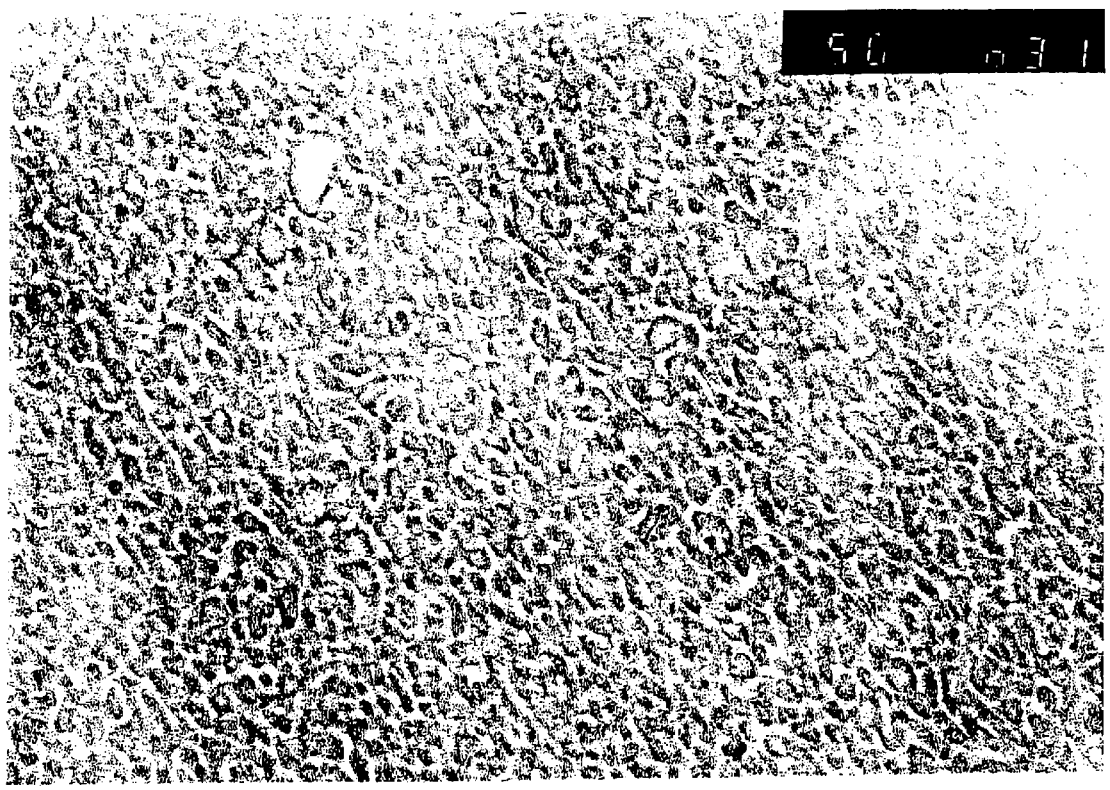
FIG. 11 is a TEM photograph of 14-B obtained in Example 14.

FIG. 11 shows a TEM photograph of 14-B obtained in Example 14. Fine structures of at most 0.05 μm are observed, which indicates that the polystyrene homopolymer is well dispersed.

Films and Sheets of the Cross-copolymerization Products

The cross-copolymerization products of the present invention were pelletized by the following method. The obtained pellets were used for the following film-forming or for the production of various compositions. By a 30 mmφ twin screw extruder PCM30 manufactured by Ikegai Tekko K.K., a dried crumb-like polymer was drawn in a strand at a die temperature of 160° C. at a screw rotational speed or 200 rpm, then cooled with water and cut into pellets by a fan cutter (FC110), manufactured by Hoshi Plastic K.K.

In Examples R-1 to R-3, cross-copolymerization products 8-B, 6-B and 7-B were filmed by the following method.

Filming was carried out by means of Laboplastomill (manufactured by Toyo Seiki K.K.) of extruder type (cylinder diameter: 20 mm, L/D=21) using a screw of a flighted head Dulmage type (CR-2.9), a feed/compression, a metaling (full flight+double flighted Dulmage)=7D/5D/9D and a die of a coat hanger type at a cylinder temperature of from 120 to 210° C. at a die temperature of from 150 to 210° C. at a screw rotational speed of 80 rpm.

The forming conditions of each film are shown in Table 12.

The results of evaluation of the obtained films are shown in Table 13.

TABLE 12

Film-forming conditions

| | Polymer | Resin temperature at lip outlet ° C. | Lip opening mm | Screw rotational speed rpm | Discharge rate Kg/hr | Torque Kg-m | Film width |
|---|---|---|---|---|---|---|---|
| R1 | Cross-copolymerization product 8-B | 176 | 0.35 | 80 | 2.45 | 6.30 | 105 |
| R2 | Cross-copolymerization product 6-B | 179 | 0.35 | 80 | 2.92 | 6.20 | 90 |
| R3 | Cross-copolymerization product 7-B | 181 | 0.35 | 80 | 3.04 | 7.00 | 100 |
| Comp. R1 | Ethylene/styrene copolymer SE-8 | 185 | 0.35 | 80 | 15.4 | | |
| Comp. R2 | Olefin-type elastomer ENGAGE | 180 | 0.35 | 80 | 14.0 | | |

TABLE 13

Evaluation of physical properties of films

| | Polymer | Film thickness μm | Breaking elongation % | | Breaking strength MPa | | 10% modulus MPa | | Finger pressure recovery mm | Super finger pressure recovery mm |
|---|---|---|---|---|---|---|---|---|---|---|
| | | | Longitudinal | Transverse | Longitudinal | Transverse | Longitudinal | Transverse | | |
| R1 | Cross-copolymerization product 8-B | 38 | 258 | 618 | 45 | 36 | 9 | 4 | 18 | 14 |
| R2 | Cross-copolymerization product 6-B | 29 | 79 | 281 | 27 | 18 | 19 | 8 | 5 | 5 |
| R3 | Cross-copolymerization product 7-B | 42 | 138 | 262 | 36 | 26 | 26 | 13 | 5 | 5 |

TABLE 13-continued

Evaluation of physical properties of films

| | Polymer | Film thickness μm | Breaking elongation % | | Breaking strength MPa | | 10% modulus MPa | | Finger pressure recovery mm | Super finger pressure recovery mm |
|---|---|---|---|---|---|---|---|---|---|---|
| | | | Longitudinal | Transverse | Longitudinal | Transverse | Longitudinal | Transverse | | |
| Comp. R1 | Ethylene/styrene copolymer SE-8 | 43 | 317 | 438 | 18 | 13 | 2 | 2 | 20 | 19 |
| Comp. R2 | Olefin-type elastomer ENGAGE | 38 | 556 | 592 | 15 | 12 | 3 | 3 | 16 | 14 |

Comparative Examples R1 and R2

Ethylene/styrene copolymer SE-8 and ethylene/octene copolymer EG8440 (content: 6 mol %, manufactured by DuPont Dow Elastomer Co.) were formed into films in the same manner as in Examples R1 to R3.

Forming conditions of each film are shown in Table 12.

The results of evaluation of the obtained films are shown in Table 13.

The films of cross-copolymerization products have higher mechanical strength (breaking strength, tensile modulus of elasticity) as compared with the conventional ethylene/styrene copolymer film or the olefin type elastomer film, or the LLDPE film. Further, the cross-copolymerization products are properly elastic and have good finger pressure recovery properties.

Further, the finger pressure recovery and the super finger pressure recovery of a stretch film were obtained as follows.

The finger pressure recovery of a film was obtained in such a manner that the film was stretched by 10% in a width direction and then a rod having a forward end curve diameter of 12.5 mm was pushed to the film surface having a diameter of 45 mm, whereby the limit depth (mm) for instantaneous recovery was obtained as super finger pressure recovery, and the limit depth for recovery within 1 minute was obtained as finger pressure recovery. The test was repeated five times, and the average value was taken.

Examples R4 and R5

Using cross-copolymerization products 8-B and 7-B, three-layered films having a layer constituting ratio of EVA/P-1(P-3)/EVA(25%/50%/25%) and having a thickness of 1 mm, were prepared by a heat-pressing method. The results of evaluation of these films are shown in Table 14.

Comparative Examples R3 and R4

Using cross-copolymerization products 8-B and 7-B, a single layer films having a thickness of 1 mm were prepared by a heat-pressing method. The results of evaluation of these films are shown in Table 14.

TABLE 14

Evaluation of physical properties of multi-layered films

| Layer structure | R4 EVA Cross-copolymerization product 8-B EVA | R5 EVA Cross-copolymerization product 7-B EVA | Comp. R3 Cross-copolymerization product 8-B | Comp. R4 Cross-copolymerization product 7-B |
|---|---|---|---|---|
| Film thickness (mm) | 1 | 1 | 1 | 1 |
| Breaking elongation (%) | 483 | 400 | 533 | 300 |
| Breaking strength (MPa) | 35 | 23 | 48 | 350 |
| Tensile modulus of elasticity (MPa) | 26 | 108 | 20 | 241 |
| 100% modulus (MPa) | 6 | 11 | 5 | 20 |
| 300% modulus (MPa) | 12 | 15 | 15 | 28 |

Compositions of Cross-copolymerization Products; Compatibilizing Agents

Hereinafter, the compositions in Tables 15 to 25 and the charging compositions of cross-linked products and the foamed products are represented by parts by weight.

A cross-copolymerization product, an olefin type resin and an aromatic vinyl compound type resin (polystyrene) were melt-kneaded by a 30 mmϕ twin screw extruder in a blend ratio as shown in Table 15 or 16 to obtain a resin composition. Further, as a Comparative Example, using an ethylene/styrene copolymer or SEBS instead of the cross-copolymerization product, melt-kneading was carried out in the same manner in the blend ratio as shown in Table 15 or 16 to obtain a resin composition. Further, polyethylene/polystyrene or polypropylene/polystyrene was kneaded alone to obtain a resin composition.

Table 15 shows the mechanical properties of a composition obtained by adding as a compatibilizing agent a predetermined amount of the cross-copolymerization product obtained in an Example of the present invention, an ethylene/styrene copolymer obtained in a Reference Example or SEBS to polystyrene (GP-1) and polypropylene (J105), and Table 16 shows the mechanical properties of a composition obtained by adding the same compatibilizing agent to polystyrene (GP-1) and polyethylene (M8500).

elongation is excellent, but the breaking strength is low as compared with the cross-copolymer. Further, in the case of such ethylene/styrene copolymer or SEBS, the surface hardness tends to decrease, whereby the scratch resistance of the composition tends to be impaired.

It is evident that when a cross-copolymerization product is added to a polystyrene/polyethylene system (Table 16), the obtainable composition satisfies high elongation, high breaking strength and high tensile modulus of elasticity simultaneously and shows excellent compatibilizing effects. Decrease of hardness due to the addition of the cross-copolymerization product is little. Whereas, by the addition

TABLE 15

Effects as a compatibilizing agent

| Polymer | R1 | R2 | R3 | Comp. R1 | Comp. R2 | Comp. R3 |
|---|---|---|---|---|---|---|
| Polypropylene J103 | 45 parts | 45 parts | 45 parts | 50 parts | 45 parts | 45 parts |
| Polystyrene GP-1 | 45 parts | 45 parts | 45 parts | 50 parts | 45 parts | 45 parts |
| Cross-copolymerization product 8-B | 10 parts | — | — | — | — | — |
| Cross-copolymerization product 6-B | — | 10 parts | — | — | — | — |
| Cross-copolymerization product 7-B | — | — | 10 parts | — | — | — |
| Ethylene/styrene copolymer SE-3 | — | — | — | — | 10 parts | — |
| SEBS G1652 | — | — | — | — | — | 10 parts |
| Breaking elongation (%) | 21 | 26 | 20 | 5 | 19 | 42 |
| Breaking strength (MPa) | 26 | 33 | 29 | 14 | 19 | 23 |
| Tensile modulus of elasticity (MPa) | 400 | 460 | 320 | 660 | 620 | 430 |
| MFR (g/10 min @ 200° C., 5 kg) | 10 | 11 | 9 | 19 | 10 | 9 |
| Shore D hardness | 74 | 76 | 67 | 71 | 62 | 60 |

TABLE 16

Effects as a compatibilizing agent

| Polymer | R4 | R5 | R6 | Comp. R4 | Comp. R5 | Comp. R6 |
|---|---|---|---|---|---|---|
| Polypropylene M8500 | 45 parts | 45 parts | 45 parts | 50 parts | 45 parts | 45 parts |
| Polystyrene GP-1 | 45 parts | 45 parts | 45 parts | 50 parts | 45 parts | 45 parts |
| Cross-copolymerization product 8-B | 10 parts | — | — | — | — | — |
| Cross-copolymerization product 6-B | — | 10 parts | — | — | — | — |
| Cross-copolymerization product 7-B | — | — | 10 parts | — | — | — |
| Ethylene/styrene copolymer SE-5 | — | — | — | — | 10 parts | — |
| SEBS G1652 | — | — | — | — | — | 10 parts |
| Breaking elongation (%) | 46 | 47 | 48 | 5 | 26 | 44 |
| Breaking strength (MPa) | 32 | 31 | 33 | 16 | 22 | 21 |
| Tensile modulus of elasticity (MPa) | 360 | 360 | 380 | 500 | 400 | 230 |
| MFR (g/10 min @ 200° C., 5 kg) | 11 | 11 | 11 | 14 | 10 | 14 |
| Shore D hardness | 67 | 70 | 64 | 67 | 67 | 61 |

It is evident that when a cross-copolymerization product is added to a polystyrene/polypropylene system (Table 15), the obtainable composition will have remarkably improved elongation and breaking strength and shows excellent compatibilizing effects. Further, by the addition of the cross-copolymerization product, the composition has a characteristic that the hardness will not decrease. Whereas, by the addition of an ethylene/styrene copolymer, both the elongation and the breaking strength are not adequate. In the case of SEBS which has been used as a compatibilizing agent, the of the ethylene/styrene copolymer, the elongation and breaking strength are both inadequate. In the case of SEBS which has been used as a compatibilizing agent, the elongation is equal, but the breaking strength and the tensile modulus of elasticity are low. Further, the surface hardness tends to decrease, whereby the scratch resistance of the composition tends to be impaired.

From these results, it is evident that the cross-copolymerization products obtained by the present invention provide excellent physical properties as compositions or compatibilizing agents for a polystyrene type resin and a polyolefin type resin.

Resins Used

Polystyrene: Denkastyrol GP-1, manufactured by Denki Kagaku Kogyo K.K.

tion. Whereas, when 10 parts of the ethylene/styrene copolymer is added, the impact resistance is excellent, but the flexural modulus of elasticity decreases, and the heat resistance (Vicat softening point) also decreases. In the case of EPR, the heat resistance (Vicat softening point) and the hardness decrease.

TABLE 17

| Polymer | Composition with polyolefin | | | | | |
|---|---|---|---|---|---|---|
| | R1 | R2 | R3 | Comp. R1 | Comp. R2 | Comp. R3 |
| Polypropylene J105 | 90 parts | 80 parts | 90 parts | 100 parts | 90 parts | 90 parts |
| Cross-copolymerization product 8-B | 10 parts | 20 parts | — | — | — | — |
| Cross-copolymerization product 6-B | — | — | 10 parts | — | — | — |
| Ethylene/styrene copolymer SE-5 | — | — | — | — | 10 parts | — |
| EPR P-0280 | — | — | — | — | — | 10 parts |
| Tensile elongation (%) | 52 | 52 | 38 | 32 | 54 | 48 |
| Tensile yield strength (MPa) | 28 | 25 | 30 | 32 | 29 | 27 |
| Flexural strength (MPa) | 44 | 38 | 47 | 49 | 41 | 42 |
| Flexural modulus of elasticity (MPa) | 1400 | 1100 | 1500 | 1600 | 1200 | 1300 |
| Izod impact strength (J/m) | 38 | 57 | 30 | 16 | 37 | 38 |
| Vicat softening point (° C.) | 90 | 79 | 94 | 104 | 86 | 83 |
| Shore D hardness | 74 | 71 | 73 | 75 | 74 | 69 |
| MFR (g/10 min @ 200° C., 5 kg) | 29 | 29 | 28 | 34 | 28 | 29 |

Polypropylene: Grandpolypro "J-105" (manufactured by Grand Polymer Co.

Polyethylene: M8500 (manufactured by Keiyo Polyethylene K.K.)

Ethylene/octene copolymer: ENGAGE8180 (manufactured Du Pont Dow Elastomer Co.

Hydrogenated SBS: SEBS, trade name: Crayton G1652 (Shell)

Compositions of Cross-copolymerization Products; Compositions with Polyolefin Type Resins A cross-copolymerization product and an olefin type polymer (polypropylene) were melt-kneaded by a 30 mm$\phi$ twin screw extruder at a cylinder temperature of 200° C. in a blend ratio as shown in Table 17, to obtain a composition comprising the cross-copolymerization product and the olefin type resin. As a Comparative Example, using EPR or an ethylene/styrene copolymer instead of the cross-copolymerization product, melt-kneading was carried out in the same manner in the blend ratio as shown in Table 17. Various physical properties of the obtained compositions were measured and compared with the results of polypropylene alone.

In Table 17, the physical properties of the composition comprising polypropylene and the cross-copolymerization product are shown. When 10 parts of the cross-copolymerization product is added, the composition has high mechanical properties (flexural strength, flexural modulus of elasticity), hardness, heat resistance (Vicat softening point) and impact strength, simultaneously, and becomes an excellent impact resistant propylene composi- From these results, it is evident that the cross-copolymerization products obtained in the present invention provide excellent physical properties when made into compositions with a polyolefin type resin such as polypropylene.

In Table 17, as the polypropylene, Grandpolypro "J-105" (manufactured by Grand Polymer Co.) was employed, and as EPR, Toughmer P-0280 (manufactured by Mitsui Chemical Co., Ltd.) was employed.

Compositions of Cross-copolymerization Products; Compositions with Polystyrene Type Resins A cross-copolymerization product and a various aromatic vinyl compound type polymer were melt-kneaded by a 30 mm$\phi$ twin screw extruder at 200° C. in the blend ratio as shown in Table 18, to obtain an aromatic vinyl compound type resin composition.

A sheet having a thickness of 1 mm was prepared by press-molding (180° C./3 min) and punched out in the shape of No. 2 dumbbell. Using this dumbbell, the physical properties were obtained in accordance with the tensile test method for plastics as prescribed in JIS K-7113. The tensile speed was 2 mm/min. Otherwise, the above-mentioned methods were used for determination.

A cross-copolymerization product obtained by the process of the present invention is obtained as a composition well compatibilized with at most 50 wt %, preferably at most 30 wt %, of a polystyrene homopolymer, as mentioned above, and its physical properties are good. Here, the physical properties of a composition having a polystyrene added afresh to the cross-copolymerization product, will be shown. As shown in Table 18, the composition comprising the cross-copolymerization product and polystyrene in a ratio of 50 parts/50 parts, has the properties as a thermoplastic resin having high impact resistance, although the transparency may be lost. By further increasing the composition of polystyrene, a higher tensile modulus of elasticity (up to about 1500 MPa) will be shown while maintaining high impact resistance. Inversely, by reducing the composition of polystyrene, the physical properties close to an elastomer having high tensile modulus of elasticity, heat resistance, hardness and elongation simultaneously, will be shown similar to the cross-copolymerization product obtained by the above-mentioned process of the present invention (containing a polystyrene homopolymer in an amount of 30 wt % at the maximum).

TABLE 18

Composition with polystyrene

| Polymer | R1 |
| --- | --- |
| Polystyrene GP-1 | 50 parts |
| Cross-copolymerization product 6-B | 50 parts |
| Tensile elongation (%) | 26 |
| Tensile yield strength (MPa) | 37 |
| Breaking strength (MPa) | 35 |
| Tensile modulus of elasticity (MPa) | 510 |
| Izod impact strength (J/m) | 60 |
| Vicat softening point (° C.) | 107 |
| Shore D hardness | 73 |
| MFR (g/10 min @ 200° C., 5 kg) | 13 |

Compositions of Cross-copolymerization Products; Filler Compositions

Using Brabender Plasti-Corder (PLE331 model, manufactured by Brabender Co.), firstly, the cross-copolymerization product was melted, and then a filler was added, followed by kneading (external temperature: 200° C., rotational speed: 60 rpm, time: 10 minutes) to obtain a composition. The obtained resin composition was formed into a sheet having a thickness of 1 mm by the above-mentioned press-molding, and evaluation of various physical properties was carried out. Here and hereinafter, kneading by Brabender was carried out using a charge of from 40 to 50 g as a standard condition.

In Tables 19, 20 and 21, the physical properties of the compositions comprising the cross-copolymerization products of the present invention and various fillers, are summarized. It is evident that when calcium carbonate is used as a filler, the high elongation and the high tensile modulus of elasticity are satisfied simultaneously. Further, the hardness and the Vicat softening point (heat resistance) are also high, and it has adequate physical properties as a practical filler composition. Whereas, when a ethylene/styrene copolymer is employed, the breaking strength is high, but the elongation and the tensile modulus of elasticity are low, thus giving a brittle impression. Further, the hardness is low, whereby the surface scratch resistance is low. Also the Vicat softening point (heat resistance) is inadequate.

It is evident that also in a case where the amount of calcium carbonate is changed (Table 20) or other fillers are used (Table 21), the filler composition of the cross-copolymerization product has such characteristics as high tensile modulus of elasticity, hardness, Vicat softening point (heat resistance) although there is fluctuations in the mechanical properties.

TABLE 19

Blends of various polymers and calcium carbonate 50/50

|  |  | R1 | R2 | R3 | Comp. R1 | Comp. R2 |
| --- | --- | --- | --- | --- | --- | --- |
| Cross-copolymerization product 8-B |  | 50 |  |  |  |  |
| Cross-copolymerization product 6-B |  |  | 50 |  |  |  |
| Cross-copolymerization product 7-B |  |  |  | 50 |  |  |
| Ethylene/styrene copolymer SE-6 |  |  |  |  | 50 |  |
| Ethylene/ styrene copolymer SE-5 |  |  |  |  |  | 50 |
| Calcium carbonate |  | 50 | 50 | 50 | 50 | 50 |
| Tensile breaking strength | MPa | 10 | 13 | 12 | 18 | 21 |
| Breaking elongation | % | 57 | 30 | 40 | 10 | 15 |
| Tensile modulus of elasticity | MPa | 125 | 179 | 163 | 10 | 21 |
| Shore D hardness |  | 57 | 58 | 61 | 27 | 35 |
| Vicat softening point | ° C. | 81 | 98 | 101 | 46 | 65 |

TABLE 20

Amounts of cross-copolymerization product 7-B and calcium carbonate

|  |  | R4 | R5 | R6 | R7 | Comp. R3 | Comp. R4 | Comp. R5 | Comp. R6 |
| --- | --- | --- | --- | --- | --- | --- | --- | --- | --- |
| Cross-copolymerization product 7-B |  | 50 | 33 | 25 | 20 |  |  |  |  |
| Ethylene/styrene copolymer SE-6 |  |  |  |  |  | 25 | 20 |  |  |
| Ethylene/styrene copolymer SE-5 |  |  |  |  |  |  |  | 25 | 80 |
| Calcium carbonate |  | 50 | 67 | 75 | 80 | 75 | 80 | 75 | 80 |
| Talc |  |  |  |  |  |  |  |  |  |
| Tensile breaking strength | MPa | 12 | 15 | 16 | 17 | 6 | 7 | 15 | 11 |
| Breaking elongation | % | 40 | 24 | 17 | 15 | 327 | 71 | 43 | 41 |
| Tensile modulus of elasticity | MPa | 163 | 221 | 258 | 311 | 44 | 772 | 184 | 928 |

TABLE 20-continued

Amounts of cross-copolymerization product 7-B and calcium carbonate

|  |  | R4 | R5 | R6 | R7 | Comp. R3 | Comp. R4 | Comp. R5 | Comp. R6 |
|---|---|---|---|---|---|---|---|---|---|
| Shore D hardness |  | 61 | 70 | 70 | 76 | 41 | — | 52 | — |
| Vicat softening point | °C. | 101 | 108 | 108 | 113 | 55 | 85 |  | 76 |

TABLE 21

Various polymers and talc or aluminum hydroxide

|  |  | R8 | R9 | R10 | R11 | R12 | R13 | Comp. R7 | Comp. R8 |
|---|---|---|---|---|---|---|---|---|---|
| Cross-copolymerization product 8-B |  | 50 |  |  | 50 |  |  |  |  |
| Cross-copolymerization product 6-B |  |  | 50 |  |  | 50 |  |  |  |
| Cross-copolymerization product 7-B |  |  |  | 50 |  |  | 50 |  |  |
| Ethylene/ styrene copolymer SE-6 |  |  |  |  |  |  |  | 50 |  |
| Ethylene/styrene copolymer SE-5 |  |  |  |  |  |  |  |  | 50 |
| Talc |  | 50 | 50 | 50 |  |  |  | 50 | 50 |
| Aluminum hydroxide |  |  |  |  | 50 | 50 | 50 |  |  |
| Tensile breaking strength | MPa | 10 | 12 | 17 | 12 | 12 | 12 | 15 | 17 |
| Breaking elongation | % | 57 | 13 | 20 | 314 | 23 | 62 | 320 | 410 |
| Tensile modulus of elasticity | MPa | 131 | 256 | 223 | 76 | 226 | 185 | 29 | 52 |
| Shore D hardness |  | 53 | 61 | 68 | 52 | 65 | 67 | 33 | 39 |
| Vicat softening point | °C. | 78 | 103 | 104 | 83 | 102 | 104 | 53 | 72 |

REFERENCE TABLE

Physical properties without incorporation of any filler

|  |  | ① | ② | ③ | ④ | ⑤ |
|---|---|---|---|---|---|---|
| Cross-copolymerization product 8-B |  | 100 |  |  |  |  |
| Cross-copolymerization product 6-B |  |  | 100 |  |  |  |
| Cross-copolymerization product 7-B |  |  |  | 100 |  |  |
| Ethylene/styrene copolymer SE-6 |  |  |  |  | 100 |  |
| Ethylene/styrene copolymer SE-5 |  |  |  |  |  | 100 |
| Tensile breaking strength | MPa | 39 | 39 | 35 | 7 | 33 |
| Breaking elongation | % | 457 | 550 | 300 | 763 | 723 |
| Tensile modulus of elasticity | MPa | 34 | 98 | 241 | 3 | 7 |
| Shore D hardness |  | 43 | 44 | 63 | 16 | 25 |
| Vicat softening point | °C. | 87 | 98 | 96 | 50 | 65 |

Fillers Used:
  Calcium carbonate NS-400 (manufactured by Nitto Funka Kogyo K.K.)
  Talc: Hitoron A (manufactured by Takehara Kagaku K.K.
  Aluminum hydroxide: Hydilite H-42M (manufactured by Showa Denko K.K.)
Compositions of Cross-copolymerization Products: Plasticizers Using Brabender Plasti-Corder (PLE331 model, manufactured by Brabender Co.), firstly, a cross-copolymerization product was melted, and then a plasticizer was added, followed by kneading (external temperature: 200° C., rotational speed: 60 rpm, time: 10 minutes) to obtain a composition. The obtained resin composition was formed into a sheet having a thickness of 1 mm by the above-mentioned press-molding, and evaluation of various physical properties was carried out. In Table 22, the physical properties of a composition comprising a cross-copolymerization product of the present invention and an ester type plasticizer, are summarized. When 20 parts of an ester type plasticizer is employed as the plasticizer, the glass transition point lowers to −40° C. or lower, and even then, the composition shows a relatively high tensile modulus of elasticity and hardness. Whereas, with a composition comprising an ethylene/styrene copolymer and 20 parts of the ester type plasticizer, equivalent lowering of the glass transition point is observed, but the tensile modulus of elasticity and hardness are both remarkably lowered.

In Table 23, the physical properties of a composition comprising a cross-copolymerization product of the present invention and a paraffin type or naphthene type plasticizer, are summarized. As compared with the ester type plasticizer, lowering of the physical properties is little, and further, the glass transition point is lowered to a level of −40° C. or lower.

With the cross-copolymerization product of the present invention, it is possible to suppress lowering of the physical properties and to lower the glass transition point by an addition of a plasticizer in an amount of from 1 wt % to 50 wt %, preferably from 5 wt % to 25 wt %.

TABLE 22

Composition with an ester type plasticizer

|  | R1 | R2 | R3 | Comp. R1 | Comp. R2 |
|---|---|---|---|---|---|
| Cross-copolymerization product 8-B | 100 |  |  |  |  |
| Cross-copolymerization product 6-B |  | 100 |  |  |  |
| Cross-copolymerization product 7-B |  |  | 100 |  |  |

TABLE 22-continued

Composition with an ester type plasticizer

|  |  | R1 | R2 | R3 | Comp. R1 | Comp. R2 |
|---|---|---|---|---|---|---|
| Ethylene/styrene copolymer SE-6 |  |  |  |  | 100 |  |
| Ethylene/styrene copolymer SE-5 |  |  |  |  |  | 100 |
| Ester type plasticizer |  | 20 | 20 | 20 | 20 | 20 |
| Tensile breaking strength | MPa | 18 | 6 | 6 | 11 | 12 |
| Breaking elongation | % | 633 | 281 | 233 | 660 | 680 |
| Tensile modulus of elasticity | MPa | 13 | 49 | 14 | 4 | 6 |
| Shore D hardness |  | 30 | 37 | 50 | 11 | 12 |
| MFR 200° C./5 kg | g/10 min. | 9 | 35 | 85 | 9 | 13 |
| Glass transition temperature | ° C. | −44 | −52 | −45 | −41 | −50 |

TABLE 23

Composition with a naphthene type or paraffin type plasticizer

|  |  | R4 | R5 | R6 | R7 | R8 | R9 | R10 | R11 |
|---|---|---|---|---|---|---|---|---|---|
| Cross-copolymerization product 8-B |  | 100 | 100 |  |  |  |  |  |  |
| Cross-copolymerization product 6-B |  |  |  | 100 | 100 |  |  |  |  |
| Cross-copolymerization product 7-B |  |  |  |  |  | 100 | 100 | 100 | 100 |
| Naphthene type plasticizer |  |  | 20 |  | 20 |  | 20 |  | 40 |
| Paraffin type plasticizer |  | 20 |  | 20 |  | 20 |  | 40 |  |
| Tensile breaking strength | MPa | 21 | 28 | 8 | 11 | 8 | 21 | 3 | 13 |
| Breaking elongation | % | 500 | 600 | 230 | 250 | 250 | 500 | 156 | 467 |
| Tensile modulus of elasticity | MPa | 31 | 14 | 29 | 54 | 22 | 31 | 9 | 8 |
| Shore D hardness |  | 31 | 31 | 38 | 41 | 35 | 44 | 27 | 28 |
| MFR 200° C./5 kg | g/10 min. | 22 | 8 | 8 | 13 | 44 | 22 | 89 | 99 |
| Glass transition temperature | ° C. | −40 | −40 | −55 | −47 | −51 | −42 | −67 | −50 |

The plasticizers used, PL-100 (ester type, manufactured by Mitsubishi Gas Chemical), NM-280 (naphthene type, manufactured by Idemitsu Corporation) and PW-90 (paraffin type, manufactured by Idemitsu Corporation).

Dynamic Cross-linked Products of Cross-copolymerization Products

Using Laboplastomill mixer unit (R60 type) manufactured by Toyo Seiki K.K., dynamic crosslinking was carried out with the formulation as shown in Table 24 at a kneading temperature of 160° C. for a kneading time of 9 minutes. The obtained resin composition was formed into a sheet having a thickness of 1 mm under pressing conditions (200° C., 4 minutes, 50 kg/cm$^2$), and evaluation of various physical properties was carried out. Abbreviations used in the Table are shown below.

Polystyrene: Denkastyrol GP-1 (manufactured by Denki Kagaku Kogyo K.K.

Polypropylene: K-7730 (manufactured by Chisso Corporation)

Crosslinking agent: peroxide; Percumyl D-40 (purity: 40%, manufactured by Nippon Yushi)

Crosslinking aid: divinylbenzene (purity: 96% product)

Lubricant: Metablene L1000

Lubricant: stearic acid

TABLE 24

Dynamic cross-linked products
As is different from other Tables, in this Table, the amounts of the blend components are represented by weight (g)

|  | R1 | Comp. R1 | R2 | Comp. R2 | R3 | Comp. R3 |
|---|---|---|---|---|---|---|
| Ethylene/styrene copolymer SE-5 |  | 45 |  | 36 |  | 36 |
| Cross-copolymerization product 7-B | 45 |  | 36 |  | 36 |  |
| Polystyrene GP-1 |  |  | 9 | 9 |  |  |
| Polypropylene K7730 |  |  |  |  | 9 | 9 |
| Lubricant (Stearic acid) | 0.7 | 0.7 | 0.7 | 0.7 | 0.7 | 0.7 |
| Softening agent (L1000) | 0.7 | 0.7 | 0.7 | 0.7 | 0.7 | 0.7 |
| Crosslinking agent: peroxide (D-40) | 2.2 | 2.2 | 2.2 | 2.2 | 2.2 | 2.2 |

TABLE 24-continued

Dynamic cross-linked products
As is different from other Tables, in this Table, the amounts of the blend components are represented by weight (g)

|  | R1 | Comp. R1 | R2 | Comp. R2 | R3 | Comp. R3 |
|---|---|---|---|---|---|---|
| Crosslinking aid: (divinylbenzene) | 1.5 | 1.5 | 1.5 | 1.5 | 1.5 | 1.5 |
| Breaking elongation (%) | 140 | 300 | 100 | 300 | 84 | 333 |
| Breaking strength (MPa) | 19 | 15 | 23 | 15 | 16 | 15 |
| Tensile modulus of elasticity (MPa) | 188 | 13 | 189 | 45 | 193 | 29 |
| MFR | 0.0 | — | 0.5 | 0.0 | 0.4 | 0.0 |
| Vicat softening point (° C.) | 100 | 62 | 101 | 74 | 105 | 71 |
| Hardness A | 99 | 81 | 99 | 93 | 99 | 88 |
| Hardness D | 65 | 26 | 68 | 41 | 62 | 34 |

The dynamic cross-linked product of the cross-copolymerization product of the present invention has excellent mechanical strength (breaking strength, tensile modulus of elasticity), high hardness and high heat resistance (Vicat softening point), although the elongation is small as compared with the dynamic cross-linked product of the ethylene/styrene copolymer (Table 24). The various physical properties of the dynamic cross-linked product of the cross-copolymerization product can be optionally changed from a flexible region close to the dynamic cross-linked product of the conventional ethylene/styrene copolymer to a region close to plastics (a region having a very high tensile modulus of elasticity such as at least 500 MPa) by changing the composition of the cross-copolymerization product itself. Further, the physical properties may be optionally changed by making it a composition with an aromatic vinyl compound type resin, an olefin type resin, a still other resin or an elastomer, followed by dynamic crosslinking.

Foamed Products of Cross-copolymerization Products

Using Laboplastomill mixer unit (R60 type), manufactured by Toyo Seiki K.K., a chemical blowing agent was kneaded with the formulation as shown in Table 25 at a kneading temperature of 150° C. for a kneading of 1 minute. The obtained resin composition was formed into a sheet having a thickness of 0.5 mm at a pressing temperature of 150° C., followed by foaming treatment at 130° C. to obtain a sample for evaluation, which was cut into respective test pieces. The abbreviation used in the Table is shown below.

Blowing agent: Vinyhal AC#3M (azodicarbonamide) (manufactured by Eiwa Kasei Kogyo K.K.)

very low elongation and high tensile modulus of elasticity and hardness and constitutes an opposite end to the olefin type foamed product. The foamed product of the cross-copolymerization product of the present invention exhibits physical properties in between the olefin type foamed product and the polystyrene type foamed product, and by changing the composition of the cross-copolymerization product itself, it can be optionally changed from a flexible region close to the olefin type resin foamed product to a region close to the polystyrene type foamed product. Further, the physical properties may be optionally changed by carrying out foaming after making it a composition with an aromatic vinyl compound type resin, an olefin type resin, a still other resin or an elastomer.

Preparation of a Cross-copolymerization Product by Radical Polymerization

Using an ethylene/styrene/divinylbenzene copolymer obtained in the coordination polymerization step, the cross-

TABLE 25

| | Foamed products | | | | | | | |
|---|---|---|---|---|---|---|---|---|
| | R1 | R2 | R3 | R4 | R5 | Comp. R1 | Comp. R2 | Comp. R3 |
| Cross-copolymerization product 7-B | 100 | | 10 | 20 | 50 | | | |
| Cross-copolymerization product 6-B | | 20 | | | | | | |
| Ethylene/styrene copolymer SE-5 | | | | | | 100 | | |
| Olefin-type elastomer ENGAGE | | | | | | | 100 | |
| Polystyrene GP-1 | | 80 | 90 | 80 | | | | 100 |
| Polyethylene M8500 | | | | | 50 | | | |
| Blowing agent | 1 | 1 | 1 | 1 | 2 | 1 | 1 | 1 |
| Foaming degree | 1.38 | 1.90 | 1.79 | 1.86 | 1.56 | 1.46 | 1.43 | 1.74 |
| Breaking elongation (%) | 100 | 12 | 7 | 12 | 70 | 380 | 550 | 2 |
| Breaking strength (MPa) | 11 | 6 | 10 | 8 | 9 | 5 | 5 | 8 |
| Tensile modulus of elasticity (MPa) | 74 | 374 | 500 | 442 | 101 | 5 | 4 | 529 |
| Hardness A | 91 | 98 | 97 | 99 | 97 | 60 | 56 | 98 |
| Hardness D | 45 | 54 | 55 | 64 | 48 | 15 | 12 | 53 |

The foamed product of the cross-copolymerization product of the present invention has excellent mechanical strength (breaking strength, tensile modulus of elasticity), high hardness and high heat resistance (Vicat softening point) although the elongation is relatively small (Table 25). The foamed product of the olefin type resin or the ethylene/styrene copolymer is characterized by high elongation and low breaking strength, tensile modulus of elasticity and hardness and can be said to be a very flexible foamed product. On the other hand, the aromatic vinyl compound type (polystyrene type) foamed product is characterized by ing step is carried out by radical polymerization to synthesize a cross-copolymerization product.

Coordination Polymerization Step

Using a 10 l polymerizer, polymerization was carried out under the conditions as shown in Table 26. A part of the polymerization solution was subjected to methanol precipitation to recover the polymer, whereby this polymerization solution was found to contain exactly 10 wt % of an ethylene/styrene/divinylbenzene copolymer and 16 wt % of an unreacted styrene monomer. The analytical results of the polymer are shown in Table 28.

TABLE 26

| | Polymerization conditions | | | | | | | | |
|---|---|---|---|---|---|---|---|---|---|
| | | | | | | Coordination polymerization step | | | |
| Reference Example | Catalyst μmol | MAO mmol | St ml | DVB ml | Solvent ml | Et pressure MPa | Polymerization temperature ° C. | Et consumption l | Polymerization time |
| 1 | 8.4 | P:8.4 | 800 | 1.0 | T:4000 | 1.1 | 50 | About 200 | 2.0 h |
| 2 | 8.4 | P:8.4 | 800 | 1.0 | T:4000 | 1.1 | 70 | About 200 | 1.5 h |

Crossing Step Example R1

Into a 1 l autoclave, 500 g of the polymerization solution (containing 50 g of the polymer and 80 g of the styrene monomer) obtained in Reference Example 1 for the coordination polymerization step and 100 g of a fresh styrene monomer were charged, and after nitrogen purging, thermopolymerization (radial polymerization) was carried out at 140°C. for 6 hours. By methanol precipitation, 100 g of the polymer was obtained.

Crossing Step Examples R2 to R5

Likewise, under the polymerization conditions shown in Table 27, using the polymerization solution obtained in Reference Example 2, a styrene monomer and a methyl methacrylate monomer (MMA), polymerization was carried out in the same manner.

TABLE 27

Crossing step conditions
(Thermal radical polymerization)

|  | Ex. R1 | Ex. R2 | Ex. R3 | Ex. R4 | Ex. R5 |
|---|---|---|---|---|---|
| Polymerization solution of Reference | Ref. Ex. 1 500 g | Ref. Ex. 2 500 g | Ref. Ex. 2 500 g | Ref. Ex. 2 500 g | Ref. Ex. 2 500 g |

TABLE 27-continued

Crossing step conditions
(Thermal radical polymerization)

|  | Ex. R1 | Ex. R2 | Ex. R3 | Ex. R4 | Ex. R5 |
|---|---|---|---|---|---|
| Examples Internal polymer | 50 g | 50 g | 50 g | 50 g | 50 g |
| Internally remaining polymer | 80 g | 80 g | 80 g | 80 g | 80 g |
| Post-added styrene monomer | 100 g | — | 50 g | — | 30 g |
| Post-added MMA monomer | — | 100 g | 100 g | 150 g | 120 g |
| Radical polymerization temperature | 140° C. | 140° C. | 140° C. | 140° C. | 140° C. |
| Radical polymerization time | 6 h | 6 h | 6 h | 6 h | 6 h |

In Table 28, the analytical results of the obtained polymers are shown. The styrene content and the methyl methacrylate content were obtained by 1H-NMR.

TABLE 28

Polymerization results

| Ex. | Polymer | Obtained amount | Total styrene content (mol %) (1) | Main chain St content (mol %) (2) | MMA content (mol %) | Mw/$10^4$ | Mw/Mn | Glass transition temperature (° C.) | Melting point (° C.) |
|---|---|---|---|---|---|---|---|---|---|
| Ref. Ex. | 1 | — | 12.8 | 12.8 | 0 | 17.0 | 2.0 | −22 | 70 |
| Ex. | R1 | 98 g | 34.4 | 9.6 | 0 | 19.0 | 2.1 | −23, 98 | 69 |
| Ref. Ex. | 2 | — | 11.5 | 11.5 | 0 | 12.5 | 1.8 | −22 | 77 |
| Ex. | R2 | 83 g | 19.0 | 8.1 | 15.4 | 15.6 | 2.5 | −25, 98 | 74 |
| Ex. | R3 | 124 g | 30.1 | 4.9 | 30.0 | 15.7 | 2.2 | −24, 100 | 76 |
| Ex. | R4 | 110 g | 22.6 | 5.6 | 29.4 | 17.7 | 2.0 | −28, 100 | 71 |
| Ex. | R5 | 118 g | 31.2 | 4.9 | 29.1 | 14.1 | 2.3 | −27, 98 | 75 |

(1) The styrene content in the entire polymer. Namely, the sum of the styrene content in the main chain ethylene/styrene/diene copolymer obtained in the coordination polymerization step and the styrene content in the polymer (including cross chains) obtained by the radical polymerization (crossing step).
(2) The styrene content in the main chain ethylene/styrene/diene copolymer.

In Table 29, the physical properties of the cross-copolymers obtained in Examples R1 to R5 and the copolymers obtained in Reference Examples 1 and 2, are summarized.

TABLE 29

Physical properties

|  | Ref. Ex. | Ex. | Ref. Ex. | Ex. | Ex. | Ex. | Ex. |
|---|---|---|---|---|---|---|---|
| Kind of polymer | 1 | R1 | 2 | R2 | R3 | R4 | R5 |
| Breaking elongation (%) | 400 | 300 | 380 | 280 | 100 | 180 | 190 |
| Yield strength (MPa) | Yield point was not observed | Yield point was not observed | Yield point was not observed | Yield point was not observed | Yield point was not observed | Yield point was not observed | Yield point was not observed |
| Breaking strength (MPa) | 44 | 27 | 41 | 25 | 27 | 26 | 27.7 |
| Tensile modulus of elasticity (MPa) | 19 | 222 | 19 | 131 | 306 | 224 | 211 |
| 100% modulus (MPa) | 4 | 19 | 6 | 15 | 27 | 25 | 26 |

TABLE 29-continued

| | Physical properties | | | | | | |
|---|---|---|---|---|---|---|---|
| | Ref. Ex. | Ex. | Ref. Ex. | Ex. | Ex. | Ex. | Ex. |
| Hardness (Shore D) | 31 | 60 | 35 | Unmeasured | Unmeasured | 99 | 98 |
| Vicat softening point (° C.) | 74 | 87 | 81 | Unmeasured | Unmeasured | 110 | 106 |
| Total light transmittance (%) | 86 | 81.7 | 88 | Unmeasured | Unmeasured | 84.1 | 68.1 |
| Haze (%) | 15 | 84.1 | 8 | Unmeasured | Unmeasured | 24.0 | 92.1 |
| MFR | 2.5 | 3.9 | 8.0 | Unmeasured | Unmeasured | 3.1 | 5.3 |

The polymer of Example R1 wherein the crossing step is carried out by radical polymerization, and polystyrene was crossed, shows high tensile modulus of elasticity, hardness and Vicat softening point as compared with before the crossing (the ethylene/styrene/diene copolymer obtained in the coordination polymerization step) and has suitable elongation, and thus it shows characteristics as a cross-copolymerization product.

In Examples R2 to R5, a styrene monomer and a methyl methacrylate monomer (MMA) are used in the crossing step. The obtained copolymers likewise have high tensile modulus of elasticity, hardness and Vicat softening point and suitable elongation. These copolymers having a styrene/MMA copolymer as cross chains (partly containing a styrene/MMA copolymer not crossed), have transparency. Particularly, the copolymerization product obtained in Example R4 has excellent transparency.

Preparation of an Olefin/diene Type Cross-copolymerization Product

Example R1

Preparation of a Polystyrene-cross-polymerized Ethylene/1-octene/diene Cross-copolymerization Product Using dimethylsilanediyltetramethylcyclopentadienyl t-butylamidetitanium dichloride ({CpMe4-SiMe2-N-tBu}TiCl2) as a catalyst, the preparation was carried out as follows.

Polymerization was carried out by means of an autoclave having a capacity of 10 l and equipped with a stirrer and a jacket for heating and cooling.

4400 ml of dried toluene, 400 ml of 1-octene and 2 ml of divinylbenzene were charged and heated and stirred at an internal temperature of 50° C. About 100 l of nitrogen was bubbled to purge the interior of the system. 8.4 mmol of triisobutyl aluminum and 8.4 mmol, based on Al, of methylalumoxane (MMAO-3A, manufactured by TOSOH AKZO K.K.) were added, and the internal temperature was raised to 50° C. Ethylene was immediately introduced. After the pressure was stabilized at 1.1 MPa (10 kg/cm$^2$G), from a catalyst tank installed above the autoclave, about 50 ml of a toluene solution having 8.4 µmol of {CpMe4-SiMe2-N-tBu}TiCl2 and 0.84 mmol of triisobutyl aluminum dissolved therein, was added to the autoclave. Polymerization was carried out for 4 hours while maintaining the internal temperature at 70° C. and the pressure at 1.1 MPa.

Upon expiration of 4 hours, the consumption of ethylene was 140 l in a standard state. After the ethylene was released, from a valve at a lower portion of the autoclave, a part (about a few hundreds ml) of the polymerization solution was taken out, and 28 g of an ethylene/1-octene/diene copolymer (polymer R1-A) was recovered by a methanol precipitation method. Thereafter, the temperature was raised to 70° C., and from a port at the upper portion of the autoclave, 200 ml of styrene was added, and further, a butyl lithium/hexane solution (manufactured by Kanto Kagaku K.K.) was introduced in an amount corresponding to 21.0 mmol of butyl lithium. The system was maintained at 70° C. for 30 minutes.

After completion of the polymerization, the obtained polymer solution was discharged into a vessel containing preliminarily a small amount of butanol, and then, gradually introduced into a large amount of methanol solution vigorously stirred, to recover the polymer. This polymer was dried at room temperature for 1 day, and then dried at 80° C. under vacuum until weight change was no longer observed. 380 g of a polymer (polymer R1-B) was obtained.

Example R2

Under the conditions as identified in Table 30, polymerization was carried out in the same manner as in Example 1. The ethylene/octene/diene copolymer (polymer R2-A) obtained by partially withdrawing the polymerization solution after completion of the coordination polymerization, was 18 g, and the copolymer (polymer R2-B) obtained after completion of the anionic polymerization was 234 g.

Example R3

Using rac-dimethylmethylenebis(4,5-benzo-1-indenyl) zirconium dichloride as a catalyst, under the conditions as identified in Table 30, the polymerization was carried out in the same manner as in Example 1. The ethylene/octene/diene copolymer (polymer R3-A) obtained by partially withdrawing the polymerization solution after completion of the coordination polymerization, was 60 g, and the copolymer (polymer R3-B) obtained after completion of the anionic polymerization, was 385 g.

Example R4

Using rac-dimethylmethylenebis(4,5-benzo-1-indenyl) zirconium dichloride as a catalyst, under the conditions as identified in Table 30, polymerization was carried out in the same manner as in Example 1.

Without partially withdrawing the coordination polymerization solution, the copolymer (polymer R4-B) obtained after completion of the anionic polymerization, was 385 g.

TABLE 30

Polymerization conditions

| | | | | | | Coordination polymerization step | | | | Crossing step (anionic polymerization step) | | | |
|---|---|---|---|---|---|---|---|---|---|---|---|---|---|
| Ex. | Catalyst $\mu$mol | MAO mmol | Oct. ml | DVB ml | Solvent ml | Et pressure MPa | Polymerization temperature °C. | Et consumption l | Polymerization time | Added monomer | Amount of BuLi mmol | Polymerization temperature °C. | Polymerization time h |
| R1 | C 8.4 | M:8.4 | 400 | 2.0 | T:4400 | 1.1 | 50 | About 140 | 4 h | St 200 ml | n 21.0 | 70 | 0.5 |
| R2 | C 8.4 | M:8.4 | 400 | 2.0 | T:4400 | 1.1 | 70 | About 70 | 3 h | St 200 ml | n 21.0 | 70 | 0.5 |
| R3 | A 2.1 | P:4.2 | 200 | 1.0 | C:4600 | 1.1 | 70 | About 200 | 1 h | St 100 ml | n 16.8 | 70 | 0.5 |
| R4 | A 8.4 | P:8.4 | 400 | 1.0 | T:4400 | 1.1 | 50 | About 200 | 36 min. | St 400 ml | n 21.0 | 70 | 0.5 |

In Table 31, the analytical results of the obtained polymers are shown.

TABLE 31

Polymerization results and analytical results of polymers

| Example | Polymer 1) | Obtained amount 2) | 1-octene content (mol %) | Styrene content (mol %) | Mw/$10^4$ | Mw/Mn | Glass transition temperature (° C.) | Melting point (° C.) |
|---|---|---|---|---|---|---|---|---|
| R1 | R1-A | 28 g | 9.3 | 0.0 | Unmeasured | Unmeasured | −60 | 66.6 |
| | R1-B | 380 g | 7.5 | 19.5 | Unmeasured | Unmeasured | −58, 95 | 88.7 |
| R2 | R2-A | 18 g | 7.7 | 0.0 | 66.1 | 2.3 | −58 | 69.2 |
| | R2-B | 234 g | 3.0 | 62.6 | 70.9 4.9 | 2.5 1.1 | −60, 100 | 67.5 |
| R3 | R3-A | 60 g | 5.0 | 0.0 | Unmeasured | Unmeasured | −45 | 105 |
| | R3-B | 385 g | 4.2 | 7.0 | Unmeasured | Unmeasured | −45, * | 103 |
| R4 | R4-B | 780 g | 5.7 | 29.4 | ☆ | ☆ | −62, 100 | 79.4 |

1) In the column for polymer, -A represents the polymer recovered by withdrawing a part of the polymer solution obtained in the coordination polymerization step, and -B represents the copolymer obtained in the crossing step.
2) In the column for obtained amount, the value of -A represents the amount of the polymer recovered by withdrawing a part of the polymer solution obtained in the coordination polymerization step, and the value of -B is the weight of the copolymer obtained in the crossing step.
* The glass transition point corresponding to the styrene homopolymer is not clear as it overlaps the melting point peak.
☆ Many peaks of the weight average molecular weight ranging from 1,000,000 to 40,000.

Figure 12:
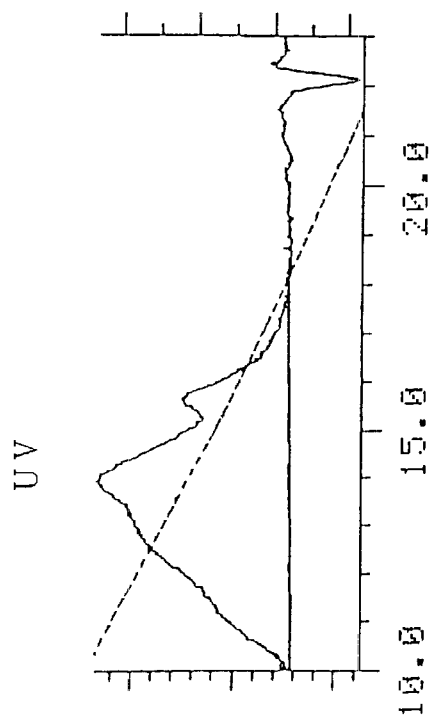
FIG. 12 is a GPC curve of polymer R4-B.
Figure 12:
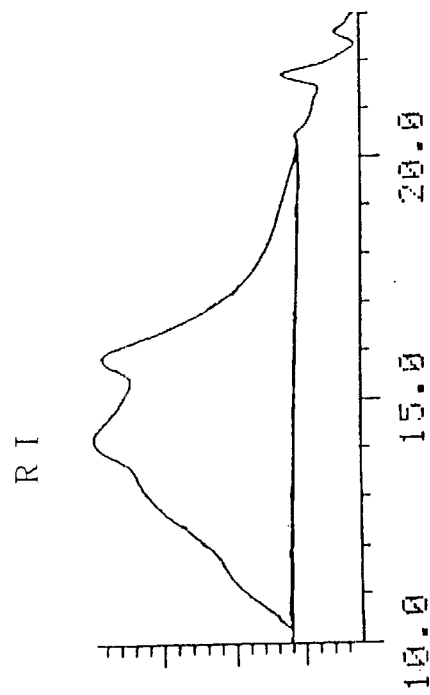

A GPC curve of polymer R4-B obtained by the crossing step (anionic polymerization) in Example R4, is shown in FIG. 12. The curve is composed of many peaks overlapped complicatedly. However, as between the RI detector (showing the distribution of the entire polymer) and the UV detector (showing the distribution of styrene units in the polymer), the peak shapes substantially agree, and therefore, it is considered that the polystyrene chain is contained in any copolymer fraction ranging from a high molecular weight component to a low molecular weight component.

In Table 32, the physical properties of the obtained polymers are shown.

TABLE 32

Physical properties

| Kind of polymer | Ex. R1 R1-B | Ex. R2 R2-A | Ex. R2 R2-B | Ex. R3 R3-A | Ex. R3 R3-B |
|---|---|---|---|---|---|
| Breaking elongation (%) | 160 | 550 | 193 | 607 | 127 |
| Yield strength (MPa) | Yield point was not observed | Yield point was not observed | Yield point was not observed | 6.3 | 8.7 |
| Breaking strength (MPa) | 6.4 | 25.4 | 10.6 | 7.0 | 8.4 |
| Tensile modulus of elasticity (MPa) | 60 | 13.4 | 196 | 53.2 | 112 |
| 100% modulus (MPa) | 4.2 | 3.4 | 9.5 | 6.3 | 8.0 |
| Permanent elongation (%) | Unmeasured | Unmeasured | Unmeasured | 20 | 45 |
| Hardness (Shore A) | Unmeasured | Unmeasured | Unmeasured | 92 | 96 |
| Hardness (Shore D) | Unmeasured | Unmeasured | Unmeasured | 38 | 47 |

With the obtained polystyrene-cross-copolymerized ethylene/1-octene/diene cross-copolymerization product, elongation decreased, and the breaking strength did not improve as compared with the ethylene/1-octene/diene copolymer obtained in the coordination polymerization step, but improvements are observed in the tensile modulus of elasticity and hardness.

Preparation of Syndiotactic Polystyrene-cross-copolymerized Ethylene/styrene/diene Cross-copolymerization Product Example R1

Using rac-dimethylmethylenebis(4,5-benzo-1-indenyl) zirconium dichloride as a catalyst, the preparation was carried out as follows.

Polymerization was carried out by means of an autoclave having a capacity of 10 l and equipped with a stirrer and a jacket for heating and cooling.

4000 ml of dried toluene, 800 ml of styrene and 1 ml of divinylbenzene were charged, and heated and stirred at an internal temperature of 50° C. About 100 l of nitrogen was bubbled to purge the interior of the system. 8.4 mmol of triisobutyl aluminum and 8.4 mmol, based on Al, of methylalumoxane (MMAO-3A, manufactured by TOSOH AKZO K.K.) were added, and the internal temperature was raised to 50° C. Ethylene was immediately introduced. After the pressure was stabilized at 1.1 MPa (10 kg/cm$^2$G), from a catalyst tank installed above the autoclave, about 50 ml of a toluene solution having 8.4 $\mu$mol of rac-dimethylmethylenebis(4,5-benzo-1-indenyl)zirconium dichloride and 0.84 mmol of triisobutyl aluminum dissolved therein, was added to the autoclave. Polymerization was carried out for about 0.5 hour while maintaining the internal temperature at 50° C. and the pressure at 1.1 MPa.

Upon expiration of 0.5 hour, consumption of ethylene was 100 l in a standard state. Ethylene was released, and the internal temperature was raised to 70° C. A small amount of the polymerization solution was withdrawn and the polymer (polymer R-A) by coordination polymerization was obtained by methanol precipitation. Nitrogen was bubbled while taking care so that the polymer solution would not foam, to remove residual ethylene in the polymerizer and in the polymerization solution as far as possible. From a port at an upper portion of the autoclave, 300 mmol of methylalumoxane was added by a syringe, and further 100 ml of a toluene solution containing 300 $\mu$mol of cyclopentadienyltitanium trichloride, was introduced. Then, the system was maintained at 70° C. for 2 hours.

After completion of the polymerization, the obtained polymer solution was discharged to a vessel containing preliminarily a small amount of butanol, and then, gradually introduced into a large amount of a methanol solution vigorously stirred to recover the polymer. This polymer was dried in air at room temperature for 1 day and then dried at 80° C. under vacuum until weight change was no longer observed. 364 g of the polymer (polymer R-B) was obtained.

The polymerization conditions are shown in Table 33, and the analytical values of the obtained polymers are shown in Table 34.

With polymer R-B, a melting point at 252° C. attributable to syndiotactic polystyrene was observed, and it shows a heat of crystal fusion of about 10 J/g. The obtained cross-copolymer was press-molded at a pressing temperature of 300° C. under 50 atm for 4 minutes to obtain a sheet, from which a dumbbell was punched out. The mechanical properties were measured, whereby the elongation was 330%, the breaking strength was 19.0 mpa, the 100% modulus was 14.0 mpa, and the tensile modulus of elasticity was 56.0 mpa.

TABLE 33

Polymerization conditions

| | Coordination polymerization step | | | | | | | | Crossing step (coordination polymerization) | | | |
|---|---|---|---|---|---|---|---|---|---|---|---|---|
| Ex. | Catalyst $\mu$mol | MAO mmol | Styrene ml | DVB ml | Solvent ml | Et pressure MPa | Polymerization temperature ° C. | Et consumption l | Polymerization time | Added catalyst $\mu$mol | Added MAO mmol | Polymerization temperature ° C. | Polymerization time h |
| R1 | A 8.4 | P:8.4 | 800 | 1.0 | T:4000 | 1.1 | 50 | About 100 | 0.5 h | CpTiCl3 300 | 300 | 70 | 2.0 |

Catalyst A: rac-dimethylmethylenebis(4,5-benzo-1-indenyl)zirconium dichloride
MAO P: PMAO
Solvent T: toluene

TABLE 34

Polymerization results and analytical results of polymers

| Polymer 1) | Obtained amount | Total styrene content (mol %) | Mw/10$^4$ | Mw/Mn | Glass transition temperature ° C. | Melting point ° C. |
|---|---|---|---|---|---|---|
| R-A | 5 g | 11 | 18.8 | 1.7 | −22 | 67.0 |
| R-B | 364 g | 28 | 23.8 | 1.5 | −22 | 65.5 |
| | | 2.8 | | 2.5 | | 252.4 |

1) In the column for Polymer, -A means a copolymer obtained in the coordination polymerization step, and -B means a copolymer obtained in the crossing step.
R-A was obtained by subjecting a part of the coordination polymerization solution to methanol precipitation.

What is claimed is:

1. A process for producing a cross-copolymerization product, comprising:
    copolymerizing a styrene monomer, an olefin monomer and a diene monomer using a single site coordination polymerization catalyst to synthesize an olefin/styrene/diene copolymer; and
    cross-copolymerizing said olefin/styrene/diene copolymer and a vinyl compound monomer using an anionic, radical or cationic polymerization initiator, thereby obtaining an olefin/styrene/diene cross-copolymerization product.

2. A process for producing a cross-copolymerization product, comprising:

copolymerizing an olefin monomer and a diene monomer using a single site coordination polymerization catalyst to synthesize an olefin/diene copolymer; and cross-copolymerizing said olefin/diene copolymer and a vinyl compound monomer using an anionic, radical or cationic polymerization initiator, thereby obtaining an olefin/diene cross-copolymerization product.

3. The process according to claim 1, wherein said copolymerizing occurs in the presence of said coordination polymerization catalyst and a co-catalyst;

wherein said coordination polymerization catalyst comprises a transition metal compound represented by formula (1)

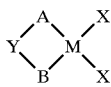

(1)

wherein each of A and B is selected from the group consisting of an unsubstituted cyclopentaphenanthryl group, a substituted cyclopentaphenanthryl group, an unsubstituted benzoindenyl group, a substituted benzoindenyl group, an unsubstituted cyclopentadienyl group, a substituted cyclopentadienyl group, an unsubstituted indenyl group, a substituted indenyl group, an unsubstituted fluorenyl group, and a substituted fluorenyl group;

Y is a methylene group, a silylene group, an ethylene group, a germilene group or a boron residue, which has bonds to A and B and which further has hydrogen or a $C_{1-15}$ hydrocarbon group that may contain from 1 to 3 nitrogen, oxygen, sulfur, phosphorus or silicon atoms as substituents, wherein the substituents may be the same or different from one another, and Y may have a cyclic structure;

X is hydrogen, a halogen, a $C_{1-15}$ alkyl group, a $C_{6-10}$ aryl group, a $C_{1-12}$ alkylaryl group, a silyl group having a $C_{1-4}$ hydrocarbon substituent, a $C_{1-10}$ alkoxy group or a dialkylamide group having a $C_{1-6}$ alkyl substituent; and M is zirconium, hafnium or titanium.

4. The process according to claim 1, wherein the single site coordination polymerization catalyst comprises a soluble transition metal catalyst represented by formula (2) and a co-catalyst:

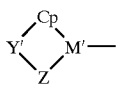

(2)

wherein

Cp is selected from the group consisting of an unsubstituted cyclopentaphenanthryl group, a substituted cyclopentaphenanthryl group, an unsubstituted benzoindenyl group, a substituted benzoindenyl group, an unsubstituted cyclopentadienyl group, a substituted cyclopentadienyl group, an unsubstituted indenyl group, a substituted indenyl group, an unsubstituted fluorenyl group and substituted fluorenyl group;

Y' is a methylene group, a silylene group, an ethylene group, a germilene group or a boron residue, which has bonds to Cp and Z and which further has hydrogen or a $C_{1-15}$ hydrocarbon group as substituents, wherein the substituents may be the same or different from one another, and Y' may have a cyclic structure;

Z is a group containing nitrogen, oxygen or sulfur, which has a bond to Y' with a ligand coordinated to M' with nitrogen, oxygen or sulfur and which further has hydrogen or a $C_{1-15}$ substituent, M is zirconium, hafnium or titanium;

X' is hydrogen, a halogen, a $C_{1-15}$ alkyl group, a $C_{6-10}$ aryl group, a $C_{8-12}$ alkylaryl group, a silyl group having a $C_{1-4}$ hydrocarbon substituent, a $C_{1-10}$ alkoxy group or a dialkylamide group having a $C_{1-6}$ alkyl substituent; and n is an integer of 1 or 2.

5. The process according to claim 1, wherein the olefin used during said copolymerizing is a) ethylene or b) a mixture of ethylene with an α-olefin.

6. The process according to claim 1, wherein the diene used during said copolymerizing is one or at least two members selected from the group consisting of dienes in which a double bond remaining after one of the double bonds has reacted during said copolymerizing is polymerizable by anionic polymerization.

7. The process according to claim 1, wherein the diene used during said copolymerizing is one or at least two members selected from the group consisting of dienes in which a double bond remaining in the structure after one of the double bonds has reacted during said copolymerizing is polymerizable by radical polymerization.

8. The process according to claim 1, wherein the diene used during said copolymerizing is divinylbenzene.

9. The process according to claim 1, wherein the diene is used during said copolymerizing in a molar ratio of at most 1/100 based on the amount of the styrene monomer.

10. The process according to claim 1, wherein an anionic polymerization initiator is used during said cross-copolymerizing.

11. The process according to claim 10, wherein said vinyl compound monomer used during said cross-copolymerizing is a) an aromatic vinyl compound monomer, or b) a mixture of an aromatic vinyl compound monomer and a monomer polymerizable by anionic polymerization.

12. The process according to claim 1, wherein a part or the entire styrene monomer used during said cross-copolymerizing is a styrene monomer which has not reacted during said copolymerizing.

13. The process according to claim 1, wherein a polymerization solution obtained during said copolymerizing and containing the olefin/styrene/diene copolymer is used for said cross-copolymerizing without separating the olefin/styrene/diene copolymer from the polymerization solution.

14. The process according to claim 1, wherein a radical polymerization initiator is used during said cross-copolymerizing.

15. The process according to claim 14, wherein the vinyl compound monomer used during said cross-copolymerizing is a) an aromatic vinyl compound monomer, or b) a mixture of an aromatic vinyl compound monomer and a monomer polymerizable by radical polymerization.

16. An olefin/styrene/diene cross-copolymerization product obtained by the process as defined in claim 1.

17. An olefin/diene cross-copolymerization product obtained by the process as defined in claim 2.

18. An olefin/styrene/diene cross-copolymer obtained by cross-copolymerizing a vinyl compound with an olefin/styrene/diene copolymer having a styrene content of from 0.03 mol % to 96 mol %, a diene content of from 0.0001 mol % to 3 mol % and a remainder of an olefin, wherein cross-copolymerized cross chains are other than a syndiotactic aromatic vinyl compound polymer.

19. The olefin/styrene/diene cross-copolymer according to claim 18, wherein the cross-copolymerized cross chains have substantially no stereoregularity.

20. The olefin/styrene/diene cross-copolymer according to claim 18, wherein the olefin/styrene/diene copolymer used for said cross-copolymerizing has a styrene content of from 0.03 mol % to 25 mol %, a diene content of from 0.001 mol % to 0.5 mol % and a remainder of an olefin.

21. The olefin/styrene/diene cross-copolymer according to claim 18, wherein the olefin is a) ethylene, or b) ethylene and an α-olefin.

22. The olefin/styrene/diene cross-copolymer according to claim 18, wherein the vinyl compound is styrene.

23. The olefin/styrene/diene cross-copolymer according to claim 18, wherein the olefin/styrene/diene copolymer obtained during said copolymerizing has a chain structure of head-to-tail styrene units.

24. The olefin/styrene/diene cross-copolymer according to claim 18, wherein the olefin/styrene/diene copolymer obtained during said copolymerizing, is an ethylene/styrene/diene copolymer, wherein the stereoregularity of phenyl groups in the alternating structure of styrene and ethylene represented by formula (3) contained in said ethylene/styrene/diene copolymer, is larger than 0.5 as represented by the isotactic diad index m:

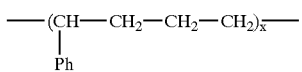  (3)

wherein Ph represents a phenyl group, and x represents the number of repeating units and is an integer of at least 2.

25. The olefin/styrene/diene cross-copolymer according to claim 18, wherein the olefin/styrene/diene copolymer obtained during said copolymerizing is defined by formula (i), and the alternating structure index λ representing a proportion of the alternating structure of styrene and ethylene represented by formula (3) contained in the copolymer structure, is smaller than 70 and larger than 0.01

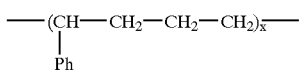  (3)

wherein Ph represents a phenyl group, and x represents the number of repeating units and is an integer of at least 2;

λ=A3/A2×100          Formula (i)

wherein A3 is the sum of areas of three peaks a, b and c attributable to an ethylene/styrene alternating structure represented by formula (3'), obtained by a $^{13}$C-NMR measurement, and A2 is the sum of areas of peaks attributable to the main chain methylene and the main chain methine carbon, as observed within a range of from 0 to 50 ppm by $^{13}$C-NMR using TMS as standard:

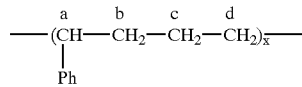  (3')

wherein Ph represents a phenyl group, and x represents the number of repeating units and is an integer of at least 2.

26. The olefin/styrene/diene cross-copolymer according to claim 18, wherein a weight average molecular weight of the olefin/styrene/diene copolymer obtained during said copolymerizing is from 10,000 to 1,000,000.

27. The olefin/styrene/diene cross-copolymer according to claim 18, wherein a weight average molecular weight of the cross chain obtained during said cross-copolymerizing is from 500 to 500,000.

28. The olefin/styrene/diene cross-copolymerization product according to claim 16, wherein MFR as measured under a load of 5 kg at 200° C. is at least 0.05 g/10 min.

29. The olefin/styrene/diene cross-copolymerization product according to claim 16, wherein the boiling xylene-insoluble gel content is less than 10 wt %.

30. The olefin/styrene/diene cross-copolymerization product according to claim 16, wherein the amount of the vinyl compound polymer contained but not crossed, is at most 90 wt % of the entire polymer.

31. A cross-copolymerization product wherein a modular of elasticity E' obtained from a viscoelasticity spectrum measured at 1 Hz, is within a range of from $2\times10^7$ Pa to $2\times10^9$ Pa at 0° C. and from $5\times10^6$ Pa to $1\times10^8$ Pa at 100° C.

32. A resin composition, comprising:
   from 1 to 99 wt % of the olefin/styrene/diene cross-copolymerization product as defined in claim 16; and
   from 99 to 1 wt % of an aromatic vinyl compound resin.

33. A resin composition, comprising:
   from 1 to 99 wt % of the olefin/styrene/diene cross-copolymerization product as defined in claim 16; and
   from 99 to 1 wt % of an olefin resin.

34. A resin composition, comprising:
   from 1 to 98 wt % of the olefin/styrene/diene cross-copolymerization product as defined in claim 16; and
   from 99 to 2 wt % of a total of an olefin resin and an aromatic vinyl compound resin, provided that each of the olefin resin and the aromatic vinyl compound resin is at least 1 wt %.

35. A resin composition, comprising:
   from 10 to 99 wt % of the olefin/styrene/diene cross-copolymerization product as defined in claim 16; and
   from 0 to 1 wt % of a filler.

36. A resin composition, comprising:
   from 50 to 99 wt % of the olefin/styrene/diene cross-copolymerization product as defined in claim 16; and
   from 50 to 1 wt % of a plasticizer.

37. A resin composition comprising:
   from 30 to 98 wt % of the olefin/styrene/diene cross-copolymerization product as defined in claim 16; and
   from 70 to 2 wt % of a total of a plasticizer and a filler, provided that each of the plasticizer and the filler is at least 1 wt %.

38. A cross-linked product made of a resin composition, comprising:
   from 1 to 100 wt % of the olefin/styrene/diene cross-copolymerization product as defined in claim 16.

39. A olefin/styrene/diene foamed product made of a resin composition, comprising:

from 1 to 100 wt % of the olefin/styrene/diene cross-copolymerization product as defined in claim 16.

40. A molded product made of the olefin/styrene/diene cross-copolymerization product as defined in claim 16.

41. A molded product made of the resin composition as defined in claim 32.

42. A film made of the olefin/styrene/diene cross-copolymerization product as defined in claim 16.

43. A sheet made of the olefin/styrene/diene cross-copolymerization product as defined in claim 16.

44. A tube made of the olefin/styrene/diene cross-copolymerization product as defined in claim 16.

45. A container made of the olefin/styrene/diene cross-copolymerization product as defined in claim 16.

46. A wall material made of the olefin/styrene/diene cross-copolymerization product as defined in claim 16.

47. A wall paper made of the olefin/styrene/diene cross-copolymerization product as defined in claim 16.

48. A building material made of the olefin/styrene/diene cross-copolymerization product as defined in claim 16.

49. A process for producing a syndiotactic polystyrene-cross-copolymerized olefin/styrene/diene copolymerization product or a syndiotactic polystyrene-cross-copolymerized olefin/diene copolymerization product, comprising:

copolymerizing 1) an olefin monomer, a styrene monomer and a diene monomer or 2) an olefin monomer and a diene monomer using a polymerization catalyst comprising a soluble transition metal catalyst represented by formula (1) and a cocatalyst, thereby obtaining 1) an olefin/styrene/diene copolymer or 2) an olefin/diene copolymer; and cross-copolymerizing said olefin/styrene/diene copolymer or said olefin/diene copolymer, and a styrene monomer using a coordination polymerization catalyst, to obtain a cross-copolymerization product having cross chains of syndiotactic polystyrene;

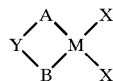

(1)

wherein each of A and B is selected from the group consisting of an unsubstituted cyclopentaphenanthryl group, a substituted cyclopentaphenanthryl group, an unsubstituted benzoindenyl group, a substituted benzoindenyl group, an unsubstituted cyclopentadienyl group, a substituted cyclopentadienyl group, an unsubstituted indenyl group, a substituted indenyl group, an unsubstituted fluorenyl group, and a substituted fluorenyl group;

Y is a methylene group, a silylene group, an ethylene group, a germilene group or a boron residue, which has bonds to A and B and which further has hydrogen or a $C_{1-15}$ hydrocarbon group that may contain from 1 to 3 nitrogen, oxygen, sulfur, phosphorus or silicon atoms, as substituents, the substituents may be the same or different from one another, and Y may have a cyclic structure;

X is hydrogen, a halogen, a $C_{1-15}$ alkyl group, a $C_{6-10}$ aryl group, a $C_{8-12}$ alkylaryl group, a silyl group having a $C_{1-4}$ hydrocarbon substituent, a $C_{1-10}$ alkoxy group or a dialkylamide group having a $C_{1-6}$ alkyl substituent; and M is zirconium, hafnium or titanium.

50. The process according to claim 2, wherein the single site coordination polymerization catalyst comprises a soluble transition metal catalyst represented by formula (2) and a co-catalyst:

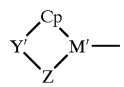

(2)

wherein

Cp is selected from the group consisting of an unsubstituted cyclopentaphenanthryl group, a substituted cyclopentaphenanthryl group, an unsubstituted benzoindenyl group, a substituted benzoindenyl group, an unsubstituted cyclopentadienyl group, a substituted cyclopentadienyl group, an unsubstituted indenyl group, a substituted indenyl group, an unsubstituted fluorenyl group, and a substituted fluorenyl group;

Y' is a methylene group, a silylene group, an ethylene group, a gernilene group or a boron residue, which has bonds to Cp and Z and which further has hydrogen or a $C_{1-15}$ hydrocarbon group, the substituents may be the same or different from one another, and Y' may have a cyclic structure;

Z is a group containing nitrogen, oxygen or sulfur, which has a bond to Y' with a ligand coordinated to M' with nitrogen, oxygen or sulfur and which further has hydrogen or a $C_{1-15}$ substituent, M is zirconium, hafnium or titanium;

X' is hydrogen, a halogen, a $C_{1-15}$ alkyl group, a $C_{6-10}$ aryl group, a $C_{8-12}$ alkylaryl group, a silyl group having a $C_{1-4}$ hydrocarbon substituent, a $C_{1-10}$ alkoxy group or a dialkylamide group having a $C_{1-6}$ alkyl substituent; and n is an integer of 1 or 2.

51. The process according to claim 2, wherein the olefin used during said copolymerizing is a) ethylene or b) a mixture of ethylene with an α-olefin.

52. The process according to claim 2, wherein the diene used during said copolymerizing is one or at least two members selected from the group consisting of dienes in which a double bond remaining after one of the double bonds has reacted during said copolymerizing, is polymerizable by anionic polymerization.

53. The process according to claim 2, wherein the diene used during said copolymerizing is one or at least two members selected from the group consisting of dienes in which a double bond remaining after one of the double bonds has reacted during said copolymerizing is polymerizable by radical polymerization.

54. The process according to claim 2, wherein the diene used in the coordination polymerization step is divinylbenzene.

55. The process according to claim 2, wherein an anionic polymerization initiator is used during said cross-copolymerizing.

56. The process according to claim 55, wherein the vinyl compound monomer used during said cross-copolymerizing is a) an aromatic vinyl compound monomer, or b) a mixture of an aromatic vinyl compound monomer and a monomer polymerizable by anionic polymerization.

57. The process according to claim 2, wherein a polymerization solution obtained during said copolymerizing and containing the olefin/diene copolymer is used during said cross-copolymerizing without separating the olefin/diene copolymer from the polymerization solution.

58. The process according to claim 2, wherein a radical polymerization initiator is used during said cross-copolymerizing.

59. The process according to claim 58, wherein the vinyl compound monomer used during said cross-copolymerizing is a) an aromatic vinyl compound monomer, or b) a mixture of an aromatic vinyl compound monomer and a monomer polymerizable by radical polymerization.

60. The olefin/diene cross-copolymerization product according to claim 17, wherein MFR as measured under a load of 5 kg at 200° C. is at least 0.05 g/10 min.

61. The olefin/diene cross-copolymerization product according to claim 17, wherein the boiling xylene-insoluble gel content is less than 10 wt %.

62. The olefin/diene cross-copolymerization product according to claim 17, wherein an amount of a vinyl compound polymer contained but not crossed, is at most 90 wt % of the entire polymer.

63. A resin composition, comprising:
    from 1 to 99 wt % of the olefin/diene cross-copolymerization product as defined in claim 17; and
    from 99 to 1 wt % of an aromatic vinyl compound resin.

64. A resin composition, comprising:
    from 1 to 99 wt % of the olefin/diene cross-copolymerization product as defined in claim 17; and
    from 99 to 1 wt % of an olefin resin.

65. A resin composition, comprising:
    from 1 to 98 wt % of the olefin/diene cross-copolymerization product as defined in claim 17; and
    from 99 to 2 wt % of the total of an olefin resin and an aromatic vinyl compound resin, provided that each of the olefin resin and the aromatic vinyl compound resin is at least 1 wt %.

66. A resin composition, comprising:
    from 10 to 99 wt % of the cross-copolymerization product as defined in claim 17; and
    from 0 to 1 wt % of a filler.

67. A resin composition, comprising:
    from 50 to 99 wt % of the olefin/diene cross-copolymerization product as defined in claim 17; and
    from 50 to 1 wt % of a plasticizer.

68. A resin composition, comprising:
    from 30 to 98 wt % of the olefin/diene cross-copolymerization product as defined in claim 17; and
    from 70 to 2 wt % of the total of a plasticizer and a filler, provided that each of the plasticizer and the filler is at least 1 wt %.

69. A cross-linked product made of a resin composition comprising from 1 to 100 wt % of the olefin/diene cross-copolymerization product as defined in claim 17.

70. A foamed product made of a resin composition comprising from 1 to 100 wt % of the olefin/diene cross-copolymerization product as defined in claim 17.

71. A molded product made of the olefin/diene cross-copolymerization product as defined in claim 17.

72. A molded product made of the olefin/diene cross-copolymerization product as defined in claim 17.

73. A film made of the olefin/diene cross-copolymerization product as defined in claim 17.

74. A sheet made of the olefin/diene cross-copolymerization product as defined in claim 17.

75. A tube made of the olefin/diene cross-copolymerization product as defined in claim 17.

76. A container made of the olefin/diene cross-copolymerization product as defined in claim 17.

77. A wall material made of the olefin/diene cross-copolymerization product as defined in claim 17.

78. A wall paper made of the olefin/diene cross-copolymerization product as defined in claim 17.

79. A floor material made of the olefin/styrene/diene cross-copolymerization product as defined in claim 16.

80. A floor material made of the olefin/diene cross-copolymerization product as defined in claim 17.

81. A building material made of the olefin/diene cross-copolymerization product as defined in claim 17.

82. The process according to claim 1, wherein said cross-copolymerization product is a copolymer having a structure in which said olefin/styrene/diene copolymer constitutes a main chain which is intersectingly bonded by a vinyl compound polymer at one or more points.

83. The process according to claim 1, wherein said cross-copolymerization product is a segregated star copolymer.

84. The process according to claim 1, wherein said diene is selected from the group consisting of 1,4-hexadiene, 1,5-hexadiene, ethylidene, norbomene, dicyclopentadienenorbonadiene, 4-vinyl-1-cyclohexene, 3-vinyl-1-cyclohexene, 2-vinyl-1-cyclohexene, 1-vinyl-1-cyclohexene, o-divinylbenzene, p-divinylbenzene, m-divinylbenzene and a mixture thereof.

85. The process according to claim 1, wherein said cocatalyst is an aluminoxane or a boron compound.

86. The process according to claim 1, wherein said vinyl compound monomer is selected from the group consisting of styrene, p-methyl-styrene, p-tert-butylstyrene, p-chlorostyrene, α-methyl-styrene, vinylnaphtalene, vinylanthracene, butadiene, isoprene, chloroprene, vinylcyclohexane, (meth)acrylate, acrylonitrile, maleic anhydride and a mixture thereof.

* * * * *